US012783376B2

(12) United States Patent
Pont

(10) Patent No.: US 12,783,376 B2
(45) Date of Patent: Nov. 3, 2026

(54) TIME-TRIGGERED COMPUTER SYSTEM WITH A HIGH LEVEL OF DIAGNOSTIC COVERAGE

(71) Applicant: SAFETTY SYSTEMS LTD, Great Dalby (GB)

(72) Inventor: Michael Joseph Pont, Great Dalby (GB)

(73) Assignee: SAFETTY SYSTEMS LTD, Great Dalby (GB)

( * ) Notice: Subject to any disclaimer, the term of this patent is extended or adjusted under 35 U.S.C. 154(b) by 0 days.

(21) Appl. No.: 18/875,381

(22) PCT Filed: Jun. 16, 2023

(86) PCT No.: PCT/GB2023/051580

§ 371 (c)(1),
(2) Date: Dec. 16, 2024

(87) PCT Pub. No.: WO2023/247934

PCT Pub. Date: Dec. 28, 2023

(65) Prior Publication Data

US 2025/0217252 A1 Jul. 3, 2025

(30) Foreign Application Priority Data

Jun. 22, 2022 (GB) ...................................... 2209133

(51) Int. Cl.
*G06F 11/27* (2006.01)
*G06F 11/22* (2006.01)

(52) U.S. Cl.
CPC .......... *G06F 11/27* (2013.01); *G06F 11/2284* (2013.01)

(58) Field of Classification Search
CPC .. G06F 11/27; G06F 11/2284; G06F 11/2236; G06F 11/22

(Continued)

(56) References Cited

U.S. PATENT DOCUMENTS 9,830,211 B2 11/2017 Pont
2004/0186688 A1* 9/2004 Nejedlo .................. G06F 11/27 714/E11.169

(Continued)

FOREIGN PATENT DOCUMENTS

EP 3039542 B1 6/2018
EP 3039543 B1 11/2020

(Continued)

OTHER PUBLICATIONS

Anonymous: "Built-in Self-Test (BIST)—Semiconductor Engineering—Too many links for CiteNpl:3727", Retrieved from the Internet: URL:https://semiengineering.com/knowledge_centers/test/built-in-self-test-bist/ [retrieved on Nov. 15, 2023], in 5 pages.

(Continued)

*Primary Examiner* — Yair Leibovich
(74) *Attorney, Agent, or Firm* — Knobbe, Martens, Olson & Bear, LLP

(57) ABSTRACT

Time-triggered computer systems, methods and computer programs are disclosed. A time-triggered computer system comprises at least one first processor that is adapted to: perform at least one first Power-On Self-Test, POST, and/or at least one first Built-In Self-Test, BIST and transmit first data, that is indicative of results of at least one said first POST and/or said first BIST, to at least one second processor; and at least one second processor that is adapted to: compare the first data with second data, that is data indicative of expected results from at least one said first POST and/or said first BIST and responsive to the comparison, determine if at least one said first POST and/or first BIST has passed or failed.

19 Claims, 12 Drawing Sheets

(58) Field of Classification Search
USPC ........................................................ 714/30
See application file for complete search history.

(56) References Cited

U.S. PATENT DOCUMENTS

| | | | |
|---|---|---|---|
| 2012/0226942 A1 | 9/2012 | Gangasani et al. | |
| 2018/0336111 A1* | 11/2018 | Gendler | G06F 1/3287 |
| 2019/0278677 A1 | 9/2019 | Terechko et al. | |
| 2021/0286693 A1 | 9/2021 | Alben et al. | |

FOREIGN PATENT DOCUMENTS

| | | | |
|---|---|---|---|
| GB | 2526082 | A | 11/2015 |
| GB | 2526083 | A | 11/2015 |
| JP | 2018-071992 | A | 5/2018 |
| WO | WO 2015/173532 | A1 | 11/2015 |

OTHER PUBLICATIONS

Anonymous: "Hardware Diagnostics and Power on Self Tests", Retrieved from the Internet: URL:https://www.eventhelix.com/fault-handling/hardware-diagnostics/ [retrieved on Nov. 15, 2023], in 6 pages.

International Search Report and Written Opinion in International Application No. PCT/GB2023/051580 dated Nov. 27, 2023 in 27 pages.

Search Report in Application No. GB2209133.4 dated Feb. 17, 2023 in 4 pages.

Anonymous, "MWCT101xS Safety Manual", NXP Semiconductors, Aug. 2018, in 101 pages.

Pont, M.J., "*Patterns for time-triggered embedded systems*", ACM Press, 2001, in 1024 pages.

Pont, M.J., "*The Engineering of Reliable Embedded Systems*", SafeTTy Systems, 2014, LPC1769 Edition, in 399 pages.

Office Action issued in Indian Application No. 202417089063, dated Jul. 6, 2026.

* cited by examiner

TIME-TRIGGERED COMPUTER SYSTEM WITH A HIGH LEVEL OF DIAGNOSTIC COVERAGE

FIELD OF THE INVENTION

The present invention relates to a computer system and a method for improving safety and reliability of time-triggered computer systems. In particular, but not exclusively, the present invention relates to a time-triggered computer system which can perform comprehensive periodic (self) tests with a high level of diagnostic coverage without causing disruption to normal system operation.

BACKGROUND TO THE INVENTION

A computer system usually has one or more "Commercial off the Shelf" (COTS) processors—for example, microcontrollers or microprocessors—and some software that will execute on such processor(s). The processors may each contain one or more processor cores. The software may be created, for example, using a programming language such as 'C'.

In many cases, processors are "embedded" inside larger systems, including cars, aircraft, industrial and agricultural machinery, medical equipment, white goods and even in toys. Other related uses of computer systems include real-time "desktop" applications, such as air-traffic control and traffic management.

When creating such computer systems, developers must choose an appropriate system architecture. One such architecture is a "time-triggered" (TT) architecture. In this architecture the computer system executes tasks according to a predetermined task schedule. Implementation of a TT architecture will typically involve use of a single interrupt that is linked to the periodic overflow of a timer. This interrupt may drive a task scheduler (a simple form of "operating system"). The scheduler will—in turn-begin the execution of the system tasks (a process sometimes called "releasing" the tasks, "triggering" the tasks or "running" the tasks) at predetermined points in time. The tasks themselves are typically named blocks of program code that perform a particular activity (for example, a task may check to see if a switch has been pressed). Tasks are often implemented as functions in programming languages such as 'C'.

Pont, M. J. (2001) "Patterns for Time-Triggered Embedded Systems", Addison-Wesley/ACM Press (herein "Reference 1"), the entirety of which is hereby incorporated by reference, and Pont, M. J. (2016) "The Engineering of Reliable Embedded Systems: Developing software for 'SIL 0' to 'SIL 3' designs using Time-Triggered architectures" (Second Edition), SafeTTy Systems (herein "Reference 2"), the entirety of which is hereby incorporated by reference, provide further information about the implementation of different forms of conventional TT schedulers.

Reference 1 and Reference 2 also provide non-limiting examples of the kinds of tasks that may be executed in TT systems, for example "RS-232 data transmission", "display updates" and "PID control" tasks, including full implementation details. Other examples of tasks may involve reading input data, performing calculations and generating outputs.

TT designs based on one or more processors can offer very predictable behaviour, making it comparatively easy to test and verify the correct operation of real-time computer systems that are based on such an architecture. This is one reason why TT designs are often used in safety-critical systems, high-integrity systems and in other products where system reliability and/or security are important design considerations.

FIG. 1 shows a conventional TT computer system 100 made up of a single processor (Processor-A) 101 that is executing a set of software tasks (in this case Task A 102, Task B 103, Task C 104 and Task D 105) according to a predetermined task schedule. For example, the tasks may be executed by a single processor core of Processor-A. In FIG. 1, the release of each sub-group of tasks (for example, Task A 102 and Task B 103) is triggered by what is usually called a "Timer Tick" 106. The Timer Tick is usually implemented by means of a periodic interrupt from a local timer. This timer will typically be part of Processor-A.

In FIG. 1, the Timer Ticks are periodic. In an aerospace application, a "Tick Interval" (that is, the time interval between Timer Ticks) of 25 ms might be used, but shorter Tick Intervals (e.g. 1 ms or less) are also used in many systems.

In FIG. 1, the task sequence executed by the computer system is as follows: Task A, Task C, Task B, Task D. In many designs, such a task sequence will be determined at design time (to meet the system requirements) and will be repeated "forever" when the system runs (until an error occurs, or the system is halted or powered down).

Sometimes it is helpful (for example, during the design process) to think of this task sequence as a "Tick List". Such a list lays out which task(s) will execute in each system "Tick", and the order in which these executions will occur. For example, the Tick List corresponding to the task set shown in FIG. 1 could be represented as follows:

[Tick 0]
Task A
Task C
[Tick 1]
Task B
Task D

Once the system reaches the end of the Tick List, it starts again at the beginning.

TT computer systems may employ several task schedules, for use in different system modes. For example, FIG. 2 shows a schematic representation of the software architecture 200 for an aircraft system with different system modes (201, 202, 203) corresponding to the different flight stages (preparing for takeoff, climbing to cruising height, preparing for landing etc).

The timing of the transition between system modes may not be known in advance (because, for example, the time taken for the plane shown in FIG. 2 to reach cruising height will vary with weather conditions), but this does not alter the design or implementation process. The key feature of all TT designs is that the tasks-whatever the system mode—are always released according to a schedule that is determined, validated and verified when the system is designed.

In any computer system that has to operate safely for periods of hours or even years without support or testing by a technically-qualified operator, automated monitoring and self-testing is required. Such testing is usually split into two categories: Power-On Self Tests (POSTs) and Built-In Self Tests (BISTs). In this specification, these conventional self-tests may be referred to as internal POSTs (iPOSTs) and internal BISTs (iBISTs). In this context, 'internal' means that the POST or BIST is carried out within the system by the processor or processor core concerned (that is, the processor or processor core tests itself).

As the name suggests, POSTs are performed when power is applied to a computer system. If the POSTs are completed successfully, then the system will begin operating. Periodically during the system operation, BISTs will be performed to ensure that the system is still capable of operating correctly. Reference 2 also provides further information about POSTs and BISTs An example of a conventional process 300 for performing POSTs and BISTs is illustrated in FIG. 3. In FIG. 3, power is applied to the processor in a first step 301. The system then performs POSTs in a second step 302. Performing such POSTs may involve a number of processor resets (if required).

If any of the POSTs fail which is determined in a third step 303, then the system—in this example—attempts to enter (and remain in) a Fail-Safe State at a fourth step 304. In such a state, it is assumed (for example) that all safety-related system outputs will be in a pre-determined configuration (e.g. 'Logic 0' in the case of digital outputs) in which the risk of harm to users of the system or those in the vicinity of the system is very low.

If all of the POSTs are passed, the system will begin to perform its normal operation in a fifth step 305. Periodically during the normal operation the system will check whether it needs to perform a BIST in a sixth step 306 and then perform any necessary BISTs in a seventh step 307. If a BIST fails which is determined in an eighth step 308, the system will again attempt to enter (and remain in) a Fail-Safe State in a ninth step 309. Each time a BIST is passed the system will perform a processor reset in a tenth step 310 and continue with its normal operation as indicated in the fifth step 305.

It will be appreciated that in a typical design the system will, after power is applied, keep operating until a fault is detected or power is removed from the system in a twelfth step 312.

It will also be appreciated that a single processor core of a processor may perform the steps discussed with respect to FIG. 3.

It will be appreciated that many POSTs and BISTs will typically result in the system performing one or more processor resets. Examples of such tests are discussed in Reference 2.

As an example of a typical BIST, it will be appreciated that TT computer systems that are based on single or multiple processors will usually use some form of internal watchdog timer (iWDT) on each processor or processor core to check that the scheduler on the processor is running. In these circumstances, a task will be released periodically by the scheduler to feed the iWDT. If the scheduler fails to run as expected and the iWDT is therefore not fed correctly, then the iWDT is expected to reset the processor. When the processor or processor core detects that it has been reset as a result of an iWDT overflow, it will typically attempt to move the system into a Fail-Safe State.

Given the role that the iWDT plays in TT computer systems, it is important that this component is tested periodically during the system operation. Such a test might for example involve disabling the interrupt source that drives the scheduler. It will be appreciated that a full test of the iWDT in this way is likely to result in the system performing a processor reset and entering a Fail-Safe State. A further processor reset may then be required to return the processor to a normal operating mode.

Overall, it will be appreciated that the purpose of POSTs and BISTs is to determine whether the processor or processor core under test is operating correctly.

It will also be appreciated that the 'self test' nature of POSTs and BISTs raises two key challenges: [i] if the processor (or processor core) is not operating correctly, a failed test may report that it has completed successfully, or the result of a failed test may be interpreted incorrectly; [ii] if failure of a POST or BIST is interpreted correctly, then the (faulty) processor (or processor core) may not be able to enter a Fail-Safe State (or implement any other form of shut down or fault-recovery behaviour that may be required).

The traditional approach to dealing with failure of POSTs or BISTs is to add a form of dynamic switch (sometimes called an 'external watchdog controller'-see Reference 2) to the system outputs. In a TT design, this dynamic switch will typically be fed from a task that is released by the scheduler (see Reference 2). If the dynamic-switch task is not released by the scheduler (or not released at the expected times) then the dynamic switch helps to ensure that all of the system outputs are held in a safe state.

It will be appreciated that the dynamic switch may be incorporated in a device such as a 'System Basis Chip' (SBC). Such SBCs will typically contain a watchdog element (an external watchdog controller) that is fed at pre-determined intervals by the processor or processor core that is being monitored. If the watchdog element is not fed at the correct time, the processor will be forced into a safe state. This is an implementation of what is referred to here as a dynamic switch. Note that such SBCs may also contain additional features (such as power-supply monitoring) as will be appreciated by a person skilled in the art.

The assumption is that it is possible to be highly confident that—in the event of failure of any iPOST or iBIST on the processor or processor core—this processor or processor core will be unable to refresh the dynamic switch.

An example of a conventional TT design 400 that employs a simple dynamic switch is shown schematically in FIG. 4. When operating normally, a processor (Processor-A) 401 feeds a (dynamic) Switch-A 408 by means of a pulse chain 409. In this example, this pulse chain is assumed to be generated by means of a task (released by the TT scheduler) that controls a digital output pin, setting it to 'Logic 1' and 'Logic 0' levels. As long as the resulting pulse chain has the frequency and duty cycle that is expected by the dynamic switch 408, then the switch will remain 'closed' and the system can operate normally.

It will be appreciated that, without loss of generality, the control of this digital switch could be implemented by means of periodic 'heartbeat' messages sent over a communication bus (such as an SPI bus) to a System Basis Chip or similar device.

In the example shown in FIG. 4, it is assumed that Processor-A 401 is responsible for keeping track of the flow of coolant through a pipe as part of a hydrogen fuel cell in an automotive system. If the rate of coolant falls below a pre-determined threshold the fuel cell 402 should be disabled by means of an Output-A interface 403. In the example, it is assumed that inadequate coolant flow may result in overheating of the fuel cell, with the possibility of a hydrogen fire or explosion.

The coolant flow rate will be determined by means of a sensor connected to a Digital-Input-A interface 406. It is assumed in this example that the flow rate is determined from a pulse chain that is generated by a suitable sensor and that a high pulse rate corresponds to a high (coolant) flow rate.

The threshold level can be also adjusted by means of this Digital-Input-A interface 406.

Processor-A 401 is also responsible for reporting the coolant flow rate over a CAN bus (to another system in the vehicle, such as the main Vehicle Control Unit) by means of a Comms-A1 interface 405. Processor-A 401 is also capable of monitoring (that is, reading back) messages that are sent on the CAN bus by Comms-A1 405 by means of the Comms-A2 interface 407.

Processor-A 401 is capable of monitoring its own digital outputs by means of feedback 404 from Digital-Output-A 403.

Processor-A 401 performs iPOSTs and iBISTs that (both) involve processor resets.

In this example, it is assumed that failure of an iPOST or iBIST will result in the system (task) scheduler being disabled. This will in turn mean that the sequence of pulses 409 that drive Switch-A 408 will be disabled. This will result in Switch-A (by means of its control output 410) [i] disabling Digital-Output-A (by means of its control input 411) and [ii] disabling Comms-A1 405 (by means of its control input 412). This behaviour is intended to ensure that Processor-A can neither enable the fuel cell nor report erroneous data over the CAN bus.

It will be appreciated that Switch-A 408 itself may need to be tested by means of iPOSTs and/or iBISTs. This is made possible by providing feedback 413 about the state of Switch-A 408 to Processor-A 401. This feedback link can be used to confirm that if the pulse chain 409 to Switch-A 408 is stopped (briefly) then Switch-A will 'open'.

Again, the steps discussed with respect to FIG. 4 may be carried out by a single processor core of a processor.

It will be appreciated that-when any form of iPOST or iBIST is performed—the processor or processor core concerned is testing itself. While use of a dynamic switch or similar mechanism should help to ensure that the system will (for example) enter a Fail-Safe State if a BIST fails, it may not always be possible to be confident that detection of processor (or processor core) failures based on a dynamic switch will be sufficient. It will be appreciated that this is the case because it is possible that a processor (or processor core) which fails a BIST (for example) will still be able to feed its dynamic switch.

In addition to the self-test nature of conventional POSTs and BISTs, it will also be appreciated that, in safety-related systems, two further issues need to be considered: [i] the nature of the tests to be performed (including the level of diagnostic coverage required); and [ii] the interval over which the BISTs need to be performed.

Turning first to the nature of the tests that need to be performed, it will be appreciated that the deterministic nature of TT designs makes it comparatively easy to model the operation of real-time computer systems that are based on such an architecture. This is a reason that TT designs are often used in safety-critical systems, high-integrity systems and in other products where system safety and/or reliability are important design considerations.

Processes for modelling TT designs are discussed in detail in Reference 2. As discussed in Reference 2, models of TT systems are necessarily based on various assumptions, including the following:

- the processor cores in the system operate correctly;
- the processors in the system operate correctly;
- the peripherals on each processor operate correctly;
- the processors are loaded with the correct software;
- the schedulers on each processor operate correctly;
- data can be transferred between tasks on the same processor without corruption;
- data can be transferred between processors without corruption;
- the tasks on each processor operate in compliance with their pre-determined 'Best Case Execution Time' (BCET) and 'Worst Case Execution Time' (WCET) limits; and
- the tasks on each processor in each operating mode are released in compliance with the pre-determined task sequence for this mode.

It will be appreciated that if any of these assumptions become invalid during the system operation, the system may not behave as expected in the field.

Some of the potential hazards and threats that may need to be considered are as follows:

- hardware failures that may result (for example) from electromagnetic interference, or from physical damage;
- residual software 'bugs' that may remain in the system even after test and verification processes are complete; and
- deliberate software change that may be introduced into the system, by means of 'computer viruses' and similar security-related attacks.

It will be appreciated that many conventional TT designs incorporate run-time monitoring that is intended to ensure that the assumptions summarised above remain valid while the system is operating, even in the presence of such hazards and threats. This process is discussed in Reference 2.

As an example of the kind of monitoring that is performed in conventional TT designs, an internal 'Task Execution-Time Monitoring Mechanism' (iTETMM) is employed in most systems. One purpose of the iTETMM is to check that, during normal operation of a system, none of the tasks in the system takes longer to execute than their pre-determined 'Worst-Case Execution Time' (WCET). It will be appreciated that the iTETMM is a key safety mechanism in many computer systems because failure of a task to complete its operation within the WCET limit may indicate a significant underlying problem with the system. It will also be appreciated that if, in normal operation, the iTETMM detects that a task has exceeded its pre-determined WCET, it is typically expected that the iTETMM will attempt to move the system into a Fail-Safe State.

It will be appreciated that, during normal system operation, the iTETMM will be employed (typically every time a task is released) to check that the task does not exceed its WCET limit.

It will also be appreciated that the iTETMM itself needs to be tested, usually by means of POSTs and BISTs. As part of these tests, a fault that will force a task to have an execution time greater than its pre-determined WCET may be injected. A consequence of this is that a full test of the iTETMM may result in the system entering a Fail-Safe State. A processor reset may then be required to return the processor to a normal operating mode.

Overall, it will be appreciated that during normal operation of a TT computer system, monitoring mechanisms such as the iTETMM need to be: [i] used (that is, monitoring needs to be performed); and [ii] tested (for example, the iTETMM needs to be the subject of POSTs and BISTs, otherwise there cannot be confidence that the monitoring process performed by this mechanism will be carried out correctly).

It will be appreciated that POSTs and BISTs take time to complete and if not handled with care performing such tests may disrupt the normal system operation.

For most TT designs, performing tests of mechanisms such as the iTETMM during POSTs is usually comparatively straightforward because the system will not be performing safety-related activities immediately after it is powered on. It is therefore usually acceptable to take a little time (perhaps even a few seconds) to fully test a system with POSTs.

While performing POSTs may be comparatively straightforward in many designs, the same cannot always be said for BISTs.

In order to understand the potential impact of BISTs on the normal operation of a system, it is necessary to consider the frequency with which tests of monitoring mechanisms (such as the iTETMM) need to be carried out.

It will be appreciated that international safety standards define a value that is called 'Process Safety Time' (PST) in IEC 61508:2010 (herein "Reference 3"), the entirety of which is hereby incorporated by reference, and 'Fault Tolerant Time Interval' (FTTI) in ISO 26262:2018 (herein "Reference 4"), the entirety of which is hereby incorporated by reference. To paraphrase, PST/FTTI refers to the time interval between the occurrence of a failure in a computer system that has the potential to give rise to a hazardous event and the time by which a preventive action has to be taken by the computer system in order to prevent the hazardous event from occurring. In this context a hazardous event is one that may—for example—result in injury or death to someone using the system.

In many designs, the PST/FTTI represents the time interval between a failure occurring and the system entering a Fail-Safe State. In a typical system, the PST/FTTI may be in the region of 100 ms as described in NXP (2018) "MWCT101×S Manual". Safety Document Number: MWCT101XSFSM Rev. 2, August 2018, the entirety of which is hereby incorporated by reference (herein "Reference 5").

It will be appreciated that in many systems, the designer will wish to ensure that a complete set of BISTs can be completed within the PST/FTTI, in order to be confident that the system will be able to detect faults and enter a Fail-Safe State (or a similar safe state) within this interval.

Performing a complete set of BISTs on all safety mechanisms in a conventional TT computer system within the PST/FTTI often presents two significant challenges.

The first challenge is the impact on the system outputs and on the wider system configuration.

Performing BISTs on a given processor or processor core will often involve performing a processor reset (see Reference 2). Such resets can disrupt the system inputs, outputs and any communication links to other devices. Disrupting the outputs can interfere with units that are being monitored or controlled by the computer system that is performing BISTs. In some cases, performing a reset on a single processor in a computer system may mean that an entire network needs to restart. For example, in the control system for the hydrogen fuel cell that is shown schematically in FIG. 4, the enable input for the fuel cell may 'flicker' during self tests, because some or all of the self tests will typically involve processor resets, and the state of Digital-Output-A 403 is likely to change when the processor is reset. Such flickering may be dangerous, not least because it may leave the fuel cell in an indeterminate state during the testing. If the tests are carried out infrequently (say once every 10 minutes or once per hour), it may be possible to deal with this situation. If a complete set of tests is to be carried out within the PST/FTTI, the fuel cell may be unusable.

The second challenge is the impact of the BISTs on the system responsiveness.

It will be appreciated that many real-time computer systems may need to respond to external events (for example, data arriving from a sensor) in a time scale measured in milliseconds. While the processor or processor core is performing a BIST (and possibly an associated processor reset) it will not generally be able to respond to such events. This can present a significant challenge when designing many computer systems.

For example, returning to the fuel-cell example that is presented schematically in FIG. 4, Processor-A 401 may miss pulses (obtained from Digital-Input-A 406) while the processor is reset. This may give rise to incorrect (low) measurements which may have safety implications. Also, the Comms-A1 connection 405 (and possibly Comms-A2 connection 407) may be lost during resets and may need to be re-established. This may take some time, during which the system may be unresponsive. Again, this may not be safe behaviour in all circumstances.

Because of the potential impact on the system outputs, the wider system configuration and the overall system responsiveness, meeting the requirement to complete all BISTs within the PST/FTTI (that is, within around 100 ms) is rarely practical in traditional TT computer systems. For example, Reference 2 acknowledges that a complete set of BISTs should be performed within the PST/FTTI limit but then suggests that practical considerations means that an interval of between 30 seconds and an hour is more likely to be employed in traditional designs.

In some cases, even longer time intervals are proposed. For example, it is sometimes considered in conventional computer systems that failures of monitoring mechanisms such as the iTETMM can be considered as 'latent faults' or 'dual-point' faults (or similar). The argument made in this situation is that failure of the iTETMM to detect that a task has overrun would require both that: [i] the task overruns (which is considered to be a fault); and [ii] the iTETMM fails simultaneously (which is considered to be a second fault). Based on such an analysis a second FTTI interval is proposed for such 'latent' fault situations: this is sometimes known as the L-FTTI.

Intervals of 12 hours are typically set for the L-FTTI (as in Reference 5). As journey times for passenger cars are often assumed to be around 1 hour and trucks or buses around 10 hours (see Reference 4, Part 5, Section 9.4.2.4), this is often interpreted as meaning that tests of monitoring mechanisms (like the iTETMM) need only be performed during POSTs and not (at all) during BISTs. While this is clearly a convenient assumption for the system developer, it is not always clear that it can be justified when making a safety case for the system.

To summarise: [i] TT computer systems have highly deterministic behaviour that can be modelled at design time; [ii] the assumptions that underpin these models need to be tested at run time by means of monitoring mechanisms such as the iTETMM; [iii] the monitoring mechanisms themselves need to be tested at run time by means of POSTs and BISTs; [iv] throughout the time that the system is operating, BISTs that cover all of the monitoring mechanisms should preferably be completed within the PST/FTTI (rather than the 'L-FTTI').

In conventional TT computer systems, two key challenges have been identified: [i] when any form of POST or BIST is performed, the processor or processor core concerned is testing itself and whilst use of a dynamic switch or similar watchdog mechanism should ensure that the system will enter a Fail-Safe State if the test fails, it may not always be possible to be confident that watchdog-based detection of processor failures will be sufficient; and [ii] if carried out frequently, conventional BISTs may severely disrupt the normal system operation and as a result performing such tests on all monitoring mechanisms within the PST/FTTI is rarely considered to be practical.

Overall, there is a widespread need to be able to support effective BISTs when developing computer systems with a TT architecture. The traditional process of performing BISTs in such designs opens up a number of potential reliability and safety loopholes.

It is an aim of the present invention to at least partly mitigate the above-mentioned problems.

It is an aim of certain embodiments of the present invention to improve the reliability and safety of TT computer systems.

It is an aim of certain embodiments of the present invention to improve the reliability and safety of TT computer systems by providing a framework that provides a very high level of diagnostic coverage at run time.

It is an aim of certain embodiments of the present invention to improve the reliability and safety of TT computer systems by providing a framework that provides a comprehensive solution to the problem of performing effective BISTs.

It is an aim of certain embodiments of the present invention to perform BISTs on a computer system within the PST/FTTI.

It is an aim of certain embodiments of the present invention to help ensure detection of a processor or processor core that is not operating correctly.

It is an aim of certain embodiments of the present invention to help ensure detection of processor software that is not operating correctly.

It is an aim of certain embodiments of the present invention to perform BISTs without having to disrupt the computer system by performing a processor reset.

It is an aim of certain embodiments of the present invention to independently monitor the results of POSTs and BISTs performed on a processor or processor core, to ensure the tests have been performed correctly and to determine whether the processor or processor core is operating correctly.

It is an aim of certain embodiments of the present invention to help ensure that a processor enters a Fail-Safe State if it is determined that the processor or a processor core is not operating correctly.

It is an aim of certain embodiments of the present invention to help ensure that a computer system enters a Fail-Safe State if it is determined that one or more processors or processor cores is not operating correctly.

It is an aim of certain embodiments of the present invention to help ensure that a computer system enters a Fail-Operational State if it is determined that one or more processors or processor cores is not operating correctly and at least one processor or processor core is operating correctly.

SUMMARY

According to a first aspect of the present invention there is provided a time-triggered computer system comprising:

at least one first processor that is adapted to:
- perform at least one first Power-On Self-Test, POST, and/or at least one first Built-In Self-Test, BIST; and
- transmit first data, that is indicative of results of at least one said first POST and/or said first BIST, to at least one second processor; and at least one second processor that is adapted to:
- compare the first data with second data, that is data indicative of expected results from at least one said first POST and/or said first BIST; and
- responsive to the comparison, determine if at least one said first POST and/or first BIST has passed or failed.

Aptly, the second processor is further adapted to:
- perform at least one second POST and/or at least one second BIST; and
- transmit third data, that is indicative of results of at least one said second POST and/or said second BIST to the first processor and/or to at least one third processor.

Aptly, the first processor and/or third processor is adapted to:
- compare the third data with fourth data, that is data indicative of expected results from at least one said second POST and/or said second BIST; and
- responsive to the comparison, determine if at least one said second POST and/or said second BIST has passed or failed.

Aptly, the first processor is further adapted to:
- execute one or more tasks according to a first predetermined task schedule.

Aptly, the second processor is further adapted to:
- execute one or more tasks according to a second predetermined task schedule.

Aptly, the first processor is further adapted to:
- execute one or more tasks according to a first predetermined task schedule; and the second processor is further adapted to:
- execute one or more tasks according to the first predetermined task schedule.

Aptly, the first processor is adapted to:
- perform said first POST;
- transmit data indicative of results of said first POST to the second processor;
- receive data indicative of results of at least one said second POST;
- compare the received data with data indicative of expected results from at least one said second POST;
- responsive to the comparison, determine if at least one said second POST has passed or failed; and
- responsive to determining that the at least one second POST has passed, operate in at least one predetermined system mode.

Aptly, in each predetermined system mode the first processor is adapted to:
- perform said first BIST;
- transmit data indicative of results of said first BIST to the second processor;
- receive data indicative of results of at least one said second BIST;
- compare the received data with data indicative of expected results from at least one said second BIST; and
- responsive to the comparison, determine if at least one said second BIST has passed or failed.

Aptly, in each predetermined system mode the first processor is further adapted to:
- execute one or more tasks according to a predetermined task schedule.

Aptly, the second processor is adapted to:
- perform said second POST;
- transmit data indicative of results of said second POST to the first processor;
- receive data indicative of results of at least one said first POST;

compare the received data with data indicative of expected results from at least one said first POST; and responsive to determining that the first POST has passed, operate in at least one predetermined system mode.

Aptly in each predetermined system mode the second processor is adapted to:

perform said second BIST;

transmit data indicative of results of said second BIST to the third processor and/or the first processor;

receive data indicative of results of at least one said first BIST;

compare the received data with data indicative of expected results from at least one said first BIST; and responsive to the comparison, determine if at least one said first BIST has passed or failed.

Aptly, in each predetermined system mode the second processor is further adapted to:

execute one or more tasks according to a predetermined task schedule.

Aptly, the second processor is adapted to:

responsive to determining that at least one said first POST and/or said first BIST has failed, place the computer system into a Fail-Safe State.

Aptly, the first processor is adapted to:

responsive to determining that at least one said second POST and/or said second BIST has failed, place the computer system into a Fail-Safe State.

Aptly, the first processor is adapted to:

perform a plurality of first POSTs; and transmit first data indicative of results of each of the first POSTs to the second processor.

Aptly, the second processor is adapted to:

compare the first data indicative of results of each of the first POSTs with second data indicative of expected results from each of the first POSTs; and responsive to the comparison, determine if each of the first POSTs has passed or failed.

Aptly, the first processor is adapted to:

perform a plurality of first BISTs; and transmit first data indicative of results of each of the first BISTs to the second processor.

Aptly, the second processor is adapted to:

compare the first data indicative of results of each of the first BISTs with second data indicative of expected results from each of the first BISTs; and responsive to the comparison, determine if each of the first BISTs has passed or failed.

Aptly, the second processor is adapted to:

perform a plurality of second POSTs; and transmit third data indicative of results of each of the second POSTs to the first processor and/or to at least one third processor.

Aptly, the first processor and/or third processor is adapted to:

compare the third data indicative of results of each of the second POSTs with fourth data indicative of expected results from each of the second POSTs; and responsive to the comparison, determine if each of the second POSTs has passed or failed.

Aptly, the second processor is adapted to:

perform a plurality of second BISTs; and transmit third data indicative of results of each of the second BISTs to the first processor and/or to a third processor.

Aptly, the first processor and/or the third processor is adapted to:

compare the third data indicative of results of each of the second BISTs with fourth data indicative of expected results from each of the second BISTs; and responsive to the comparison, determine if each of the second BISTs has passed or failed.

Aptly, the first processor is further adapted to:

transmit the first data via at least one first message transmitted over at least one communication channel.

Aptly, the second processor is further adapted to:

transmit the third data via at least one second message transmitted over at least one communication channel.

Aptly, the first processor is further adapted to:

perform at least one processor reset when performing at least one said first POST.

Aptly, the second processor is further adapted to:

perform at least one processor reset when performing at least one said second POST.

Aptly, the first processor is further adapted to:

perform at least one said first BIST without performing a processor reset.

Aptly, the first processor is further adapted to:

perform at least one processor reset when performing at least one said first BIST.

Aptly, the second processor is further adapted to:

perform at least one said second BIST without performing a processor reset.

Aptly, the second processor is further adapted to:

perform at least one processor reset when performing at least one said second BIST.

Aptly, the computer system further comprises:

at least one first input adapted to enable the first processor to receive data for tasks that execute on the first processor.

Aptly, the computer system further comprises:

at least one second input adapted to enable the second processor to receive data for tasks that execute on the second processor.

Aptly, the first input comprises one or more digital input pins on the first processor.

Aptly, the second input comprises one or more digital input pins on the second processor.

Aptly, the first input and/or the second input further comprises external interfacing hardware configured to adapt voltages in the computer system environment to meet voltage requirements of the digital input pins.

Aptly, the first input comprises one or more analogue input pins on the first processor.

Aptly, the second input comprises one or more analogue input pins on the second processor.

Aptly, the first input and/or the second input further comprises external interfacing hardware configured to adapt voltages in the computer system environment to meet voltage requirements of the analogue input pins and provide any necessary filtering of input signals.

Aptly, the first input and/or the second input comprises a software and hardware interface to one or more serial communication buses (such as CAN or Ethernet or RS-232' or SPI).

Aptly, the communication channel is a communication channel enabling the bi-directional transmission of data between the first processor and the second processor.

Aptly, the communication channel is used to synchronise activities on the first processor and the second processor using a form of Shared-Clock Scheduler.

Aptly, data transfers between the first processor and the second processor are supported by means of Tick Messages sent from the first processor to the second processor, or vice versa.

Aptly, data transfers between the second processor and the first processor are supported by means of Ack Messages sent from the second processor to the first processor, or vice vera.

Aptly, the communication channel comprises a standard serial protocol that is suitable for short-distance communication, such as 'RS-232' or SPI.

Aptly, the computer system further comprises:

at least one first output adapted to enable the first processor to generate outputs from the computer system.

Aptly, the first output is adapted to be set to a Fail-Safe-State if the first processor determines that the second processor has failed at least one said second POST.

Aptly, the first output is adapted to be set to a Fail-Safe-State if the first processor determines that the second processor has failed at least one said second BIST.

Aptly, the computer system further comprises:

at least one second output adapted to enable the second processor to generate outputs from the computer system.

Aptly, the second output is adapted to be set to a Fail-Safe-State if the second processor determines that the first processor has failed at least one said first POST.

Aptly, the second output is adapted to be set to a Fail-Safe-State if the second processor determines that the first processor has failed at least one said first BIST.

Aptly, the first processor is adapted to:

continue generating outputs from the first output for a predetermined time period after determining that the second processor has failed at least one said second POST and/or said second BIST.

Aptly, the second processor is adapted to:

continue generating outputs from the second output for a predetermined time period after determining that the first processor has failed at least one said first POST and/or said first BIST.

Aptly, the first output and/or the second output comprises a software and hardware interface to one or more serial communication buses (such as CAN or Ethernet or RS-232' or SPI).

Aptly, a Fail-Safe State on at least one communication bus means that no messages are sent by the first processor and/or the second processor on that bus.

Aptly, the first output comprises one or more digital output pins on the first processor.

Aptly, the first output further comprises external interfacing hardware configured to adapt voltages in the computer system environment to meet voltage requirements of the digital output pins.

Aptly, a Fail-Safe State on at least one of the digital output pins of the first output is a 0V output.

Aptly, the first output comprises at least one analogue output pin on the first processor.

Aptly, the first output further comprises external interfacing hardware configured to adapt voltages in the computer system environment to meet voltage requirements of the analogue output pins and provide any necessary filtering of output signals.

Aptly, a Fail-Safe State on at least one analogue output pin of the first output is a 0V output.

Aptly, the second output comprises one or more digital output pins on the second processor.

Aptly, the second output further comprises external interfacing hardware configured to adapt voltages in the computer system environment to meet voltage requirements of the digital output pins.

Aptly, a Fail-Safe State on at least one of the digital output pins of the second output is a 0V output.

Aptly, the second output comprises at least one analogue output pin on the second processor.

Aptly, the second output further comprises external interfacing hardware configured to adapt voltages in the computer system environment to meet voltage requirements of the analogue output pins and provide any necessary filtering of output signals.

Aptly, a Fail-Safe State on at least one analogue output pin of the second output is a 0V output.

Aptly, the computer system further comprises:

at least one first control element associated with the first processor adapted to ensure that safety-related outputs from the first output and/or second output are held in a safe state.

Aptly, the first control element ensures that safety-related outputs from the first output and/or second output are held in a safe state if the first processor determines that the first processor and/or the second processor is not operating correctly.

Aptly, the computer system further comprises:

at least one second control element associated with the second processor adapted to ensure that safety-related outputs from the first output and/or the second output are held in a safe state.

Aptly, the second control element ensures that safety-related outputs from the first output and/or second output are held in a safe state if the second processor determines that the first processor and/or the second processor is not operating correctly.

Aptly, the second control element is adapted to be set to a Fail-Safe-State if the second processor determines that the first processor has failed at least one said first POST.

Aptly, the second control element is adapted to be set to a Fail-Safe-State if the second processor determines that the first processor has failed at least one said first BIST.

Aptly, the first control element comprises one or more digital switches that provide a means of disabling one or more digital output pins on the first processor and/or the second processor.

Aptly, a Fail-Safe State on at least one of the digital output pins on the first processor and/or second processor is a 0V output.

Aptly, the first control element comprises one or more analogue switches that provide a means of disabling one or more analogue output pins on the first processor and/or the second processor.

Aptly, a Fail-Safe State on at least one of the analogue output pins on the first processor and/or second processor is a 0V output.

Aptly, the first control element comprises one or more digital switches that provide a means of disabling transceivers that provide a link to one or more serial communication buses (such as CAN or Ethernet or RS-232' or SPI). This allows the first processor to prevent the first processor and/or the second processor from sending any messages on that communication bus when the first control element is in a Fail-Safe State.

Aptly, the second control element comprises one or more digital switches that provide a means of disabling one or more digital output pins on the first processor and/or the second processor.

Aptly, a Fail-Safe State on at least one of the digital output pins on the first processor and/or the second processor is a 0V output.

Aptly, the second control element comprises one or more analogue switches that provide a means of disabling one or more analogue output pins on the first processor and/or the second processor.

Aptly, a Fail-Safe State on at least one of the analogue output pins on the first processor and/or the second processor is a 0V output.

Aptly, the second control element comprises one or more digital switches that provide a means of disabling transceivers that provide a link to one or more serial communication buses (such as CAN or Ethernet or RS-232' or SPI). This allows the second processor to prevent the first processor and/or the second processor from sending any messages on that communication bus when the first control element is in a Fail-Safe State.

Aptly, the computer system further comprises:

a system output logic element adapted to determine at least one output from the computer system based on a combination of outputs from the first output and the second output.

Aptly, the system output logic element comprises an OR logic operation for combining digital outputs from the first output and the second output.

Aptly, the system output logic element comprises an XOR logic operation for combining digital outputs from the first output and the second output.

Aptly, the system output logic element comprises one or more analogue switches that provide a means of combining analogue outputs from the first output and the second output. This ensures that only the first processor or the second processor (and not both) generates analogue outputs at any given time.

Aptly, the system output logic element comprises one or more digital switches that provide a means of disabling transceivers that provide a link to one or more serial communication buses (such as CAN or Ethernet or RS-232' or SPI). This ensures that only the first processor or the second processor (and not both) can send messages on said communication buses at any time.

Aptly, at least one output from the system output logic element is adapted to be set to a Fail-Safe-State if the first processor determines that the second processor has failed at least one said second POST and that the second processor has failed to enter a Fail-Safe State after failing said second POST.

Aptly, at least one output from the system output logic element is adapted to be set to a Fail-Safe-State if the first processor determines that the second processor has failed at least one second BIST and that the second processor has failed to enter a Fail-Safe State after failing said second BIST.

Aptly, at least one output from the system output logic element is adapted to be set to a Fail-Safe-State if the second processor determines that the first processor has failed at least one said first POST and that the first processor has failed to enter a Fail-Safe State after failing said first POST.

Aptly, at least one output from the system output logic element is adapted to be set to a Fail-Safe-State if the second processor determines that the first processor has failed at least one said first BIST and that the first processor has failed to enter a Fail-Safe State after failing said first BIST.

Aptly, a Fail-Safe State on at least one digital output pin of system output logic element comprises a 0V output.

Aptly, a Fail-Safe State on at least one analogue output pin of system output logic element comprises a 0V output.

Aptly, a Fail-Safe State on at least one serial communication bus (such as CAN or Ethernet or RS-232' or SPI) that form part of the system output logic element comprises a state in which neither the first processor nor the second processor can send any messages on said communication bus.

Aptly, the computer system further comprises:

a system output logic element adapted to determine at least one output from the computer system based on a combination of outputs from the first output and the second output and the first control element and the second control element.

Aptly, the computer system further comprises:

a system output adapted to generate at least one output from the computer system based on the determination by the system output logic element.

Aptly, the system output comprises one or more digital output pins.

Aptly, the system output further comprises external interfacing hardware configured to adapt voltages in the computer system environment to meet voltage requirements of the digital output pins.

Aptly, a Fail-Safe State on at least one of the digital output pins of system output comprises a 0V output.

Aptly, the system output comprises one or more analogue output pins.

Aptly, the system output further comprises external interfacing hardware configured to adapt voltages in the computer system environment to meet voltage requirements of the analogue output pins and provide any necessary filtering of output signals.

Aptly, a Fail-Safe State on at least one of the analogue output pins of system output comprises a 0V output.

Aptly, the system output comprises a software and hardware interface to one or more serial communication buses (such as CAN or Ethernet or RS-232' or SPI).

Aptly, a Fail-Safe State on at least one communication bus means that no messages are sent by the computer system on the respective bus.

Aptly, the computer system further comprises:

at least one first monitor element associated with the first processor adapted to determine whether said first output and/or said second output and/or said system output and/or said first control element and/or said second control element is in a required state.

Aptly, the computer system further comprises:

at least one second monitor element associated with the second processor adapted to determine whether said first output and/or said second output and/or said system output and/or said first control element and/or said second control element is in a required state.

Aptly, the first monitor element comprises one or more digital input pins on the first processor.

Aptly, the first monitor element is connected to one or more digital output pins of the first output and/or the second output and/or the system output and/or the first control element and/or the second control element.

Aptly, the first monitor element further comprises external interfacing hardware configured to adapt voltages in the computer system environment to meet voltage requirements of the digital input pins on the first processor.

Aptly, the first monitor element comprises one or more analogue input pins on the first processor.

Aptly, the first monitor element is connected to one or more analogue output pins of the first output and/or the second output and/or the system output and/or the first control element and/or the second control element.

Aptly, the first monitor element further comprises external interfacing hardware configured to adapt voltages in the computer system environment to meet voltage requirements of the analogue input pins on the first processor.

Aptly, the first monitor element comprises a software and hardware interface to one or more communication buses (such as CAN or Ethernet or 'RS-232' or SPI) that are connected to the first processor and/or second processor in a manner that allows the first processor to monitor any communications on the one or more communication buses.

Aptly, the second monitor element comprises one or more digital input pins on the second processor.

Aptly, the second monitor element is connected to one or more digital output pins of the first output and/or the second output and/or the system output and/or the first control element and/or the second control element.

Aptly, the second monitor element further comprises external interfacing hardware configured to adapt voltages in the computer system environment to meet voltage requirements of the digital input pins on the second processor.

Aptly, the second monitor element comprises one or more analogue input pins on the second processor.

Aptly, the second monitor element further comprises external interfacing hardware configured to adapt voltages in the computer system environment to meet voltage requirements of the analogue input pins on the second processor.

Aptly, the second monitor element comprises a software and hardware interface to one or more communication buses (such as CAN or Ethernet or 'RS-232' or SPI) that are connected to the first processor and/or second processor in a manner that allows the second processor to monitor any communications on the one or more communication buses.

Aptly, the first processor is further adapted to:
- determine if the first processor is operating correctly by determining that said first POST and/or said first BIST has passed; and
- determine if the second processor is operating correctly by determining said second POST and/or said second BIST has passed; and
- generate outputs if the first processor determines the first processor and the second processor are operating correctly.

Aptly, the second processor is further adapted to:
- determine if the second processor is operating correctly by determining that said second POST and/or said second BIST has passed; and
- determine if the first processor is operating correctly by determining said first POST and/or said first BIST has passed; and
- generate outputs if the second processor determines the first processor and the second processor are operating correctly.

Aptly, a sequence of first POSTs performed on the first processor is pre-determined.

Aptly, the second processor is adapted to:
- determine if the first POSTs follow the pre-determined sequence; and
- indicate failure of one or more POSTS of the first POSTs that do not follow this predetermined sequence.

Aptly, a time interval between respective first POSTs that are performed on the first processor is pre-determined.

Aptly, the second processor is adapted to:
- determine if the respective first POSTs are performed at a correct time based on the predetermined time interval; and
- indicate failure of one or more POSTs of the first POSTs that are not performed at the correct time.

Aptly, a sequence of second POSTs performed on the second processor is pre-determined.

Aptly, the first processor is adapted to:
- determine if the second POSTs follow the pre-determined sequence; and
- indicate failure of one or more POSTs of the second POSTs that do not follow this predetermined sequence.

Aptly, a time interval between respective second POSTs that are performed on the second processor is pre-determined.

Aptly, the first processor is adapted to:
- determine if the respective second POSTs are performed at a correct time based on the predetermined time interval; and
- indicate failure of one or more POSTs of the second POSTs that are not performed at the correct time.

Aptly, a sequence of first BISTs performed on the first processor is pre-determined.

Aptly, the second processor is adapted to:
- determine if the first BISTs follow the pre-determined sequence; and
- indicate failure of one or more BISTs of the first BISTs that do not follow this predetermined sequence.

Aptly, the predetermined sequence of first BISTs performed on the first processor is the same in each operating mode of the first processor.

Aptly, a time interval between respective first BISTs performed on the first processor is pre-determined.

Aptly, the second processor is adapted to:
- determine if the respective first BISTs are performed at a correct time based on the predetermined time interval; and
- indicate failure of one or more BISTs of the first BISTs that are not performed at the correct time.

Aptly, the predetermined time interval between respective first BISTs performed on the first processor is the same in each operating mode of the first processor.

Aptly, a sequence of second BISTs performed on the second processor is pre-determined.

Aptly, the first processor is adapted to:
- determine if the second BISTs follow the pre-determined sequence; and
- indicate failure of one or more BISTs of the second BISTs that do not follow this predetermined sequence.

Aptly, the predetermined sequence of second BISTs performed on the second processor is the same in each operating mode of the second processor.

Aptly, a time interval between respective second BISTs performed on the second processor is pre-determined.

Aptly, the first processor is adapted to:
- determine if the respective second BISTs are performed at a correct time based on the predetermined time interval; and
- indicate failure of one or more BISTs of the second BISTs that are not performed at the correct time.

Aptly, the predetermined time interval between respective second BISTs performed on the second processor is the same in each operating mode of the second processor.

Aptly, the first processor and/or the second processor comprises a time-triggered scheduler.

Aptly, the first processor and/or the second processor comprises a time triggered cooperative (TTC) scheduler or a time triggered hybrid (TTH) scheduler.

Aptly, the computer system is arranged to monitor the operation of the first processor by means of the second processor.

Aptly, the computer system is arranged to monitor the operation of the second processor by means of the first processor.

Aptly, the first processor and the second processor are the same type of processor.

Aptly, the first processor and the second processor are processors of a different type.

Aptly, different types of processor for the first processor and the second processor are used in designs that are classed as 'Safety Integrity Level' (SIL) 3 or 4.

Aptly, the first processor and the second processor comprises one or more "soft" or "hard" processor cores (that execute some software) and/or one or more hardware cores (that do not execute any software).

Aptly, the first processor and/or the second processor comprises one or more processor chips, such as a commercial-off-the-shelf (COTS) microcontroller or microprocessor, Digital Signal Processor (DSP), Field-Programmable Gate Array (FPGA), Application Specific Integrated Circuit (ASIC) or similar devices.

Aptly, the first processor and/or the second processor comprises one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

Aptly, the first processor is further adapted to:

perform at least one first monitoring process for monitoring that the first processor is operating correctly; and perform said first POST and/or first BIST on the first monitoring process.

Aptly, the first monitoring process is a Task Execution Time Monitoring Mechanism (TETMM) or is a mechanism for checking the task execution sequence (as documented in Reference 2), or is a mechanism for checking the operation of analogue-to-digital converters, or is a mechanism for checking the clock frequency of the first processor, or is a mechanism for performing checks on the ability of the first processor to execute its defined instruction set, or is a mechanism for checking duplicated variables (as defined in Reference 2) that are employed in the first processor, or is a mechanism for checking the operating voltage of the first processor, or is a mechanism for checking the operating temperature of the first processor, or is a mechanism for checking the operation of one or more external watchdog controllers (see Reference 2) that are connected to the first processor, or is a mechanism for checking the operation of the interrupts on the first processor, or is a mechanism for checking the operation of a watchdog timer that is incorporated in the first processor or is external to the first processor, or is a mechanism for checking the memory in the first processor, or is a mechanism for checking for corruption in the registers in the first processor, or is a mechanism for checking for corruption in the software configuration in the first processor, or is a mechanism for checking for corruption in the stack in the first processor, or is a mechanism for performing timeout checks during the operation of the first processor (as defined in Reference 2).

Aptly, the first processor is further adapted to:

perform a plurality of first BISTs on the first monitoring process;

wherein a sequence of first BISTs and a time interval between respective first BISTs performed on the first monitoring process is predetermined.

Aptly, the first processor is further adapted to:

perform said plurality of first BISTs on the first monitoring process within a first predetermined time period.

Aptly, the first processor is further adapted to:

perform said first monitoring process within the first predetermined time period.

Aptly, the first predetermined time period is the Process Safety Time or Fault Tolerant Time Interval.

Aptly, the first predetermined time period is equal to or less than 100 ms.

Aptly, the first predetermined time period is equal to or less than 90 ms, optionally 80 ms, optionally 70 ms, optionally 60 ms, optionally 50 ms, optionally 40 ms, optionally 30 ms, optionally 20 ms, optionally 10 ms.

Aptly, the second processor is further adapted to:

perform at least one second monitoring process for monitoring that the second processor is operating correctly; and perform at least one second POST and/or at least one second BIST on the second monitoring process.

Aptly, the second monitoring process is a Task Execution Time Monitoring Mechanism (TETMM) or is a mechanism for checking the task execution sequence (as documented in Reference 2), or is a mechanism for checking the operation of analogue-to-digital converters, or is a mechanism for checking the clock frequency of the second processor, or is a mechanism for performing checks on the ability of the second processor to execute its defined instruction set, or is a mechanism for checking duplicated variables (as defined in Reference 2) that are employed in the second processor, or is a mechanism for checking the operating voltage of the second processor, or is a mechanism for checking the operating temperature of the second processor, or is a mechanism for checking the operation of one or more external watchdog controllers (see Reference 2) that are connected to the second processor, or is a mechanism for checking the operation of the interrupts on the second processor, or is a mechanism for checking the operation of a watchdog timer that is incorporated in the second processor or is external to the second processor, or is a mechanism for checking the memory in the second processor, or is a mechanism for checking for corruption in the registers in the second processor, or is a mechanism for checking for corruption in the software configuration in the second processor, or is a mechanism for checking for corruption in the stack in the second processor, or is a mechanism for performing timeout checks during the operation of the second processor (as defined in Reference 2).

Aptly, the second processor is further adapted to:

perform a plurality of second BISTs on the second monitoring process;

wherein a sequence of second BISTs and a time interval between respective second BISTs performed on the second monitoring process is predetermined.

Aptly, the second processor is further adapted to:

perform said plurality of second BISTs on the second monitoring process within a second predetermined time period.

Aptly, the second processor is further adapted to:

perform said second monitoring process within the second predetermined time period.

Aptly, the second predetermined time period is the Process Safety Time or Fault Tolerant Time Interval.

Aptly, the second predetermined time period is equal to or less than 100 ms.

Aptly, the second predetermined time period is equal to or less than 90 ms, optionally 80 ms, optionally 70 ms, optionally 60 ms, optionally 50 ms, optionally 40 ms, optionally 30 ms, optionally 20 ms, optionally 10 ms.

According to a second aspect of the present invention there is provided a computer-implemented method for determining if at least one Power-On Self-Test and/or Built-in Self-Test has passed or failed, comprising the steps of:

performing, on at least one first processor, at least one first Power-On Self-Test, POST, and/or at least one first Built-In Self-Test, BIST;

transmitting, by the first processor, first data that is indicative of results of at least one said first POST and/or said first BIST, to at least one second processor;

comparing, by the second processor, the first data with second data, that is data indicative of expected results from at least one said first POST and/or said first BIST; and responsive to the comparing, determining, by the second processor, if at least one said first POST and/or said first BIST has passed or failed.

Aptly, the method further comprises:

performing, by the second processor, at least one second POST and/or at least one second BIST; and transmitting third data, that is indicative of results of at least one said second POST and/or said second BIST to the first processor and/or to at least one third processor.

Aptly, the method further comprises:

comparing, by the first processor and/or the third processor, the third data with fourth data, that is data indicative of expected results from at least one said second POST and/or said second BIST; and responsive to comparing the third data with the fourth data, determining, by the first processor and/or the third processor, if at least one said second POST and/or said second BIST has passed or failed.

Aptly, the method further comprises:

performing, by the first processor, said first POST;

transmitting, by the first processor, data indicative of results of said first POST to the second processor;

receiving, by the first processor, data indicative of results of at least one said second POST;

comparing, by the first processor, the received data with data indicative of expected results from at least one said second POST;

responsive to the comparing, determining if at least one said second POST has passed or failed; and responsive to determining that the at least one second POST has passed, operating in at least one predetermined system mode.

Aptly, the method further comprises, in each predetermined system mode:

performing, by the first processor, said first BIST;

transmitting, by the first processor, data indicative of results of said first BIST to the second processor;

receiving, by the first processor, data indicative of results of at least one said second BIST;

comparing, by the first processor, the received data with data indicative of expected results from at least one said second BIST; and responsive to the comparing, determining if at least one said second BIST has passed or failed.

Aptly, the method further comprises, in each predetermined system mode:

executing, by the first processor, one or more tasks according to a predetermined task schedule.

Aptly, the method further comprises:

performing, by the second processor, said second POST;

transmitting, by the second processor, data indicative of results of said second POST to the first processor;

receiving, by the second processor, data indicative of results of at least one said first POST;

comparing, by the second processor, the received data with data indicative of expected results from at least one said first POST;

responsive to the comparing, determining if at least one said first POST has passed or failed; and responsive to determining that the at least one first POST has passed, operating in at least one predetermined system mode Aptly, the method further comprises, in each predetermined system mode:

performing, by the second processor, said second BIST;

transmitting, by the second processor, data indicative of results of said second BIST to the third processor and/or the first processor;

receiving, by the second processor, data indicative of results of at least one said first BIST;

comparing, by the second processor, the received data with data indicative of expected results from at least one said first BIST; and responsive to the comparing, determining if at least one said first BIST has passed or failed.

Aptly, the method further comprises, in each predetermined system mode:

executing, by the second processor, one or more tasks according to a predetermined task schedule.

Aptly, the method further comprises:

responsive to determining that at least one said first POST and/or said first BIST has failed, placing, by the second processor, the computer system into a Fail-Safe State.

Aptly, the method further comprises:

responsive to determining that at least one said second POST and/or said second BIST has failed, placing, by the first processor, the computer system into a Fail-Safe State.

Aptly, the method further comprises:

performing, by the first processor, at least one first monitoring process for monitoring that the first processor is operating correctly; and performing, by the first processor, said first POST and/or first BIST on the first monitoring process.

Aptly, the first monitoring process is a Task Execution Time Monitoring Mechanism (TETMM) or is a mechanism for checking the task execution sequence (as documented in Reference 2), or is a mechanism for checking the operation of analogue-to-digital converters, or is a mechanism for checking the clock frequency of the first processor, or is a mechanism for performing checks on the ability of the first processor to execute its defined instruction set, or is a mechanism for checking duplicated variables (as defined in Reference 2) that are employed in the first processor, or is a mechanism for checking the operating voltage of the first processor, or is a mechanism for checking the operating temperature of the first processor, or is a mechanism for checking the operation of one or more external watchdog controllers (see Reference 2) that are connected to the first processor, or is a mechanism for checking the operation of the interrupts on the first processor, or is a mechanism for checking the operation of a watchdog timer that is incorporated in the first processor or is external to the first processor, or is a mechanism for checking the memory in the first processor, or is a mechanism for checking for corruption in the registers in the first processor, or is a mechanism for checking for corruption in the software configuration in the first processor, or is a mechanism for checking for corruption in the stack in the first processor, or is a mechanism for performing timeout checks during the operation of the first processor (as defined in Reference 2).

Aptly, the method further comprises:

performing, by the first processor, a plurality of first BISTs on the first monitoring process;

wherein a sequence of first BISTs and a time interval between respective first BISTs performed on the first monitoring process is predetermined.

Aptly, the method further comprises:

performing, by the first processor, said plurality of first BISTs on the first monitoring process within a first predetermined time period.

Aptly, the method further comprises:

performing, by the first processor, said first monitoring process within the first predetermined time period.

Aptly, the first predetermined time period is the Process Safety Time or Fault Tolerant Time Interval.

Aptly, the first predetermined time period is equal to or less than 100 ms.

Aptly, the first predetermined time period is equal to or less than 90 ms, optionally 80 ms, optionally 70 ms, optionally 60 ms, optionally 50 ms, optionally 40 ms, optionally 30 ms, optionally 20 ms, optionally 10 ms.

Aptly, the method further comprises:

performing, by the second processor, at least one second monitoring process for monitoring that the second processor is operating correctly; and performing, by the second processor, at least one second POST and/or at least one second BIST on the second monitoring process.

Aptly, the second monitoring process is a Task Execution Time Monitoring Mechanism (TETMM) or is a mechanism for checking the task execution sequence (as documented in Reference 2), or is a mechanism for checking the operation of analogue-to-digital converters, or is a mechanism for checking the clock frequency of the second processor, or is a mechanism for performing checks on the ability of the second processor to execute its defined instruction set, or is a mechanism for checking duplicated variables (as defined in Reference 2) that are employed in the second processor, or is a mechanism for checking the operating voltage of the second processor, or is a mechanism for checking the operating temperature of the second processor, or is a mechanism for checking the operation of one or more external watchdog controllers (see Reference 2) that are connected to the second processor, or is a mechanism for checking the operation of the interrupts on the second processor, or is a mechanism for checking the operation of a watchdog timer that is incorporated in the second processor or is external to the second processor, or is a mechanism for checking the memory in the second processor, or is a mechanism for checking for corruption in the registers in the second processor, or is a mechanism for checking for corruption in the software configuration in the second processor, or is a mechanism for checking for corruption in the stack in the second processor, or is a mechanism for performing timeout checks during the operation of the second processor (as defined in Reference 2).

Aptly, the method further comprises:

performing, by the second processor, a plurality of second BISTs on the second monitoring process;

wherein a sequence of second BISTs and a time interval between respective second BISTs performed on the second monitoring process is predetermined.

Aptly, the method further comprises:

performing, by the second processor, said plurality of second BISTs on the second monitoring process within a second predetermined time period.

Aptly, the method further comprises:

performing, by the second processor, said second monitoring process within the second predetermined time period.

Aptly, the second predetermined time period is the Process Safety Time or Fault Tolerant Time Interval.

Aptly, the second predetermined time period is equal to or less than 100 ms.

Aptly, the second predetermined time period is equal to or less than 90 ms, optionally 80 ms, optionally 70 ms, optionally 60 ms, optionally 50 ms, optionally 40 ms, optionally 30 ms, optionally 20 ms, optionally 10 ms.

According to a third aspect of the present invention there is provided a computer program comprising instructions which, when executed by a computer, cause the computer to carry out the steps of the method according to the second aspect of the present invention.

According to a fourth aspect of the present invention there is provided a time-triggered computer system comprising:

a Processor-A adapted to perform a series of ePOSTs which may involve a processor reset and to report data from each ePOST to Processor-M by means of ePOST-Data-A messages that are transmitted over a Communication Channel as part of one or more messages sent between Processor-A and Processor-M, and to compare the contents of ePOST-Data-M messages sent by Processor-M over a Communication Channel as part of one or more messages sent between Processor-M and Processor-A with the expected results from each of those ePOSTs, and then to operate in one of one or more pre-determined system modes, in each of which it may perform one or more eBISTs without performing a processor reset and report data from each eBIST to Processor-M by means of eBIST-Data-A messages that are transmitted over a Communication Channel as part of one or more messages sent between Processor-A and Processor-M, and in each of which it may compare the contents of eBIST-Data-M messages sent by Processor-M over a Communication Channel as part of one or more messages sent between Processor-M and Processor-A with the expected results from each of those eBISTs, and in each of which it may perform one or more eBISTs that include performing a processor reset, and in each of which it may execute one or more tasks according to a predetermined task schedule; and a Processor-M adapted to perform a series of ePOSTs which may involve a processor reset and to report data from each ePOST to Processor-A by means of ePOST-Data-M messages that are transmitted over a Communication Channel as part of one or more messages sent between Processor-M and Processor-A, and to compare the contents of ePOST-Data-M messages sent by Processor-M over a Communication Channel as part of one or more messages sent between Processor-M and Processor-A with the expected results from each of those ePOSTs, and then to operate in one of one or more pre-determined system modes, in each of which it may perform one or more eBISTs without performing a processor reset and report data from each eBIST to Processor-A by means of eBIST-Data-M messages sent over a Communication Channel and in each of which it may compare the contents of eBIST-Data-A messages sent by Processor-A over a Communication Channel with the expected results from each of those eBISTs, and in each of which it may perform one or more eBISTs that include performing a processor reset; and a Communication Channel adapted to support the transmission of messages between Processor-A and Processor-M, and to support the transmission of messages between Processor-M and Processor-A; and an Input-A adapted to enable Processor-A to acquire data for any tasks that execute on Processor-A; and an Output-A adapted to enable Processor-A to generate any safety-related outputs from the computer system that have been determined by Processor-A if—by means of tasks, self tests and Monitor-A—Processor-A determines that it is operating correctly and if—by means of tasks and eBIST-Data-M messages—Processor-A determines that Processor-M is also operating correctly); and a Monitor-A adapted to enable Processor-A to determine whether Output-A is in its required state; and a Control-M adapted to ensure that any and all safety-related outputs from the computer system are held in a safe state if—by means of eBIST-Data-A messages—Processor-M determines that Processor-A may not be operating correctly, or if—by means of self tests or Monitor-M—Processor-M determines that it may not be operating correctly; and a Monitor-M adapted to enable Processor-M to determine whether Control-M is in its required state.

Aptly, the Processor-A comprises one or more "soft" or "hard" processor cores (that execute some software) and/or one or more hardware cores (that do not execute any software).

Aptly, the Processor-A comprises one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

Aptly, the Processor-A comprises a time-triggered scheduler.

Aptly, Processor-A comprises a time triggered cooperative (TTC) scheduler or a time triggered hybrid (TTH) scheduler.

Aptly, the Processor-M monitors the operation of Processor-A.

Aptly, the Processor-M comprises one or more "soft" or "hard" processor cores (that execute some software) and/or one or more hardware cores (that do not execute any software).

Aptly, the Processor-M comprises one or more processor chips, such as a commercial-off-the-shelf (COTS) microcontroller or microprocessor, Digital Signal Processor (DSP), Field-Programmable Gate Array (FPGA), Application Specific Integrated Circuit (ASIC) or similar devices.

Aptly, the Processor-M comprises one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

Aptly, the Processor-M comprises a time-triggered scheduler.

Aptly, Processor-M comprises a time triggered cooperative (TTC) scheduler or a time triggered hybrid (TTH) scheduler.

Aptly, the Processor-M checks the results of ePOSTs and eBISTs that are performed on Processor-A while Processor-A checks the results of ePOSTs and eBISTs that are performed on Processor-M.

Aptly, the Processor-A performs ePOSTs (that may involve a processor reset) and reports data from each ePOST to the Processor-M by means of the ePOST-Data-A messages that are sent over a Communication Channel; and Processor-M then compares the contents of each ePOST-Data-A message with the expected results of the corresponding ePOST; by means of this comparison, Processor-M determines whether the ePOST performed on Processor-A has passed or has failed.

Aptly, the Processor-A will perform eBISTs during its normal operation that do not require processor resets and will report data from each eBIST to Processor-M by means of eBIST-Data-A messages that are sent over a Communication Channel; Processor-M will then compare the contents of each eBIST-Data-A message with the expected results of the corresponding eBIST; by means of this comparison, Processor-M will determine whether the eBIST performed on Processor-A has passed or has failed.

Aptly, the Processor-A performs one or more eBISTs that include performing a processor reset.

Aptly, the Processor-M will perform ePOSTs (that may involve a processor reset) and will report data from each ePOST to Processor-A by means of ePOST-Data-M messages that are sent over a Communication Channel;

Processor-A will then compare the contents of each ePOST-Data-M message with the expected results of the corresponding ePOST; by means of this comparison, Processor-A will determine whether the ePOST performed on Processor-M has passed or has failed.

Aptly, the Processor-M will perform eBISTs during its normal operation that do not require processor resets and will report data from each eBIST to Processor-A by means of eBIST-Data-M messages that are sent over a Communication Channel; Processor-A will then compare the contents of each eBIST-Data-M message with the expected results of the corresponding eBIST; by means of this comparison, Processor-A will determine whether the eBIST performed on Processor-M has passed or has failed.

Aptly, the Processor-M performs one or more eBISTs that include performing a processor reset.

Aptly, the computer system is arranged to have a Communication Channel that is adapted to support the transmission of ePOST-Data-A messages and eBIST-Data-A messages between Processor-A and Processor-M, and to support the transmission of ePOST-Data-M messages and eBIST-Data-M messages between Processor-M and Processor-A.

Aptly, the Communication Channel is used to synchronise the activities on Processor-A and Processor-M using a form of Shared-Clock Scheduler.

Aptly, data transfers between Processor-A and Processor-M are supported by means of Tick Messages sent from Processor-A to Processor-M.

Aptly, data transfers between Processor-M and Processor-A will be supported by means of Ack Messages sent from Processor-M to Processor-A.

Aptly, the Communication Channel comprises a standard serial protocol that is suitable for short-distance communication, such as 'RS-232' or SPI.

Aptly, the computer system is arranged to have an Input-A that is adapted to enable Processor-A to acquire data for any tasks that execute on Processor-A.

Aptly, the Input-A comprises one or more digital input pins on Processor-A plus any associated external interfacing hardware that may be required to adapt voltages in the system environment to meet the voltage requirements of the digital input pins.

Aptly, the Input-A comprises one or more analogue input pins on Processor-A plus any associated external interfacing hardware that may be required to adapt voltages in the system environment to meet the voltage requirements of the analogue input pins and provide any necessary filtering of input signals.

Aptly, the Input-A comprises a software and hardware interface to one or more serial communication buses (such as CAN or Ethernet or RS-232' or SPI).

Aptly, the Output-A is adapted to enable Processor-A to generate any safety-related outputs from the computer system that have been determined by Processor-A if—by means of tasks, ePOSTs, eBISTs and Monitor-A—Processor-A determines that it is operating correctly and if—by means of tasks and eBIST-Data-M messages—Processor-A determines that Processor-M is also operating correctly.

Aptly, the Output-A is set to a Fail-Safe-State if Processor-A determines—by means of ePOST-Data-M messages—that Processor-M has failed an ePOST.

Aptly, the Output-A is set to a Fail-Safe-State if Processor-A determines—by means of eBIST-Data-M messages—that Processor-M has failed an eBIST.

Aptly, the Output-A comprises one or more digital output pins on Processor-A plus any associated external interfacing hardware that may be required to adapt voltages in the system environment to meet the voltage requirements of the digital output pins.

Aptly, a Fail-Safe State on any digital output pins will be a 0V output.

Aptly, the Output-A comprises an analogue output pins on Processor-A plus any associated external interfacing hardware that may be required to adapt voltages in the system environment to meet the voltage requirements of the analogue output pins and provide any necessary filtering of output signals. Aptly, a Fail-Safe State on any analogue output pins will be a 0V output.

Aptly, the Output-A comprises a software and hardware interface to one or more serial communication buses (such as CAN or Ethernet or RS-232' or SPI).

Aptly, a Fail-Safe State on any communication buses will mean that no messages are sent by Processor-A on the bus concerned.

Aptly, the Monitor-A is adapted to enable Processor-A to determine whether Output-A is in its required state.

Aptly, the Monitor-A comprises one or more digital input pins on Processor-A plus any associated external interfacing hardware that may be required to adapt voltages from one or more digital output pins on Output-A to meet the voltage requirements of the digital input pins on Processor-A.

Aptly, the Monitor-A comprises one or more analogue input pins on Processor-A plus any associated external interfacing hardware that may be required to adapt voltages from one or more analogue output pins on Output-A to meet the voltage requirements of the analogue input pins on Processor-A.

Aptly, the Monitor-A comprises a software and hardware interface to one or more communication buses (such as CAN or Ethernet or 'RS-232' or SPI) that are connected to Processor-A in a manner that allows Processor-A to monitor any communications on the one or more communication buses. Aptly, Control-M is adapted to ensure that any and all safety-related outputs from the computer system are held in a safe state if—by means of eBIST-Data-A messages—Processor-M determines that Processor-A may not be operating correctly, or if—by means of ePOSTs or eBISTs or Monitor-M—Processor-M determines that it may not be operating correctly.

Aptly, the Control-M is set to a Fail-Safe-State if Processor-M determines—by means of ePOST-Data-A messages—that Processor-A has failed an ePOST.

Aptly, the Control-M is set to a Fail-Safe-State if Processor-M determines—by means of eBIST-Data-A messages—that Processor-A has failed an eBIST.

Aptly, the Control-M comprises one or more digital switches that provide a means of disabling one or more digital output pins on Processor-A.

Aptly, a Fail-Safe State on any digital output pins will be a 0V output.

Aptly, the Control-M comprises one or more analogue switches that provide a means of disabling one or more analogue output pins on Processor-A.

Aptly, a Fail-Safe State on any analogue output pins will be a 0V output.

Aptly, the Control-M comprises one or more digital switches that provide a means of disabling transceivers that provide a link to one or more serial communication buses (such as CAN or Ethernet or RS-232' or SPI), thereby allowing Processor-M to prevent Processor-A from sending any messages on said communication buses when Control-M is in a Fail-Safe State.

Aptly, the Monitor-M is adapted to determine whether Control-M is in its required state.

Aptly, the Monitor-M comprises one or more digital input pins on Processor-M plus any associated external interfacing hardware that may be required to adapt voltages in the system environment to meet the voltage requirements of the digital input pins on Processor-M.

Aptly, the Monitor-M comprises one or more analogue input pins on Processor-M plus any associated external interfacing hardware that may be required to adapt voltages in the system environment to meet the voltage requirements of the analogue input pins and provide any necessary filtering of input signals.

Aptly, the Monitor-M comprises a software and hardware interface to one or more communication buses (such as CAN or Ethernet or 'RS-232' or SPI) that are connected to Processor-A in a manner that allows Processor-M to monitor any communications on the one or more communication buses.

According to a fifth aspect of the present invention there is provided a time-triggered computer system comprising:

a Processor-A adapted to perform a series of ePOSTs which may involve a processor reset and to report data from each ePOST to Processor-B by means of ePOST-Data-A messages that are transmitted over a Communication Channel as part of one or more messages sent between Processor-A and Processor-B, and to compare the contents of ePOST-Data-B messages sent by Processor-B over a Communication Channel as part of one or more messages sent between Processor-B and Processor-A with the expected results from each of those ePOSTs, and then to operate in one of one or more pre-determined system modes, in each of which it may perform one or more eBISTs without performing a processor reset and report data from each eBIST to Processor-B by means of eBIST-Data-A messages that are transmitted over a Communication Channel as part of one or more messages sent between Processor-A and Processor-B, and in each of which it may compare the contents of eBIST-Data-B messages sent by Processor-B over a Communication Channel as part of one or more messages sent between Processor-B and Processor-A with the expected results from each of those eBISTs, and in each of which it may perform one or more eBISTs that include performing a processor reset, and in each of which it may execute one or more tasks according to a predetermined task schedule; and a Processor-B adapted to perform a series of ePOSTs which may involve a processor reset and to report data from each ePOST to Processor-A by means of ePOST-Data-B messages that are transmitted over a Communication Channel as part of one or more messages sent between Processor-B and Processor-A, and to compare the contents of ePOST-Data-B messages sent by Processor-B over a Communication Channel as part of one or more messages sent between Processor-B and Processor-A with the expected results from each of those ePOSTs, and then to operate in one of one or more pre-determined system modes, in each of which it may perform one or more eBISTs without performing a processor reset and report data from each eBIST to Processor-A by means of eBIST-Data-B messages sent over a Communication Channel, and in each of which it may compare the contents of eBIST-Data-A messages sent by Processor-A over a Communication Channel with the expected results from each of those eBISTs, and in each of which it may perform one or more eBISTs that include performing a processor reset, and in each of which it may execute one or more tasks according to a predetermined task schedule); and a Communication Channel adapted to support the transmission of messages between Processor-A and Processor-B, and to support the transmission of messages between Processor-B and Processor-A; and an Input-A adapted to enable Processor-A to acquire data for any tasks that execute on Processor-A; and an Input-B adapted to enable Processor-B to acquire data for any tasks that execute on Processor-B.

an Output-A adapted to enable Processor-A to generate any safety-related outputs from the computer system that have been determined by Processor-A if—by means of tasks, self tests and Monitor-A—Processor-A determines that it is operating correctly and if—by means of tasks and eBIST-Data-B messages—Processor-A determines that Processor-B is also operating correctly; and a Monitor-A adapted to enable Processor-A to determine whether Output-A is in its required state; and a Control-B adapted to ensure that any and all safety-related outputs from the computer system are held in a safe state if—by means of eBIST-Data-A messages—Processor-B determines that Processor-A may not be operating correctly, or if—by means of self tests or Monitor-B—Processor-B determines that it may not be operating correctly); and a Monitor-B adapted to enable Processor-B to determine whether Output-A is in its required state and whether Control-B is in its required state).

Aptly, the Processor-A comprises one or more "soft" or "hard" processor cores (that execute some software) and/or one or more hardware cores (that do not execute any software).

Aptly, the Processor-A comprises one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

Aptly, the Processor-A comprises a time-triggered scheduler.

Aptly, Processor-A comprises a time triggered cooperative (TTC) scheduler or a time triggered hybrid (TTH) scheduler.

Aptly, the Processor-B comprises one or more "soft" or "hard" processor cores (that execute some software) and/or one or more hardware cores (that do not execute any software).

Aptly, the Processor-B comprises one or more processor chips, such as a commercial-off-the-shelf (COTS) microcontroller or microprocessor, Digital Signal Processor (DSP), Field-Programmable Gate Array (FPGA), Application Specific Integrated Circuit (ASIC) or similar devices.

Aptly, the Processor-B comprises one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

Aptly, the Processor-B comprises a time-triggered scheduler.

Aptly, Processor-B comprises a time triggered cooperative (TTC) scheduler or a time triggered hybrid (TTH) scheduler.

Aptly, the Processor-B checks the results of ePOSTs and eBISTs that are performed on Processor-A while Processor-A checks the results of ePOSTs and eBISTs that are performed on Processor-B.

Aptly, the Processor-A performs ePOSTs (that may involve a processor reset) and reports data from each ePOST to the Processor-B by means of the ePOST-Data-A messages that are sent over a Communication Channel; and Processor-B then compares the contents of each ePOST-Data-A message with the expected results of the corresponding ePOST; by means of this comparison, Processor-B determines whether the ePOST performed on Processor-A has passed or has failed.

Aptly, the Processor-A will perform eBISTs during its normal operation that do not require processor resets and will report data from each eBIST to Processor-B by means of eBIST-Data-A messages that are sent over a Communication Channel; Processor-B will then compare the contents of each eBIST-Data-A message with the expected results of the corresponding eBIST; by means of this comparison, Processor-B will determine whether the eBIST performed on Processor-A has passed or has failed.

Aptly, the Processor-A performs one or more eBISTs that include performing a processor reset.

Aptly, the Processor-B will perform ePOSTs (that may involve a processor reset) and will report data from each ePOST to Processor-A by means of ePOST-Data-B messages that are sent over a Communication Channel; Processor-A will then compare the contents of each ePOST-Data-B message with the expected results of the corresponding ePOST; by means of this comparison, Processor-A will determine whether the ePOST performed on Processor-B has passed or has failed.

Aptly, the Processor-B will perform eBISTs during its normal operation that do not require processor resets and will report data from each eBIST to Processor-A by means of eBIST-Data-B messages that are sent over a Communication Channel; Processor-A will then compare the contents of each eBIST-Data-B message with the expected results of the corresponding eBIST; by means of this comparison, Processor-A will determine whether the eBIST performed on Processor-B has passed or has failed.

Aptly, the Processor-B performs one or more eBISTs that include performing a processor reset.

Aptly, the computer system is arranged to have a Communication Channel that is adapted to support the transmission of ePOST-Data-A messages and eBIST-Data-A messages between Processor-A and Processor-B, and to support the transmission of ePOST-Data-B messages and eBIST-Data-B messages between Processor-B and Processor-A.

Aptly, the Communication Channel is used to synchronise the activities on Processor-A and Processor-B using a form of Shared-Clock Scheduler.

Aptly, data transfers between Processor-A and Processor-B are supported by means of Tick Messages sent from Processor-A to Processor-B.

Aptly, data transfers between Processor-B and Processor-A will be supported by means of Ack Messages sent from Processor-B to Processor-A.

Aptly, the Communication Channel comprises a standard serial protocol that is suitable for short-distance communication, such as 'RS-232' or SPI.

Aptly, the Input-A is adapted to enable Processor-A to acquire data for any tasks that execute on Processor-A.

Aptly, the Input-A comprises one or more digital input pins on Processor-A plus any associated external interfacing hardware that may be required to adapt voltages in the system environment to meet the voltage requirements of the digital input pins.

Aptly, the Input-A comprises one or more analogue input pins on Processor-A plus any associated external interfacing hardware that may be required to adapt voltages in the system environment to meet the voltage requirements of the analogue input pins and provide any necessary filtering of input signals.

Aptly, the Input-A comprises a software and hardware interface to one or more serial communication buses (such as CAN or Ethernet or RS-232' or SPI).

Aptly, the Output-A is adapted to enable Processor-A to generate any safety-related outputs from the computer system that have been determined by Processor-A if—by means of tasks, ePOSTs, eBISTs and Monitor-A—Processor-A determines that it is operating correctly and if—by means of tasks and eBIST-Data-B messages—Processor-A determines that Processor-B is also operating correctly.

Aptly, the Output-A will be set to a Fail-Safe-State if Processor-A determines by means of ePOST-Data-B messages—that Processor-B has failed an ePOST.

Aptly, the Output-A will be set to a Fail-Safe-State if Processor-A determines by means of eBIST-Data-B messages—that Processor-B has failed an eBIST.

Aptly, the Output-A comprises one or more digital output pins on Processor-A plus any associated external interfacing hardware that may be required to adapt voltages in the system environment to meet the voltage requirements of the digital output pins.

Aptly, a Fail-Safe State on any digital output pins will be a 0V output.

Aptly, the Output-A comprises an analogue output pins on Processor-A plus any associated external interfacing hardware that may be required to adapt voltages in the system environment to meet the voltage requirements of the analogue output pins and provide any necessary filtering of output signals.

Aptly, a Fail-Safe State on any analogue output pins will be a 0V output.

Aptly, the Output-A comprises a software and hardware interface to one or more serial communication buses (such as CAN or Ethernet or RS-232' or SPI).

Aptly, a Fail-Safe State on any communication buses will mean that no messages are sent by Processor-A on the bus concerned.

Aptly, the Monitor-A is adapted to enable Processor-A to determine whether Output-A is in its required state.

Aptly, the Monitor-A is connected to one or more digital output pins on Output-A and comprises one or more digital input pins on Processor-A plus any associated external interfacing hardware that may be required to adapt voltages in the system environment to meet the voltage requirements of the digital input pins.

Aptly, the Monitor-A is connected to one or more analogue output pins on Output-A and comprises one or more analogue input pins on Processor-A plus any associated external interfacing hardware that may be required to adapt voltages in the system environment to meet the voltage requirements of the analogue input pins and provide any necessary filtering of input signals.

Aptly, the Monitor-A comprises a software and hardware interface to one or more communication buses (such as CAN or Ethernet or 'RS-232' or SPI) that are connected to Processor-A in a manner that allows Processor-A to monitor any communications on the one or more communication buses.

Aptly, the Control-B is adapted to ensure that any and all safety-related outputs from the computer system are held in a safe state if—by means of eBIST-Data-A messages—Processor-B determines that Processor-A may not be operating correctly, or if—by means of ePOSTs or eBISTs or Monitor-B—Processor-B determines that it may not be operating correctly.

Aptly, the Control-B is set to a Fail-Safe-State if Processor-B determines—by means of ePOST-Data-A messages—that Processor-A has failed an ePOST.

Aptly, the Control-B is set to a Fail-Safe-State if Processor-B determines—by means of eBIST-Data-A messages—that Processor-A has failed an eBIST.

Aptly, the Control-B comprises one or more digital switches that provide a means of disabling one or more digital output pins on Processor-A.

Aptly, a Fail-Safe State on any digital output pins will be a 0V output.

Aptly, the Control-B comprises one or more analogue switches that provide a means of disabling one or more analogue output pins on Processor-A.

Aptly, a Fail-Safe State on any analogue output pins will be a 0V output.

Aptly, the Control-B comprises one or more digital switches that provide a means of disabling transceivers that provide a link to one or more serial communication buses (such as CAN or Ethernet or RS-232' or SPI), thereby allowing Processor-B to prevent Processor-A from sending any messages on said communication buses when Control-B is in a Fail-Safe State.

Aptly, the Monitor-B is adapted to enable Processor-B to determine whether Output-A is in its required state and whether Control-B is in its required state.

Aptly, the Monitor-B comprises one or more digital input pins on Processor-B plus any associated external interfacing hardware that may be required to adapt voltages from one or more digital output pins on Output-A and Control-B to meet the voltage requirements of the digital input pins on Processor-B.

Aptly, the Monitor-B comprises one or more analogue input pins on Processor-B plus any associated external interfacing hardware that may be required to adapt voltages from one or more analogue output pins on Output-A and Control-B to meet the voltage requirements of the analogue input pins on Processor-B and provide any necessary filtering of input signals.

Aptly, the Monitor-B comprises a software and hardware interface to one or more communication buses (such as CAN or Ethernet or 'RS-232' or SPI) that are connected to Processor-A or Processor-B in a manner that allows Processor-B to monitor any communications on the one or more communication buses.

Aptly, the Input-B is adapted to enable Processor-B to acquire data for any tasks that execute on Processor-B.

Aptly, the Input-B comprises one or more digital input pins on Processor-B plus any associated external interfacing hardware that may be required to adapt voltages in the system environment to meet the voltage requirements of the digital input pins.

Aptly, the Input-B comprises one or more analogue input pins on Processor-B plus any associated external interfacing hardware that may be required to adapt voltages in the system environment to meet the voltage requirements of the analogue input pins and provide any necessary filtering of input signals.

Aptly, the Input-B comprises a software and hardware interface to one or more serial communication buses (such as CAN or Ethernet or RS-232' or SPI).

According to a sixth aspect of the present invention there is provided a time-triggered computer system comprising:

a Processor-A adapted to perform a series of ePOSTs which may involve a processor reset and to report data from each ePOST to Processor-B by means of ePOST-Data-A messages that are transmitted over a Communication Channel as part of one or more messages sent between Processor-A and Processor-B, and to compare the contents of ePOST-Data-B messages sent by Processor-B over a Communication Channel as part of one or more messages sent between Processor-B and Processor-A with the expected results from each of those ePOSTs, and then to operate in one of one or more pre-determined system modes, in each of which it may perform one or more eBISTs without performing a processor reset and report data from each eBIST to Processor-B by means of eBIST-Data-A messages that are transmitted over a Communication Channel as part of one or more messages sent between Processor-A and Processor-B, and in each of which it may compare the contents of eBIST-Data-B messages sent by Processor-B over a Communication Channel as part of one or more messages sent between Processor-B and Processor-A with the expected results from each of those eBISTs, and in each of which it may perform one or more eBISTs that include performing a processor reset, and in each of which it may execute one or more tasks according to a predetermined task schedule); and a Processor-B (adapted to perform a series of ePOSTs which may involve a processor reset and to report data from each ePOST to Processor-A by means of ePOST-Data-B messages that are transmitted over a Communication Channel as part of one or more messages sent between Processor-B and Processor-A, and to compare the contents of ePOST-Data-B messages sent by Processor-B over a Communication Channel as part of one or more messages sent between Processor-B and Processor-A with the expected results from each of those ePOSTs, and then to operate in one of one or more pre-determined system modes, in each of which it may perform one or more eBISTs without performing a processor reset and report data from each eBIST to Processor-A by means of eBIST-Data-B messages sent over a Communication Channel, and in each of which it may compare the contents of eBIST-Data-A messages sent by Processor-A over a Communication Channel with the expected results from each of those eBISTs, and in each of which it may perform one or more eBISTs that include performing a processor reset, and in each of which it may execute one or more tasks according to a predetermined task schedule); and a Communication Channel (adapted to support the transmission of messages between Processor-A and Processor-B, and to support the transmission of messages between Processor-B and Processor-A); and an Input-A (adapted to enable Processor-A to acquire data for any tasks that execute on Processor-A);

an Input-B (adapted to enable Processor-B to acquire data for any tasks that execute on Processor-B); and an Output-A (adapted to enable Processor-A to generate any safety-related outputs from the computer system that have been determined by Processor-A if—by means of tasks, self tests and Monitor-A—Processor-A determines that it is operating correctly); and an Output-B (adapted to enable Processor-B to generate any safety-related outputs from the computer system that have been determined by Processor-B if—by means of tasks, self tests and Monitor-B—Processor-B determines that it is operating correctly and if—by means of tasks and eBIST-Data-A messages—Processor-B determines that Processor-A is not operating correctly); and a Monitor-A (adapted to enable Processor-A to determine whether Output-A and Output-B and System-Output are in their required states); and a Monitor-B (adapted to enable Processor-B to determine whether Output-A and Output-B and System-Output are in their required states); and a Monitor-B (adapted to enable Processor-B to determine whether Output-A is in its required state and whether Control-B is in its required state); and a Control-A (adapted to ensure that any and all safety-related outputs from Output-A are held in a safe state if—by means of self tests or Monitor-A—Processor-A determines that it may not be operating correctly); and a Control-B (adapted to ensure that any and all safety-related outputs from Output-B are held in a safe state if—by means of self tests or Monitor-B—Processor-B determines that it may not be operating correctly); and a System-Output-Logic (adapted to determine a single set of outputs from the system based on a combination of the outputs from Output-A, Output-B, Control-A and Control-B); and a System-Output (adapted to generate a fail-operational output from the system based on the calculations performed by the System-Output-Logic).

Aptly, the Processor-A comprises one or more "soft" or "hard" processor cores (that execute some software) and/or one or more hardware cores (that do not execute any software).

Aptly, the Processor-A comprises one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

Aptly, the Processor-A comprises a time-triggered scheduler. Aptly, Processor-A comprises a time triggered cooperative (TTC) scheduler or a time triggered hybrid (TTH) scheduler.

Aptly, the Processor-B comprises one or more "soft" or "hard" processor cores (that execute some software) and/or one or more hardware cores (that do not execute any software).

Aptly, the Processor-B comprises one or more processor chips, such as a commercial-off-the-shelf (COTS) microcontroller or microprocessor, Digital Signal Processor (DSP), Field-Programmable Gate Array (FPGA), Application Specific Integrated Circuit (ASIC) or similar devices.

Aptly, the Processor-B comprises one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

Aptly, the Processor-B comprises a time-triggered scheduler.

Aptly, Processor-B comprises a time triggered cooperative (TTC) scheduler or a time triggered hybrid (TTH) scheduler.

Aptly, the Processor-B checks the results of ePOSTs and eBISTs that are performed on Processor-A while Processor-A checks the results of ePOSTs and eBISTs that are performed on Processor-B.

Aptly, the Processor-A performs ePOSTs (that may involve a processor reset) and reports data from each ePOST to the Processor-B by means of the ePOST-Data-A messages that are sent over a Communication Channel; and Processor-B then compares the contents of each ePOST-Data-A message with the expected results of the corresponding ePOST; by means of this comparison, Processor-B determines whether the ePOST performed on Processor-A has passed or has failed.

Aptly, the Processor-A will perform eBISTs during its normal operation that do not require processor resets and will report data from each eBIST to Processor-B by means of eBIST-Data-A messages that are sent over a Communication Channel; Processor-B will then compare the contents of each eBIST-Data-A message with the expected results of the corresponding eBIST; by means of this comparison, Processor-B will determine whether the eBIST performed on Processor-A has passed or has failed.

Aptly, the Processor-A performs one or more eBISTs that include performing a processor reset.

Aptly, the Processor-B will perform ePOSTs (that may involve a processor reset) and will report data from each ePOST to Processor-A by means of ePOST-Data-B messages that are sent over a Communication Channel; Processor-A will then compare the contents of each ePOST-Data-B message with the expected results of the corresponding ePOST; by means of this comparison, Processor-A will determine whether the ePOST performed on Processor-B has passed or has failed.

Aptly, the Processor-B will perform eBISTs during its normal operation that do not require processor resets and will report data from each eBIST to Processor-A by means of eBIST-Data-B messages that are sent over a Communication Channel; Processor-A will then compare the contents of each eBIST-Data-B message with the expected results of the corresponding eBIST; by means of this comparison, Processor-A will determine whether the eBIST performed on Processor-B has passed or has failed.

Aptly, the Processor-B performs one or more eBISTs that include performing a processor reset.

Aptly, the computer system is arranged to have a Communication Channel that is adapted to support the transmission of ePOST-Data-A messages and eBIST-Data-A messages between Processor-A and Processor-B, and to support the transmission of ePOST-Data-B messages and eBIST-Data-B messages between Processor-B and Processor-A.

Aptly, the Communication Channel is used to synchronise the activities on Processor-A and Processor-B using a form of Shared-Clock Scheduler.

Aptly, data transfers between Processor-A and Processor-B are supported by means of Tick Messages sent from Processor-A to Processor-B.

Aptly, data transfers between Processor-B and Processor-A will be supported by means of Ack Messages sent from Processor-B to Processor-A.

Aptly, the Communication Channel comprises a standard serial protocol that is suitable for short-distance communication, such as 'RS-232' or SPI.

Aptly, the Input-A is adapted to enable Processor-A to acquire data for any tasks that execute on Processor-A.

Aptly, the Input-A comprises one or more digital input pins on Processor-A plus any associated external interfacing hardware that may be required to adapt voltages in the system environment to meet the voltage requirements of the digital input pins.

Aptly, the Input-A comprises one or more analogue input pins on Processor-A plus any associated external interfacing hardware that may be required to adapt voltages in the system environment to meet the voltage requirements of the analogue input pins and provide any necessary filtering of input signals.

Aptly, the Input-A comprises a software and hardware interface to one or more serial communication buses (such as CAN or Ethernet or RS-232' or SPI).

Aptly, the Output-A is adapted to enable Processor-A to generate any safety-related outputs from the computer system that have been determined by Processor-A if—by means of tasks, self tests and Monitor-A—Processor-A determines that it is operating correctly.

Aptly, the Output-A comprises one or more digital output pins on Processor-A plus any associated external interfacing hardware that may be required to adapt voltages in the system environment to meet the voltage requirements of the digital output pins.

Aptly, a Fail-Safe State on any digital output pins on Output-A will comprise a 0V output.

Aptly, the Output-A comprises an analogue output pins on Processor-A plus any associated external interfacing hardware that may be required to adapt voltages in the system environment to meet the voltage requirements of the analogue output pins and provide any necessary filtering of output signals.

Aptly, a Fail-Safe State on any analogue output pins on Output-A will comprise a 0V output.

Aptly, the Output-A comprises a software and hardware interface to one or more serial communication buses (such as CAN or Ethernet or RS-232' or SPI).

Aptly, a Fail-Safe State on any communication buses will mean that no messages are sent by Processor-A on the bus concerned.

Aptly, the Output-B is adapted to enable Processor-B to generate any safety-related outputs from the computer system that have been determined by Processor-B if—by means of tasks, self tests and Monitor-B—Processor-B determines that it is operating correctly and if—by means of tasks and eBIST-Data-A messages—Processor-B determines that Processor-A is not operating correctly.

Aptly, the Output-B comprises one or more digital output pins on Processor-A plus any associated external interfacing hardware that may be required to adapt voltages in the system environment to meet the voltage requirements of the digital output pins.

Aptly, the Fail-Safe State on any digital output pins on Output-B will comprise a 0V output.

Aptly, the Output-B comprises an analogue output pins on Processor-A plus any associated external interfacing hardware that may be required to adapt voltages in the system environment to meet the voltage requirements of the analogue output pins and provide any necessary filtering of output signals.

Aptly, a Fail-Safe State on any analogue output pins on Output-B will comprise a 0V output.

Aptly, the Output-B comprises a software and hardware interface to one or more serial communication buses (such as CAN or Ethernet or RS-232' or SPI).

Aptly, a Fail-Safe State on any communication buses will mean that no messages are sent by Processor-A on the bus concerned.

Aptly, the Monitor-A is adapted to enable Processor-A to determine whether Output-A and Output-B and System-Output are in their required states.

Aptly, the Monitor-A comprises one or more digital input pins on Processor-A plus any associated external interfacing hardware that may be required to adapt voltages from one or more digital output pins on Output-A, Output-B and System-Output to meet the voltage requirements of the digital input pins on Processor-A.

Aptly, the Monitor-A comprises one or more analogue input pins on Processor-A plus any associated external interfacing hardware that may be required to adapt voltages from one or more analogue output pins on Output-A, Output-B and System-Output to meet the voltage requirements of the analogue input pins on Processor-A and provide any necessary filtering of input signals.

Aptly, the Monitor-A comprises a software and hardware interface to one or more communication buses (such as CAN or Ethernet or 'RS-232' or SPI) that are connected to Processor-A or Processor-B or System-Output in a manner that allows Processor-A to monitor any communications on the one or more communication buses.

Aptly, the Monitor-B is adapted to enable Processor-B to determine whether Output-A and Output-B and System-Output are in their required states.

Aptly, the Monitor-B comprises one or more digital input pins on Processor-B plus any associated external interfacing hardware that may be required to adapt voltages from one or more digital output pins on Output-A, Output-B and System-Output to meet the voltage requirements of the digital input pins on Processor-B.

Aptly, the Monitor-B comprises one or more analogue input pins on Processor-B plus any associated external interfacing hardware that may be required to adapt voltages from one or more analogue output pins on Output-A, Output-B and System-Output to meet the voltage requirements of the analogue input pins on Processor-B and provide any necessary filtering of input signals.

Aptly, the Monitor-B comprises a software and hardware interface to one or more communication buses (such as CAN or Ethernet or 'RS-232' or SPI) that are connected to Processor-A or Processor-B or System-Output in a manner that allows Processor-B to monitor any communications on the one or more communication buses.

Aptly, the Control-A is adapted to ensure that any and all safety-related outputs from Output-A are held in a Fail-Safe State if—by means of self tests or Monitor-A—Processor-A determines that it may not be operating correctly.

Aptly, the Control-A comprises one or more digital switches that provide a means of disabling one or more digital output pins on Processor-A.

Aptly, a Fail-Safe State on any digital output pins on Control-A will comprise a 0V output.

Aptly, the Control-A comprises one or more analogue switches that provide a means of disabling one or more analogue output pins on Processor-A.

Aptly, a Fail-Safe State on any analogue output pins on Control-A will comprise a 0V output.

Aptly, the Control-A comprises one or more digital switches that provide a means of disabling transceivers that provide a link to one or more serial communication buses (such as CAN or Ethernet or RS-232' or SPI), thereby preventing Processor-A from sending any messages on said communication buses when Control-A is in a Fail-Safe State.

Aptly, the Control-B is adapted to ensure that any and all safety-related outputs from Output-A are held in a Fail-Safe State if—by means of self tests or Monitor-B—Processor-B determines that it may not be operating correctly.

Aptly, the Control-B comprises one or more digital switches that provide a means of disabling one or more digital output pins on Processor-B.

Aptly, the Fail-Safe State on any digital output pins on Control-B will comprise a 0V output.

Aptly, the Control-B comprises one or more analogue switches that provide a means of disabling one or more analogue output pins on Processor-B.

Aptly, a Fail-Safe State on any analogue output pins on Control-B will comprise a 0V output.

Aptly, the Control-B comprises one or more digital switches that provide a means of disabling transceivers that provide a link to one or more serial communication buses (such as CAN or Ethernet or RS-232' or SPI), thereby preventing Processor-B from sending any messages on said communication buses when Control-B is in a Fail-Safe State.

Aptly, the System-Output-Logic is adapted to determine a single set of outputs from the system based on a combination of the outputs from Output-A and Output-B.

Aptly, the System-Output-Logic comprises an OR (logic) operation for combining any digital outputs from Output-A and Output-B.

Aptly, the System-Output-Logic comprises an XOR (logic) operation for combining any digital outputs from Output-A and Output-B.

Aptly, the System-Output-Logic comprises one or more analogue switches that provide a means of combining any analogue outputs from Output-A and Output-B, thereby ensuring that only Processor-A or Processor-B (and not both) can generate analogue outputs at any given time.

Aptly, the System-Output-Logic comprises one or more digital switches that provide a means of disabling transceivers that provide a link to one or more serial communication buses (such as CAN or Ethernet or RS-232' or SPI), thereby ensuring that only Processor-A or Processor-B (and not both) can send messages on said communication buses at any time.

Aptly, all System-Output-Logic outputs will be set to a Fail-Safe-State if Processor-A determines—by means of ePOST-Data-B messages—that Processor-B has failed an ePOST and that Processor-B has failed to enter a Fail-Safe State after failing the ePOST.

Aptly, all System-Output-Logic outputs will be set to a Fail-Safe-State if Processor-A determines—by means of eBIST-Data-B messages—that Processor-B has failed an eBIST and that Processor-B has failed to enter a Fail-Safe State after failing the eBIST.

Aptly, all System-Output-Logic outputs will be set to a Fail-Safe-State if Processor-B determines—by means of ePOST-Data-A messages—that Processor-A has failed an ePOST and that Processor-A has failed to enter a Fail-Safe State after failing the ePOST.

Aptly, all System-Output-Logic outputs will be set to a Fail-Safe-State if Processor-B determines—by means of eBIST-Data-A messages—that Processor-A has failed an eBIST and that Processor-A has failed to enter a Fail-Safe State after failing the eBIST.

Aptly, a Fail-Safe State on any digital output pins on System-Output-Logic will comprise a 0V output.

Aptly, a Fail-Safe State on any analogue output pins on System-Output-Logic will comprise a 0V output.

Aptly, a Fail-Safe State on any serial communication buses (such as CAN or Ethernet or RS-232' or SPI) that form part of the System-Output-Logic will comprise a state in which neither Processor-A nor Processor-B can send any messages on said communication buses.

Aptly, the System-Output adapted to generate a fail-operational output from the system based on the calculations performed by the System-Output-Logic.

Aptly, the System-Output comprises one or more digital output pins plus any associated external interfacing hardware that may be required to adapt voltages in the system environment to meet the voltage requirements of the digital output pins.

Aptly, a Fail-Safe State on any digital output pins on System-Output will comprise a 0V output.

Aptly, the System-Output comprises an analogue output pins plus any associated external interfacing hardware that may be required to adapt voltages in the system environment to meet the voltage requirements of the analogue output pins and provide any necessary filtering of output signals.

Aptly, a Fail-Safe State on any analogue output pins on System-Output will comprise a 0V output.

Aptly, the System-Output comprises a software and hardware interface to one or more serial communication buses (such as CAN or Ethernet or RS-232' or SPI).

Aptly, a Fail-Safe State on any communication buses will mean that no messages are sent by the computer system on the bus concerned.

According to a seventh aspect of the present invention there is provided a time-triggered computer system comprising:

- at least one first processor core that is adapted to:
  - perform at least one first Power-On Self-Test, POST, and/or at least one first Built-In Self-Test, BIST; and
  - transmit first data, that is indicative of results of at least one said first POST and/or said first BIST, to at least one second processor core; and
- at least one second processor core that is adapted to:
  - compare the first data with second data, that is data indicative of expected results from at least one said first POST and/or said first BIST; and
  - responsive to the comparison, determine if at least one said first POST and/or first BIST has passed or failed.

Aptly, the first processor core is further adapted to:

- perform at least one first monitoring process for monitoring that the first processor core is operating correctly; and
- perform said first POST and/or first BIST on the first monitoring process.

Aptly, the first monitoring process is a Task Execution Time Monitoring Mechanism (TETMM) or is a mechanism for checking the task execution sequence (as documented in Reference 2), or is a mechanism for checking the operation of analogue-to-digital converters, or is a mechanism for checking the clock frequency of the first processor, or is a mechanism for performing checks on the ability of the first processor to execute its defined instruction set, or is a mechanism for checking duplicated variables (as defined in Reference 2) that are employed in the first processor, or is a mechanism for checking the operating voltage of the first processor, or is a mechanism for checking the operating temperature of the first processor, or is a mechanism for checking the operation of one or more external watchdog controllers (see Reference 2) that are connected to the first processor, or is a mechanism for checking the operation of the interrupts on the first processor, or is a mechanism for checking the operation of a watchdog timer that is incorporated in the first processor or is external to the first processor, or is a mechanism for checking the memory in the first processor, or is a mechanism for checking for corruption in the registers in the first processor, or is a mechanism for checking for corruption in the software configuration in the first processor, or is a mechanism for checking for corruption in the stack in the first processor, or is a mechanism for performing timeout checks during the operation of the first processor (as defined in Reference 2).

Aptly, the first processor core is further adapted to:

- perform a plurality of first BISTs on the first monitoring process;
- wherein a sequence of first BISTs and a time interval between respective first BISTs performed on the first monitoring process is predetermined.

Aptly, the first processor core is further adapted to:

- perform said plurality of first BISTs on the first monitoring process within a first predetermined time period.

Aptly, the first processor core is further adapted to:

- perform said first monitoring process within the first predetermined time period.

Aptly, the first predetermined time period is the Process Safety Time or Fault Tolerant Time Interval.

Aptly, the first predetermined time period is equal to or less than 100 ms.

Aptly, the first predetermined time period is equal to or less than 90 ms, optionally 80 ms, optionally 70 ms, optionally 60 ms, optionally 50 ms, optionally 40 ms, optionally 30 ms, optionally 20 ms, optionally 10 ms.

Aptly, the second processor core is further adapted to:

- perform at least one second monitoring process for monitoring that the second processor core is operating correctly; and
- perform at least one second POST and/or at least one second BIST on the second monitoring process.

Aptly, the second monitoring process is a Task Execution Time Monitoring Mechanism (TETMM) or is a mechanism for checking the task execution sequence (as documented in Reference 2), or is a mechanism for checking the operation of analogue-to-digital converters, or is a mechanism for checking the clock frequency of the second processor, or is a mechanism for performing checks on the ability of the second processor to execute its defined instruction set, or is a mechanism for checking duplicated variables (as defined in Reference 2) that are employed in the second processor, or is a mechanism for checking the operating voltage of the second processor, or is a mechanism for checking the operating temperature of the second processor, or is a mechanism for checking the operation of one or more external watchdog controllers (see Reference 2) that are connected to the second processor, or is a mechanism for checking the operation of the interrupts on the second processor, or is a mechanism for checking the operation of a watchdog timer that is incorporated in the second processor or is external to the second processor, or is a mechanism for checking the memory in the second processor, or is a mechanism for checking for corruption in the registers in the second processor, or is a mechanism for checking for corruption in the software configuration in the second processor, or is a mechanism for checking for corruption in the stack in the second processor, or is a mechanism for performing timeout checks during the operation of the second processor (as defined in Reference 2).

Aptly, the second processor core is further adapted to:

perform a plurality of second BISTs on the second monitoring process;

wherein a sequence of second BISTs and a time interval between respective second BISTs performed on the second monitoring process is predetermined.

Aptly, the second processor core is further adapted to:

perform said plurality of second BISTs on the second monitoring process within a second predetermined time period.

Aptly, the second processor core is further adapted to:

perform said second monitoring process within the second predetermined time period.

Aptly, the second predetermined time period is the Process Safety Time or Fault Tolerant Time Interval.

Aptly, the second predetermined time period is equal to or less than 100 ms.

Aptly, the second predetermined time period is equal to or less than 90 ms, optionally 80 ms, optionally 70 ms, optionally 60 ms, optionally 50 ms, optionally 40 ms, optionally 30 ms, optionally 20 ms, optionally 10 ms.

It will be appreciated that the features described hereinabove with respect to the first aspect of the present invention are also applicable to the seventh aspect of the present invention.

According to an eighth aspect of the present invention there is provided a computer-implemented method for determining if at least one Power-On Self-Test and/or Built-in Self-Test has passed or failed, comprising the steps of:

performing, on at least one first processor core, at least one first Power-On Self-Test, POST, and/or at least one first Built-In Self-Test, BIST;

transmitting, by the first processor core, first data that is indicative of results of at least one said first POST and/or said first BIST, to at least one second processor core;

comparing, by the second processor core, the first data with second data, that is data indicative of expected results from at least one said first POST and/or said first BIST; and responsive to the comparing, determining, by the second processor core, if at least one said first POST and/or said first BIST has passed or failed.

Aptly, the method further comprises:

performing, by the first processor core, at least one first monitoring process for monitoring that the first processor core is operating correctly; and performing, by the first processor core, said first POST and/or first BIST on the first monitoring process.

Aptly, the first monitoring process is a Task Execution Time Monitoring Mechanism (TETMM) or is a mechanism for checking the task execution sequence (as documented in Reference 2), or is a mechanism for checking the operation of analogue-to-digital converters, or is a mechanism for checking the clock frequency of the first processor, or is a mechanism for performing checks on the ability of the first processor to execute its defined instruction set, or is a mechanism for checking duplicated variables (as defined in Reference 2) that are employed in the first processor, or is a mechanism for checking the operating voltage of the first processor, or is a mechanism for checking the operating temperature of the first processor, or is a mechanism for checking the operation of one or more external watchdog controllers (see Reference 2) that are connected to the first processor, or is a mechanism for checking the operation of the interrupts on the first processor, or is a mechanism for checking the operation of a watchdog timer that is incorporated in the first processor or is external to the first processor, or is a mechanism for checking the memory in the first processor, or is a mechanism for checking for corruption in the registers in the first processor, or is a mechanism for checking for corruption in the software configuration in the first processor, or is a mechanism for checking for corruption in the stack in the first processor, or is a mechanism for performing timeout checks during the operation of the first processor (as defined in Reference 2).

Aptly, the method further comprises:

performing, by the first processor core, a plurality of first BISTs on the first monitoring process;

wherein a sequence of first BISTs and a time interval between respective first BISTs performed on the first monitoring process is predetermined.

Aptly, the method further comprises:

performing, by the first processor core, said plurality of first BISTs on the first monitoring process within a first predetermined time period.

Aptly, the method further comprises:

performing, by the first processor core, said first monitoring process within the first predetermined time period.

Aptly, the first predetermined time period is the Process Safety Time or Fault Tolerant Time Interval.

Aptly, the first predetermined time period is equal to or less than 100 ms.

Aptly, the first predetermined time period is equal to or less than 90 ms, optionally 80 ms, optionally 70 ms, optionally 60 ms, optionally 50 ms, optionally 40 ms, optionally 30 ms, optionally 20 ms, optionally 10 ms.

Aptly, the method further comprises:

performing, by the second processor core, at least one second monitoring process for monitoring that the second processor core is operating correctly; and performing, by the second processor core, at least one second POST and/or at least one second BIST on the second monitoring process.

Aptly, the second monitoring process is a Task Execution Time Monitoring Mechanism (TETMM) or is a mechanism for checking the task execution sequence (as documented in Reference 2), or is a mechanism for checking the operation of analogue-to-digital converters, or is a mechanism for checking the clock frequency of the second processor, or is a mechanism for performing checks on the ability of the second processor to execute its defined instruction set, or is a mechanism for checking duplicated variables (as defined in Reference 2) that are employed in the second processor, or is a mechanism for checking the operating voltage of the second processor, or is a mechanism for checking the operating temperature of the second processor, or is a mechanism for checking the operation of one or more external watchdog controllers (see Reference 2) that are connected to the second processor, or is a mechanism for checking the operation of the interrupts on the second processor, or is a mechanism for checking the operation of a watchdog timer that is incorporated in the second processor or is external to the second processor, or is a mechanism for checking the memory in the second processor, or is a mechanism for checking for corruption in the registers in the second processor, or is a mechanism for checking for corruption in the software configuration in the second processor, or is a mechanism for checking for corruption in the stack in the second processor, or is a mechanism for performing timeout checks during the operation of the second processor (as defined in Reference 2).

Aptly, the method further comprises:

performing, by the second processor core, a plurality of second BISTs on the second monitoring process;

wherein a sequence of second BISTs and a time interval between respective second BISTs performed on the second monitoring process is predetermined.

Aptly, the method further comprises:

performing, by the second processor core, said plurality of second BISTs on the second monitoring process within a second predetermined time period.

Aptly, the method further comprises:

performing, by the second processor core, said second monitoring process within the second predetermined time period.

Aptly, the second predetermined time period is the Process Safety Time or Fault Tolerant Time Interval.

Aptly, the second predetermined time period is equal to or less than 100 ms.

Aptly, the second predetermined time period is equal to or less than 90 ms, optionally 80 ms, optionally 70 ms, optionally 60 ms, optionally 50 ms, optionally 40 ms, optionally 30 ms, optionally 20 ms, optionally 10 ms.

It will be appreciated that the features described hereinabove with respect to the second aspect of the present invention are also applicable to the eighth aspect of the present invention.

According to a ninth aspect of the presently claimed invention there is provided a computer program comprising instructions which, when executed by a computer, cause the computer to carry out the steps of the method according to the eighth aspect of the present invention.

According to a tenth aspect of the present invention there is provided a time-triggered computer system comprising:

a range of monitoring mechanisms;

at least one first processor that is adapted to:

employ some or all of the range of monitoring mechanisms; and perform at least one first Power-On Self-Test, POST, on the monitoring mechanisms; and perform at least one first Built-In Self-Test, BIST, on some or all of the monitoring mechanisms in a pre-determined sequence and at pre-determined times; and complete the employment of some or all of the range of monitoring mechanisms and the BISTs on some or all of the monitoring mechanisms within a time period known as the Process Safety Time, PST, or the Fault Tolerant Time Interval, FTTI; and generate first data, that is indicative of results of at least one said first POST and/or said first BIST; and transmit first data to at least one second processor; and at least one second processor that is adapted to:

compare the first data with second data, that is data indicative of expected results from at least one said first POST and/or said first BIST; and responsive to the comparison, determine if at least one said first POST and/or first BIST has passed or failed.

According to an eleventh aspect of the present invention there is provided a time-triggered computer system comprising:

a range of monitoring mechanisms;

at least one first processor core that is adapted to:

employ some or all of the range of monitoring mechanisms; and perform at least one first Power-On Self-Test, POST, on the monitoring mechanisms; and perform at least one first Built-In Self-Test, BIST, on some or all of the monitoring mechanisms in a pre-determined sequence and at pre-determined times; and complete the employment of some or all of the range of monitoring mechanisms and the BISTs on some or all of the monitoring mechanisms within a time period known as the Process Safety Time, PST, or the Fault Tolerant Time Interval, FTTI; and generate first data, that is indicative of results of at least one said first POST and/or said first BIST; and transmit first data to at least one second processor core; and at least one second processor core that is adapted to:

compare the first data with second data, that is data indicative of expected results from at least one said first POST and/or said first BIST; and responsive to the comparison, determine if at least one said first POST and/or first BIST has passed or failed.

Certain embodiments of the present invention provide a computer system that executes scheduled tasks with increased reliability and a reduced likelihood of a critical failure.

Certain embodiments of the present invention provide a computer system with a reduced likelihood of disruption as the need for processor resets is reduced.

Certain embodiments of the present invention provide a computer system that executes scheduled tasks with a higher level of diagnostic coverage.

Certain embodiments of the present invention provide a computer system and associated method that enables a series of Built-In Self-Tests to be performed and checked within the PST/FTTI.

Certain embodiments of the present invention provide a more reliable time-triggered computer system.

Certain embodiments of the present invention provide a computer system for use in safety critical environments, which has a lower likelihood of critical failure and thus improved safety.

Certain embodiments of the present invention provide a computer system which has a lower likelihood of failure and thus improved reliability.

Certain embodiments of the present invention provide a computer system with two processors or processor cores that each perform tasks according to a predetermined task schedule.

Certain embodiments of the present invention provide a computer system with two processors or processor cores that each perform tasks according to a predetermined task schedule and that can each control external devices via their respective outputs.

Certain embodiments of the present invention provide a computer system with a first processor or first processor core that performs POSTs and BISTs, with the results of these tests being checked independently by a second processor or processor core.

Certain embodiments of the present invention provide a computer system with two processors or processor cores that perform POSTs and BISTS, whereby each processor or processor core performs an independent cross-check of the results of the POSTs and BISTs performed by the other processor or processor core.

Certain embodiments of the present invention provide a computer system with a first and second processor (or processor core), whereby the second processor (or processor core) can place the system into a safe state if it determines that the first processor (or processor core) has failed a POST or BIST.

Certain embodiments of the present invention provide a computer system with fail-operational behaviour, whereby a first processor (or processor core) can continue to operate in the event that a second processor (or processor core) stops operating correctly.

DETAILED DESCRIPTION OF THE INVENTION

Embodiments of the present invention will now be described hereinafter, by way of example only, with reference to the accompanying drawings in which.

In the drawings like reference numerals refer to like parts.

Certain embodiments of the present invention can be implemented in order to improve the safety and reliability of computer systems that comprise one or more processors, some or all of which have been configured to run tasks according to a predetermined task schedule. It will be appreciated that whilst the following embodiments are described with respect to a system having two processors, other embodiments of the present invention may make use of a system with two processor cores which execute the same or similar steps as the examples with two processors.

Figure 5:
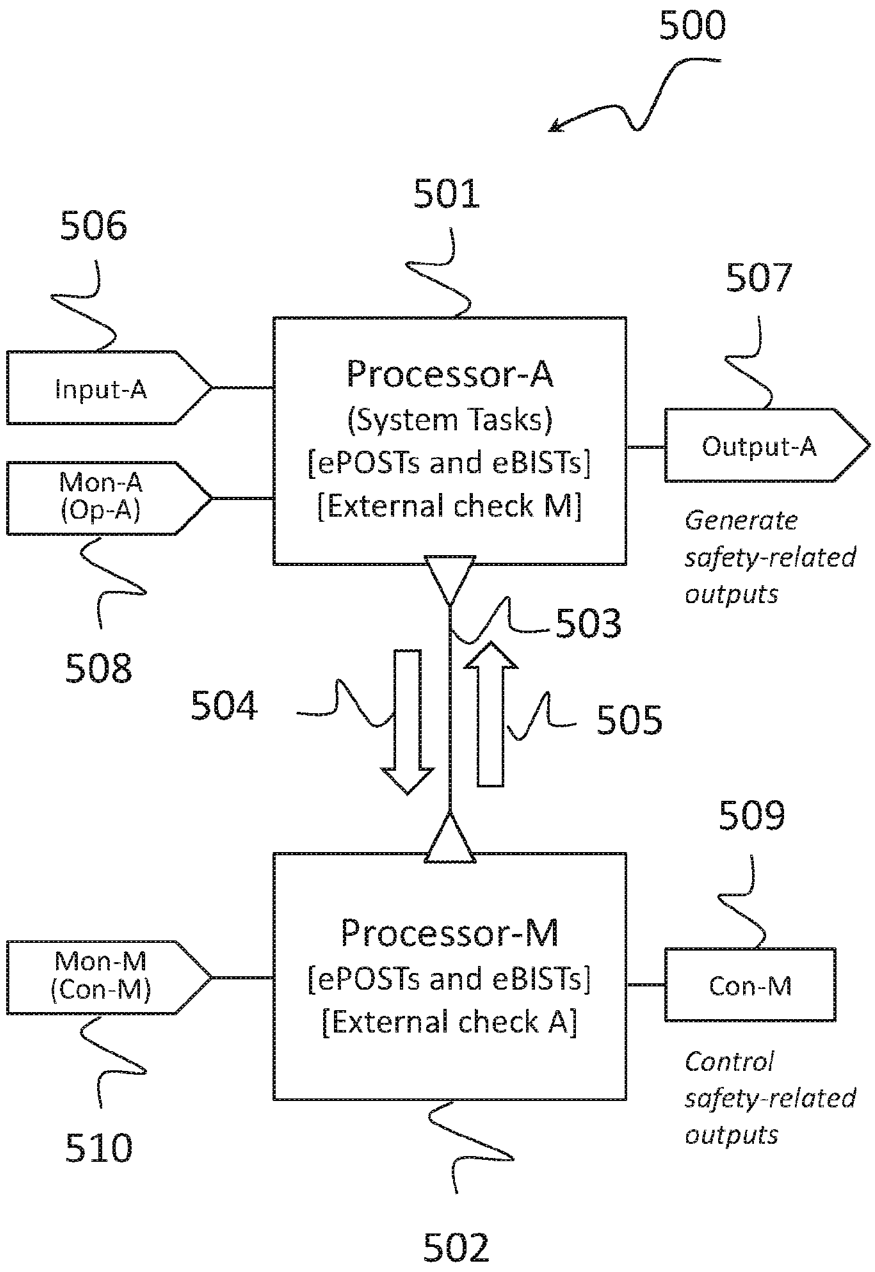
FIG. 5 illustrates a time-triggered computer system according to an embodiment of the present invention.

FIG. 5 illustrates in schematic form a time-triggered computer system 500 which comprises a first processor (referred to as Processor-A) 501. Processor-A is adapted to perform a series of POSTs which involves a processor reset. It will be appreciated that a processor reset is not always required when performing a POST. Processor-A then reports data (first data) from each POST to a second processor (referred to as Processor-M) 502. This data is reported/transmitted by means of POST-Data-A messages 504 that are transmitted over a Communication Channel 503 as part of one or more messages sent between Processor-A and Processor-M. Processor-A is also adapted to compare the contents of POST-Data-M messages 505 (sent by Processor-M over the Communication Channel as part of one or more messages sent between Processor-M and Processor-A) with data (fourth data) about the expected results from each of a series of POSTS performed by Processor-M. Thereafter, Processor-A is configured to operate in one of one or more pre-determined system modes.

In each of these system modes, Processor-A performs one or more BISTs without performing a processor reset. Processor-A then reports data (first data) from each BIST to Processor-M 502 by means of BIST-Data-A messages 504 that are transmitted over the Communication Channel 503 as part of one or more messages sent between Processor-A and Processor-M. In each of these system modes, Processor-A also compares the contents of BIST-Data-M messages 505 (sent by Processor-M over the Communication Channel as part of one or more messages sent between Processor-M and Processor-A) with data (fourth data) about the expected results from each of a series of BISTs performed by Processor-M. In certain embodiments of the present invention, in each of these system modes Processor-A may also perform one or more BISTs that include performing a processor reset. However, a processor rest is not always required when performing a BIST. In each of these system modes, Processor-A also executes one or more tasks according to a predetermined task schedule.

Computer system 500 also has a Processor-M 502 adapted to perform a series of POSTs which involves a processor reset. However, a processor rest is not always required when performing a POST. Processor-M then reports data (third data) from each POST to Processor-A 501 by means of POST-Data-M messages 505 that are transmitted over the Communication Channel 503 as part of one or more messages sent between Processor-M and Processor-A. Processor-M is also adapted to compare the contents of POST-Data-A messages 504 (sent by Processor-A over a Communication Channel as part of one or more messages sent between Processor-A and Processor-M) with data (second data) about the expected results from each of a series of POSTs performed by Processor-A. Thereafter, Processor-M is adapted to operate in one of one or more pre-determined system modes.

In each of these system modes, Processor-M performs one or more BISTs without performing a processor reset and reports data (third data) from each BIST to Processor-A by means of BIST-Data-M messages 504 sent over the Communication Channel. In each system mode, Processor-M is further adapted to compare the contents of BIST-Data-A messages 504 sent by Processor-A over the Communication Channel 503 with data (second data) about the expected results from each of a series of BISTs performed by Processor-A. In certain embodiments of the present invention, in each system mode Processor-M also performs one or more BISTs that include performing a processor reset. However, a processor reset is not always required when performing a BIST.

Also included within the computer system 500 is a memory element (not shown) that stores the software to be executed by the first processor and the second processor. This includes the software associated with each of the POSTs and each of the BISTs and the software associated with the predetermined task schedule to be executed on the first processor. It will be appreciated that according to certain other embodiments of the present invention, multiple memory elements may be provided that each stores the respective software to be executed on a specific processor. It will also be appreciated that these memory elements may be external or internal to the first processor and second processors. For example, the first and second processor may each have their own internal memory element.

Also included within the computer system 500 is the Communication Channel 503 adapted to support the transmission of messages between Processor-A and Processor-M, and to support the transmission of messages between Processor-M and Processor-A. That is to say, the Communication Channel is bi-directional.

The computer system 500 also includes a first input (referred to as Input-A) 506 adapted to enable Processor-A to acquire data for any tasks that execute on Processor-A and a first output (referred to as Output-A) 507 adapted to enable Processor-A to generate any safety-related outputs from the computer system. These outputs are generated if it is determined by Processor-A by means of tasks, self tests and Monitor-A that Processor-A is operating correctly and if it is determined by means of tasks and eBIST-Data-M messages that Processor-M is also operating correctly.

The computer system 500 also has a first monitor element (referred to as Monitor-A) 508 adapted to enable Processor-A to determine whether Output-A 507 is in its required state.

The computer system 500 also has a first control element (referred to as Control-M) 509 adapted to ensure that any and all safety-related outputs from the computer system are held in a safe state. Control-M holds outputs in a safe state if, by means of eBIST-Data-A messages, Processor-M determines that Processor-A may not be operating correctly, or if, by means of self tests or Monitor-M 510, Processor-M determines that itself may not be operating correctly.

The computer system 500 also has a second monitor element (referred to as Monitor-M) 510 adapted to enable Processor-M to determine whether Control-M is in its required state.

In accordance with this embodiment, a computer system is provided that executes scheduled tasks with increased reliability and a reduced likelihood of a critical failure.

The computer system 500 is arranged to execute sets of tasks in accordance with one or more predetermined system modes under control of a Processor-A. The task schedules for each task set on Processor-A determine the order in which tasks are executed and specify whether or not specific tasks are allowed to pre-empt (or interrupt) other tasks.

In FIG. 5, Processor-A and Processor-M each have a single hardware core and a single "soft" processor core. However, it will be appreciated that according to certain other embodiments of the present invention Processor-A and/or Processor-M may comprise one or more "soft" or "hard" processor cores (that execute some software) and/or one or more hardware cores (that do not execute any software).

In FIG. 5, Processor-A and Processor-M are commercial-off-the-shelf (COTS) microcontroller. However, it will be appreciated that according to certain other embodiments of the present invention, Processor-A and/or Processor-M may comprise one or more processor chips, such as a commercial-off-the-shelf (COTS) microcontroller or microprocessor, Digital Signal Processor (DSP), Field-Programmable Gate Array (FPGA), Application Specific Integrated Circuit (ASIC) or similar devices. According to certain other embodiments of the present invention, Processor-A and/or Processor-M may comprise one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

In FIG. 5, Processor-A and Processor-M comprise a time-triggered scheduler in the form of a time triggered cooperative (TTC) scheduler. However, according to certain other embodiments of the present invention Processor-A and/or Processor-M may comprise a time triggered hybrid (TTH) scheduler. These schedulers are described in detail in Reference 2.

The computer system 500 is arranged to monitor the operation of Processor-A by means of Processor-M.

As noted above, Processor-M will operate in accordance with one or more predetermined system modes.

In FIG. 5, Processor-A and Processor-M are processors of a different type. That is to say that Processor-A is based on a microcontroller with a particular processor core, and Processor-M is based on a microcontroller manufactured by a different organisation and with a different processor core. It will be appreciated that having such differences between Processor-A and Processor-M may reduce the likelihood of common-cause failures on the two processors, and that the reduction in the likelihood of common-cause failures may be considered particularly important in computer systems that are safety-critical in nature. However, it will be appreciated that according to certain other embodiments of the present invention, Processor-A and Processor-M may be processors of the same type. According to certain other embodiments of the present invention, the difference between Processor-A and Processor-M may be different to what is shown in FIG. 5. It is noted that use of different processors may be considered appropriate in designs that are classed as 'Safety Integrity Level' (SIL) 3 or 4 in Reference 8.

In FIG. 5, Processor-A has, compared with Processor-M, greater processing capacity. This is because Processor-A is required to both monitor the activity of Processor-M and run the software required to deliver the required system functionality (preferably by means of tasks). However, it will be appreciated that according to certain other embodiments of the present invention, Processor-A and Processor-M may have the same processing capacity or Processor-M may have a greater processing capacity.

In FIG. 5, Processor-A has, compared with Processor-M, larger memory. This is because it is required to both monitor the activity of Processor-M and run the software required to deliver the required system functionality (preferably by means of tasks). However, it will be appreciated that according to certain other embodiments of the present invention, Processor-A and Processor-M may have the same size memory or Processor-M may have a greater memory.

As with a conventional computer system, both POSTs and BISTs are performed in the computer system 500. In this specification, these self-tests may be referred to as external POSTs (ePOSTs) and external BISTs (eBISTs). In this context, 'external' means that the ePOST or eBIST is carried out within the system by the processor concerned (that is, the processor tests itself), but the results of these tests are also reported to—and checked by—a second processor in the system.

It will be appreciated that in this system 500, Processor-M checks the results of POSTs and BISTs that are performed on Processor-A while Processor-A checks the results of POSTs and BISTs that are performed on Processor-M. However, it will be appreciated that according to certain other embodiments of the present invention, the results of POSTs and BISTs performed by Processor-A may be checked by other processors in addition to or as an alternative to Processor-M. It will also be appreciated that the results of POSTs or BISTs performed by Processor-M may be checked by other processors (e.g., a third processor (not shown)) in addition to or as an alternative to Processor-A.

In FIG. 5, Processor-A performs ePOSTs that involve a processor reset and reports data from each ePOST to Processor-M by means of ePOST-Data-A messages that are sent over a Communication Channel.

Processor-M will then compare the contents of each ePOST-Data-A message with the expected results of the corresponding ePOST. By means of this comparison, Processor-M will determine whether the ePOST performed on Processor-A has passed or has failed.

In FIG. 5, the sequence of ePOSTs that is performed on Processor-A is pre-determined. Failure of the ePOSTs to follow this pre-determined sequence is identified as a fault by Processor-M and the ePOST or ePOSTs that are performed out of sequence are determined to have failed. However, it will be appreciated that according to certain other embodiments of the present invention, the POST sequence is not pre-determined.

Additionally, in FIG. 5, the time intervals between the ePOSTs that are performed on Processor-A is pre-determined. Failure of the reported ePOSTs to match the pre-determined intervals-because tests are performed more quickly than expected or more slowly than expected—are identified as a fault by Processor-M and the ePOST or ePOSTs that are performed at incorrect times are determined to have failed. However, it will be appreciated that according to certain other embodiments of the present invention, the time interval between POSTs is not pre-determined.

In FIG. 5, Processor-A performs eBISTs during its normal operation that do not require processor resets and reports data from each eBIST to Processor-M by means of eBIST-Data-A messages that are sent over the Communication Channel. Processor-M then compares the contents of each eBIST-Data-A message with the expected results of the corresponding eBIST. By means of this comparison, Processor-M determines whether the eBIST performed on Processor-A has passed or has failed.

In FIG. 5, the sequence of eBISTs that is performed on Processor-A is pre-determined. Failure of the eBISTs to follow this pre-determined sequence is identified as a fault by Processor-M and the eBIST or eBISTs that are performed out of sequence are determined to have failed. However, it will be appreciated that according to certain other embodiments of the present invention, the BIST sequence is not pre-determined.

In FIG. 5, the sequence of eBISTs that is performed on Processor-A remains the same in any and all operating modes of Processor-A. However, it will be appreciated that according to certain other embodiments of the present invention, the BIST sequence may be different in different operating modes.

In FIG. 5, the time intervals between the eBISTs that are performed on Processor-A are pre-determined. Failure of the reported eBISTs to match the pre-determined intervals-because tests are performed more frequently than expected or less frequently than expected—are then identified as a fault by Processor-M and the eBIST or eBISTs that are performed at incorrect times are determined to have failed. However, it will be appreciated that according to certain other embodiments of the present invention, the time interval between BISTs is not pre-determined.

In FIG. 5, the time intervals between eBISTs that are performed on Processor-A will remain the same in any and all operating modes of Processor-A. However, it will be appreciated that according to certain other embodiments of the present invention, the time interval between BISTs may be different in different operating modes.

Whilst in FIG. 5 BISTs are performed on Processor-A without performing any processor resets, it will be appreciated that in certain embodiments of the present invention Processor-A may also perform one or more eBISTs that include performing a processor reset.

In FIG. 5, Processor-M also performs ePOSTs that involve a processor reset and reports data from each ePOST to Processor-A by means of ePOST-Data-M messages that are sent over the Communication Channel.

Processor-A compares the contents of each ePOST-Data-M message with the expected results of the corresponding ePOST. By means of this comparison, Processor-A determines whether the ePOST performed on Processor-M has passed or has failed.

In FIG. 5, the sequence of ePOSTs that is performed on Processor-M is pre-determined. Failure of the ePOSTs to follow this pre-determined sequence is identified as a fault by Processor-A and the ePOST or ePOSTs that are performed out of sequence are determined to have failed. However, it will be appreciated that according to certain other embodiments of the present invention, the POST sequence is not pre-determined.

In FIG. 5, the time intervals between the ePOSTs that are performed on Processor-M is also pre-determined. Failure of the reported ePOSTs to match the pre-determined intervals-because tests are performed more quickly than expected or more slowly than expected—are identified as a fault by Processor-A and the ePOST or ePOSTs that are performed at incorrect times are determined to have failed. However, it will be appreciated that according to certain other embodiments of the present invention, the time interval between POSTs is not pre-determined.

In FIG. 5, Processor-M performs eBISTs during its normal operation that do not require processor resets and reports data from each eBIST to Processor-A by means of eBIST-Data-M messages that are sent over the Communication Channel. Processor-A compares the contents of each eBIST-Data-M message with the expected results of the corresponding eBIST. By means of this comparison, Processor-A determines whether the eBIST performed on Processor-M has passed or has failed.

In FIG. 5, the sequence of eBISTs that is performed on Processor-M is also pre-determined. Failure of the eBISTs to follow this pre-determined sequence is identified as a fault by Processor-A and the eBIST or eBISTs that are performed out of sequence are determined to have failed. However, it will be appreciated that according to certain other embodiments of the present invention, the BIST sequence is not pre-determined.

In FIG. 5, the sequence of eBISTs that is performed on Processor-M remains the same in any and all operating modes of Processor-M. However, it will be appreciated that according to certain other embodiments of the present invention, the BIST sequence may be different in different operating modes.

In FIG. 5, the time intervals between the eBISTs that are performed on Processor-M is also pre-determined. Failure of the reported eBISTs to match the pre-determined intervals-because tests are performed more frequently than expected or less frequently than expected—is identified as a fault by Processor-A and the eBIST or eBISTs that are performed at incorrect times are determined to have failed. However, it will be appreciated that according to certain other embodiments of the present invention, the time interval between BISTs is not pre-determined.

In FIG. 5, the time intervals between eBISTs that are performed on Processor-M remains the same in any and all operating modes of Processor-M. However, it will be appreciated that according to certain other embodiments of the present invention, the time interval between BISTs may be different in different operating modes.

Whilst in FIG. 5 BISTs are performed on Processor-M without performing any processor resets, it will be appreciated that in certain embodiments of the present invention Processor-M may also perform one or more eBISTs that include performing a processor reset.

The Communication Channel 503 is adapted to support the transmission of ePOST-Data-A messages and eBIST-Data-A messages between Processor-A and Processor-M, and to support the transmission of ePOST-Data-M messages and eBIST-Data-M messages between Processor-M and Processor-A.

In FIG. 5, the Communication Channel is used to synchronise the activities on Processor-A and Processor-M using a form of Shared-Clock Scheduler, as described in Reference1 and Reference 2. However, according to certain other embodiments of the present invention, activities may be synchronised via other mechanisms.

In FIG. 5, data transfers between Processor-A and Processor-M are supported by means of Tick Messages sent from Processor-A to Processor-M and data transfers between Processor-M and Processor-A are supported by means of Ack Messages sent from Processor-M to Processor-A, as described in in Reference1 and Reference 2. However, according to certain other embodiments of the present invention, data transfers may be supported by other mechanisms.

In FIG. 5, the Communication Channel uses a standard serial protocol that is suitable for short-distance communication. In FIG. 5, this is 'RS-232'. However, according to certain other embodiments of the present invention other protocols may be used such as SPI.

In FIG. 5, the Input-A 506 has one or more digital input pins on Processor-A plus associated external interfacing hardware that is required to adapt voltages in the system environment to meet the voltage requirements of the digital input pins. However, it will be appreciated that according to certain other embodiments of the present invention, the Input-A may have one or more analogue input pins on Processor-A plus associated external interfacing hardware that may be required to adapt voltages in the system environment to meet the voltage requirements of the analogue input pins and provide any necessary filtering of input signals.

In FIG. 5, the Input-A has a software and hardware interface to one or more serial communication buses (such as CAN or Ethernet or RS-232' or SPI).

In FIG. 5, Output-A is set to a Fail-Safe-State if Processor-A determines—by means of ePOST-Data-M messages—that Processor-M has failed an ePOST. In FIG. 5, Output-A is also set to a Fail-Safe-State if Processor-A determines—by means of eBIST-Data-M messages—that Processor-M has failed an eBIST.

In FIG. 5, the Output-A 507 has one or more digital output pins on Processor-A plus associated external interfacing hardware that is required to adapt voltages in the system environment to meet the voltage requirements of the digital output pins. A Fail-Safe State on any digital output pin is a 0V output. However, it will be appreciated that according to certain other embodiments of the present invention, the Output-A may have analogue output pins on Processor-A plus associated external interfacing hardware that are required to adapt voltages in the system environment to meet the voltage requirements of the analogue output pins and provide any necessary filtering of output signals. A Fail-Safe State on any analogue output pins is a 0V output. It will also be appreciated that other Fail-Safe States could be used in other embodiments of the present invention.

In FIG. 5, the Output-A 507 has a software and hardware interface to one or more serial communication buses (such as CAN or Ethernet or RS-232' or SPI). In FIG. 5, a Fail-Safe State on any communication buses means that no messages are sent by Processor-A on the bus concerned.

In FIG. 5, Monitor-A 508 has one or more digital input pins on Processor-A plus associated external interfacing hardware required to adapt voltages from one or more digital output pins on Output-A to meet the voltage requirements of the digital input pins on Processor-A.

It will be appreciated that according to certain other embodiments of the present invention, Monitor-A has one or more analogue input pins on Processor-A plus associated external interfacing hardware that is required to adapt voltages from one or more analogue output pins on Output-A to meet the voltage requirements of the analogue input pins on Processor-A.

In FIG. 5, Monitor-A comprises a software and hardware interface to one or more communication buses (such as CAN or Ethernet or 'RS-232' or SPI) that are connected to Processor-A in a manner that allows Processor-A to monitor any communications on the one or more communication buses.

In FIG. 5, Control-M 509 is set to a Fail-Safe-State if Processor-M determines—by means of ePOST-Data-A messages—that Processor-A has failed an ePOST. Control-M is also set to a Fail-Safe-State if Processor-M determines—by means of eBIST-Data-A messages—that Processor-A has failed an eBIST.

In FIG. 5, Control-M has one or more digital switches that provide a means of disabling one or more digital output pins on Processor-A. A Fail-Safe State on any digital output pins is a 0V output. It will also be appreciated that other Fail-Safe States could be used in other embodiments of the present invention.

According to certain other embodiments of the present invention, Control-M has one or more analogue switches that provide a means of disabling one or more analogue output pins on Processor-A. A Fail-Safe State on any analogue output pins is also a 0V output although it will be appreciated that other Fail-Safe States could be used in other embodiments of the present invention.

In FIG. 5, Control-M also has one or more digital switches that provide a means of disabling transceivers that provide a link to one or more serial communication buses (such as CAN or Ethernet or RS-232' or SPI), thereby allowing Processor-M to prevent Processor-A from sending any messages on said communication buses when Control-M is in a Fail-Safe State.

In FIG. 5, Monitor-M 510 has one or more digital input pins on Processor-M plus associated external interfacing hardware required to adapt voltages in the system environment to meet the voltage requirements of the digital input pins on Processor-M.

However, according to certain other embodiments of the present invention, Monitor-M has one or more analogue input pins on Processor-M plus associated external interfacing hardware that is required to adapt voltages in the system environment to meet the voltage requirements of the analogue input pins and provide any necessary filtering of input signals.

In FIG. 5, the Monitor-M comprises a software and hardware interface to one or more communication buses (such as CAN or Ethernet or 'RS-232' or SPI) that are connected to Processor-A in a manner that allows Processor-M to monitor any communications on the one or more communication buses.

Figure 6:
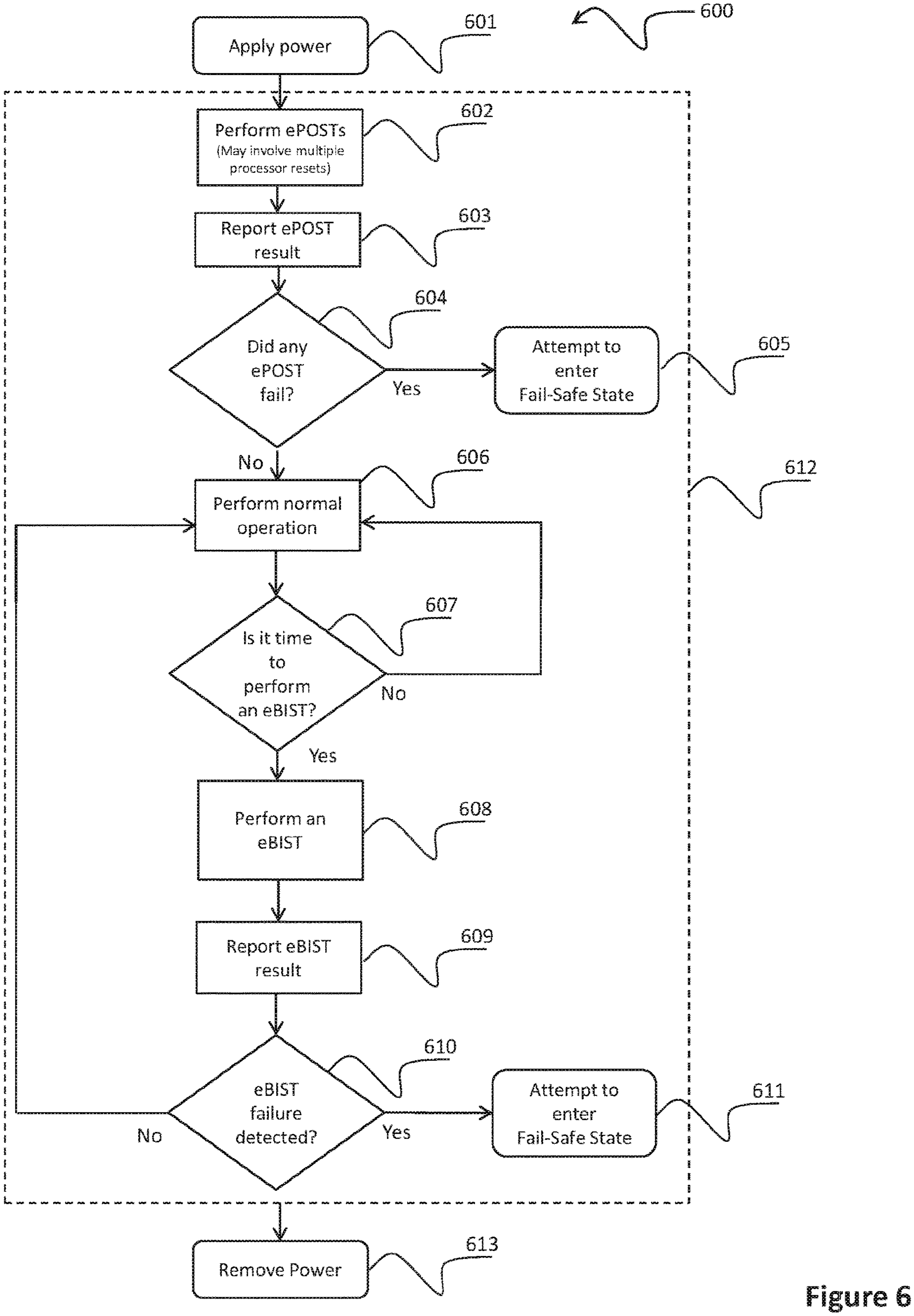
FIG. 6 illustrates a process for performing POSTs and BISTs on a processor according to an embodiment of the present invention.
Figure 7:
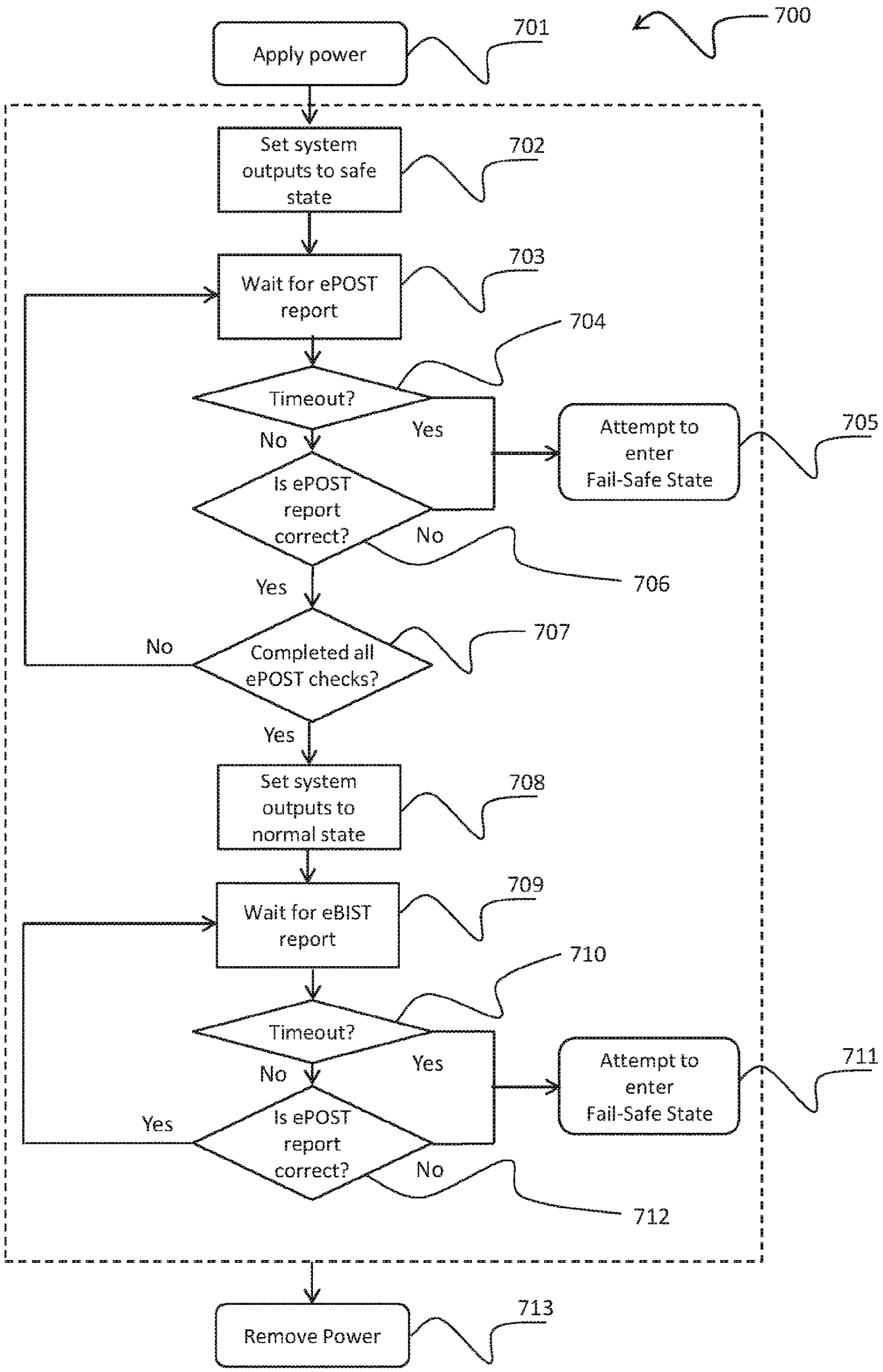
FIG. 7 illustrates a process for checking the results of POSTs and BISTs by a processor according to an embodiment of the present invention.

Turning now to FIGS. 6 and 7, FIG. 6 shows a process 600 for performing ePOSTs and eBISTs on a processor, while FIG. 7 shows a process 700 for checking the results from ePOSTs and eBISTs that are performing on a given processor by means of another processor in the system.

In this context, the use of ePOST and eBIST refers to the fact that the tests performed are subject to assessment by an external processor. This means that, for example in FIG. 5, the eBISTs performed on Processor-A will be subject to checking by Processor-M (and vice versa).

In FIG. 6, in a first step 601 power is applied to the processor that is performing the ePOSTs. The processor then performs ePOSTs in a second step 602. Performing such ePOSTs may or may not involve a number of processor resets as described above. Data indicative of the results of the ePOSTs is then reported/transmitted to another processor in the system for checking in a third step 603. This checking process is detailed in FIG. 7 as discussed below.

It will be appreciated that, in the example of FIG. 5, this means: [i] the results of the ePOSTs on Processor-A will be sent to Processor-M for checking; and [ii] the results of the ePOSTs on Processor-M will be sent to Processor-A for checking.

It will be appreciated that data is generated for each ePOST performed. This data may be referred to as a test report. The data/test report that is generated by the processor that is performing ePOSTs includes test results. For example, the data may include data defining a predefined 'Processor Fault Code' (or PFC) that identifies the fault that was detected when a particular fault was injected in the system during a given ePOST check. For example, PFC '3' may indicate that a test of the iTETMM triggered a fault indicates that a task overrun was detected. This PFC value (3) is then reported to the processor that is performing the checks.

Additionally, the data/test report that is generated by the processor that is performing ePOSTs will also include test data. For example, tests of an analogue-to-digital converter (ADC) may involve reading values from a fixed reference voltage. The values read from the reference voltage in such tests are reported to the (monitoring) processor that is performing checks of the ePOSTs, so that the monitoring processor can repeat the checks.

Additionally, according to certain embodiments of the present invention, the data/test reports that are generated by the processor that is performing ePOSTs are also generated in a pre-determined sequence. This may mean, as a non-limiting example, that if PFCs are reported during ePOSTs and there are 10 ePOSTs performed, that the PFC sequence {1, 2, 3, 4, 5, 6, 7, 8, 9, 10} may be reported to the monitoring processor.

According to certain embodiments of the present invention, the data/test reports that are generated by the processor that is performing ePOSTs are also generated at pre-determined time intervals. This may mean, as a non-limiting example, that if PFCs are reported during ePOSTs and there are 10 ePOSTs performed, that the PFCs are reported with a maximum time interval of 50 ms between each report.

If the processor that is performing the ePOSTs determines that any of these tests has failed in a fourth step 604, then the system—in this example—is intended to enter (and remain in) a Fail-Safe State in a fifth step 605. The way in which a given processor can enter a Fail-Safe State may depend on the processor's role in the system.

For example, if Processor-A in FIG. 5 is performing ePOSTs in line with the example shown in FIG. 6 and this processor determines that the system needs to enter a Fail-Safe State, then Processor-A may attempt to maintain Output-A in a state (e.g. 'Logic 0' in the case of digital outputs) in which the risk of harm to users of the system or those in the vicinity of the system is very low.

If Processor-M in FIG. 5 is performing ePOSTs in line with the example shown in FIG. 6 and this processor determines that the system needs to enter a Fail-Safe State, then Processor-M may attempt to maintain Control-M in a state (e.g. 'Logic 0') in which the safety-related outputs from the computer system are forced into a state (e.g. 'Logic 0' in the case of digital outputs) in which the risk of harm to users of the system or those in the vicinity of the system is very low.

Returning to FIG. 6, if all of the ePOSTs are passed, the system will begin to perform its normal operation in a sixth step 606. At a seventh step 607, periodically during the normal operation, the system will perform eBISTs in an eighth step 608. As with the ePOSTs, the results of the eBISTs are reported to another processor in the system in a ninth step 609.

It will be appreciated that, in the example in FIG. 5, this means: [i] the results of the eBISTs on Processor-A will be sent to Processor-M for checking; and [ii] the results of the eBISTs on Processor-M will be sent to Processor-A for checking.

If the processor that is performing eBISTs detects a test failure in a tenth step 610, the system will enter and remain in a Fail-Safe State in an eleventh step 611. As with ePOSTs, the way in which a given processor can enter a Fail-Safe State may depend on the processor's role in the system.

For example, if Processor-A in FIG. 5 is performing eBISTs in line with the example shown in FIG. 6 and this processor determines that the system needs to enter a Fail-Safe State, then Processor-A may attempt to maintain Output-A in a state (e.g. 'Logic 0' in the case of digital outputs) in which the risk of harm to users of the system or those in the vicinity of the system is very low.

If Processor-M in FIG. 5 is performing eBISTs in line with the example shown in FIG. 6 and this processor determines that the system needs to enter a Fail-Safe State, then Processor-M may attempt to maintain Control-M in a state (e.g. 'Logic 0') in which the safety-related outputs from the computer system are forced into a state (e.g. 'Logic 0' in the case of digital outputs) in which the risk of harm to users of the system or those in the vicinity of the system is very low.

Returning to FIG. 6, if the processor that is performing eBISTs does not detect a test failure in the tenth step 610, then it will return to normal operation as indicated by the sixth step 606, until the next eBIST is due.

It will be appreciated that in a typical design the system will-after power is applied in the first step 601—keep operating as indicated in the sixth step 606 until a fault is detected as indicated by steps 604, 605, 610, 611 or until power is removed from the system in a twelfth step 613.

As noted above, FIG. 6 shows an example of a possible process for performing ePOSTs and eBISTs on a processor, while FIG. 7 shows an example of a process for checking the results from ePOSTs and eBISTs that are performed on a given processor by means of another processor in the system.

Turning now to the process 700 shown in FIG. 7, after power is applied in a first step 701, the checking process begins by setting the system outputs to a safe state in a second step 702. In this example, the outputs will remain in this (safe) state until all of the ePOST checks have been completed successfully as indicated in a seventh step 707. The way in which a given processor can set its outputs to a safe state may depend on the processor's role in the system.

For example, if Processor-A in FIG. 5 is checking the ePOST reports from Processor-M in line with the example shown in FIG. 7, then setting the system outputs to a safe state may involve maintaining Output-A in a state (e.g. 'Logic 0' in the case of digital outputs) in which the risk of harm to users of the system or those in the vicinity of the system is very low.

If Processor-M in FIG. 5 is checking the ePOST reports from Processor-A in line with the example shown in FIG. 7, then setting the system outputs to a safe state may involve maintaining Control-M in a state (e.g. 'Logic 0') in which the safety-related outputs from the computer system are forced into a state (e.g. 'Logic 0' in the case of digital outputs) in which the risk of harm to users of the system or those in the vicinity of the system is very low.

Returning to FIG. 7, having set the system outputs to a safe state in the second step 702, the checking process continues by waiting for an ePOST report in a third step 703 from the processor that is performing the ePOSTs. In FIG. 7, the waiting process includes a 'timeout' element in a fourth step 704. However, such a timeout element is not necessarily required. Use of a timeout element is possible because, as noted above, the expected time interval between each ePOST test report can be known in advance. This will provide greater confidence in the testing process by allowing the processor performing the checking process to ensure that—for example—the processor being checked is performing activities at the expected rate. In this way, the processor performing the checking process is acting like a version of the traditional (watchdog based) dynamic switch, but doing so with a greater level of diagnostic coverage.

In situations where—as in FIG. 7—the processor that is performing the checking process determines that an ePOST result has not been provided within the expected time interval, then this processor will attempt to maintain the system in a Fail-Safe State at a fifth step 705. This may mean—for example—that the processor that is performing the checking process enters a simple loop in which it performs certain activities (such as feeding its internal watchdog timer) while maintaining the system outputs in a safe state. As shown in FIG. 7, the processor performing the checking process is expected to remain in this Fail-Safe State until power is removed from the system.

If no timeout occurs in the fourth step 704, the checking process then involves confirming that the results of the ePOST report are correct in a sixth step 706.

As noted above, the expected sequence of ePOST test reports can be known in advance. This will provide greater confidence in the testing process by allowing the processor performing the checking process to ensure that—for example—the processor being checked is not simply 'stuck in a loop' where it performs the same test repeatedly. It will be appreciated that this type of 'looping' behaviour may not be detected by the processor being checked in a traditional computer system.

As noted above, the test reports that are generated by the processor that is performing ePOSTs include test results (such as PFCs) and test data. Where test data is provided, this will provide greater confidence in the testing process by allowing the processor performing the checking process to use the data provided to repeat some of the test process that was conducted on the processor that was performing the test. As a non-limiting example, an ePOST might involve checking that the processor performing the ePOST is being operated at an ambient temperature that is within the range specified by the manufacturer of the processor. A fault injection in this case might involve simulating an input (on the processor performing the test) from a temperature sensor that is above the maximum temperature range permitted for the processor. In this case, the processor that was performing the test may send both a test result and the injected (high) temperature value to the processor that was performing the test. The processor performing the checking process can then confirm the assessment carried out by the processor performing the test.

In situations where—as shown in FIG. 7—the processor that is performing the checking process determines that an ePOST has failed, then this processor will (again) attempt to maintain the system in a Fail-Safe State as indicated in the fifth step 705.

In situations where—as shown in FIG. 7—the processor that is performing the checking process determines that all ePOSTs have completed successfully in the seventh step 707, then this processor will set the system outputs to a normal state in an eighth step 708. The way in which a given processor can set its outputs to a normal state as indicated by the eighth step 708 may depend on the processor's role in the system.

For example, if Processor-A in FIG. 5 is checking the ePOST reports from Processor-M in line with the example shown in FIG. 7, then setting the system outputs to a normal state may involve allowing the tasks that are executing on Processor-A to set Output-A in a state required to support the normal operation of the system.

If Processor-M in FIG. 5 is checking the ePOST reports from Processor-A in line with the example shown in FIG. 7, then setting the system outputs to a normal state may involve maintaining Control-M in a state (e.g. 'Logic 1') in which the safety-related outputs from the computer system are under the control of the tasks executing on Processor-A.

Returning back to FIG. 7, after the system outputs have been set to a normal state in the eighth step 708, the processor that is performing checks will wait for the first eBIST report in a ninth step 709. As shown in FIG. 7, this waiting process (again) includes a 'timeout' element as indicated at a tenth step 710. However, such a timeout element is not necessarily required. Use of a timeout element is possible because, as noted above, the expected time interval between each eBIST test report can be known in advance.

In situations where—as shown in FIG. 7—the processor that is performing the checking process determines that an eBIST result has not been provided within the expected time interval, then this processor will attempt to maintain the system in a Fail-Safe State as indicated by an eleventh step 711.

If no timeout occurs in the tenth step 710, the checking process then involves confirming that the results of the eBIST report are correct in a twelfth step 712.

As noted above, the expected sequence of eBIST test reports can be known in advance. This provides greater confidence in the testing process by allowing the processor performing the checking process to ensure that—for example—the processor being checked is not simply 'stuck in a loop' where it performs the same test repeatedly. Again, it will be appreciated that this type of 'looping' behaviour may not be detected by the processor being checked.

As noted above, the test reports that are generated by the processor that is performing eBISTs has test results (such as PFCs) and test data. Where test data are provided, this will provide greater confidence in the testing process by allowing the processor performing the checking process to use the data provided to repeat some of the test process that was conducted on the processor that was performing the test.

In situations where—as shown in FIG. 7—the processor that is performing the checking process determines that an eBIST has failed, then this processor will (again) attempt to maintain the system in a Fail-Safe State as indicated in the eleventh step 711.

In situations where—as shown in FIG. 7—the processor that is performing the checking process determines that the eBIST has completed successfully in the twelfth step 712, then this processor will wait for the next eBIST test report as indicated by the ninth step 709.

The process 700 described with respect to FIG. 7 will continue until power is removed from the system in a thirteenth step 713.

It will be appreciated that-unlike the iPOST/iBIST process performed by a conventional computer system (illustrated by way of example in FIG. 3)—the processor that is performing ePOSTs/eBISTs (illustrated by way of example in FIG. 6) is no longer simply checking itself. Instead, there is a second processor that is checking the test results.

It will also be appreciated that, as in FIG. 5, it is expected that Processor-M will check the operation of Processor-A by means of the processes illustrated in FIG. 6 and FIG. 7, and that Processor-A will check the operation of Processor-M by means of the processes illustrated in FIG. 6 and FIG. 7.

Figure 1:
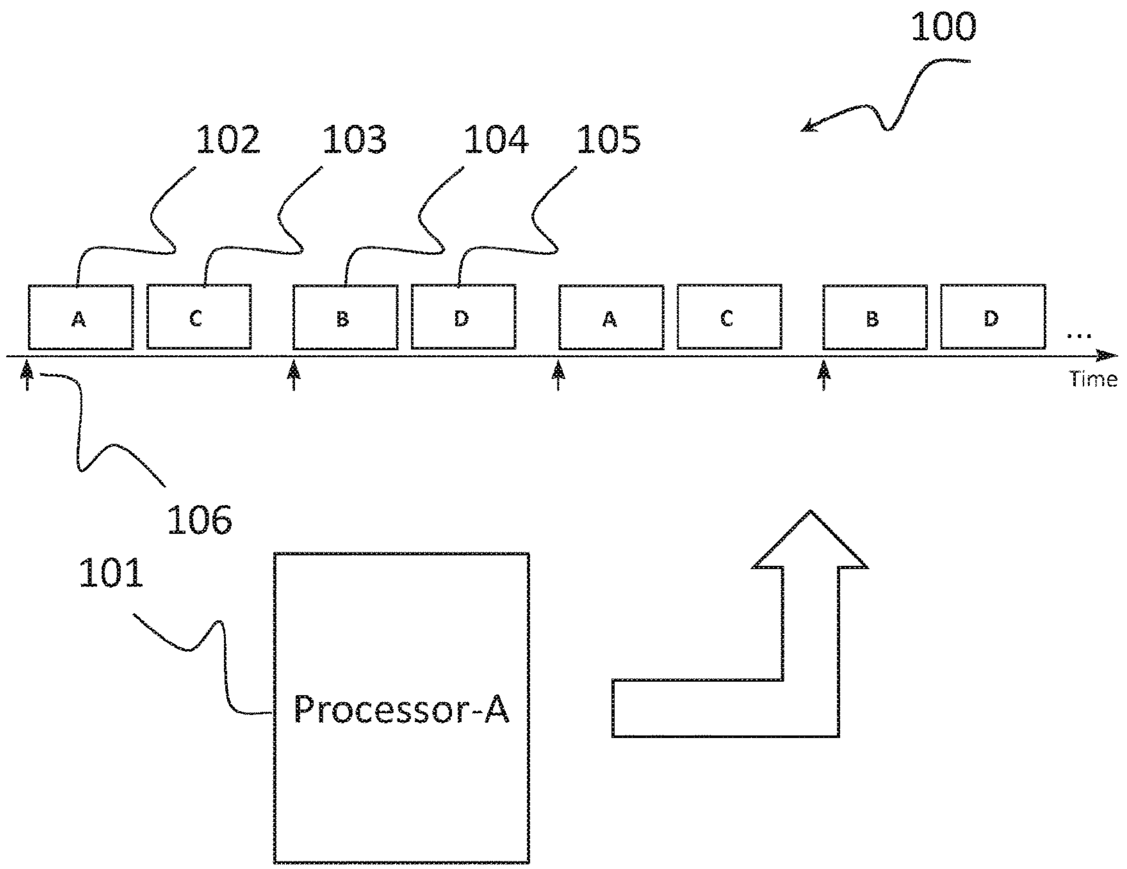
PRIOR ART Figure 1
FIG. 1 illustrates a prior art time-triggered computer system.
Figure 2:
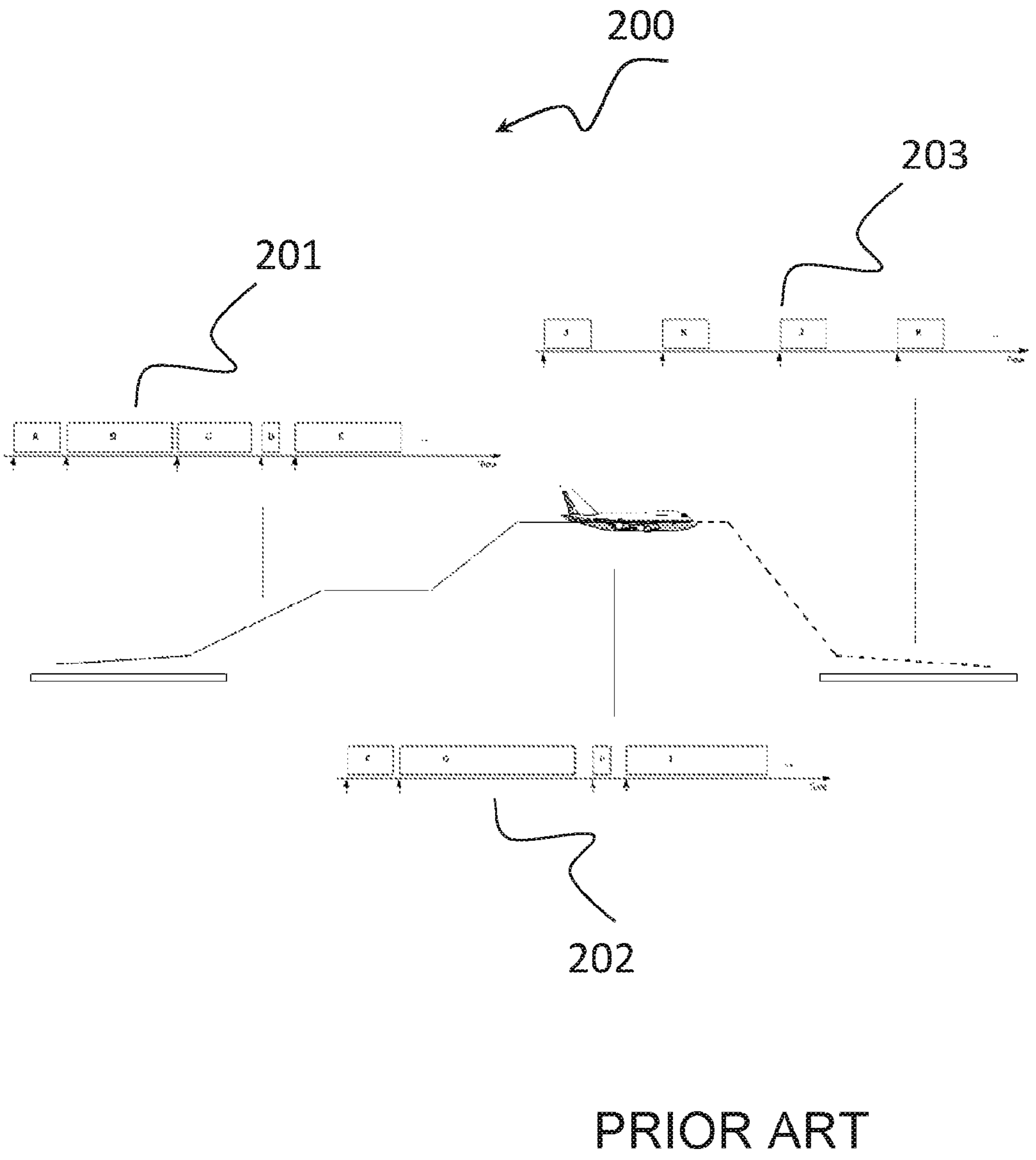
FIG. 2 illustrates a prior art schematic representation of a software architecture for an aircraft system.
Figure 3:
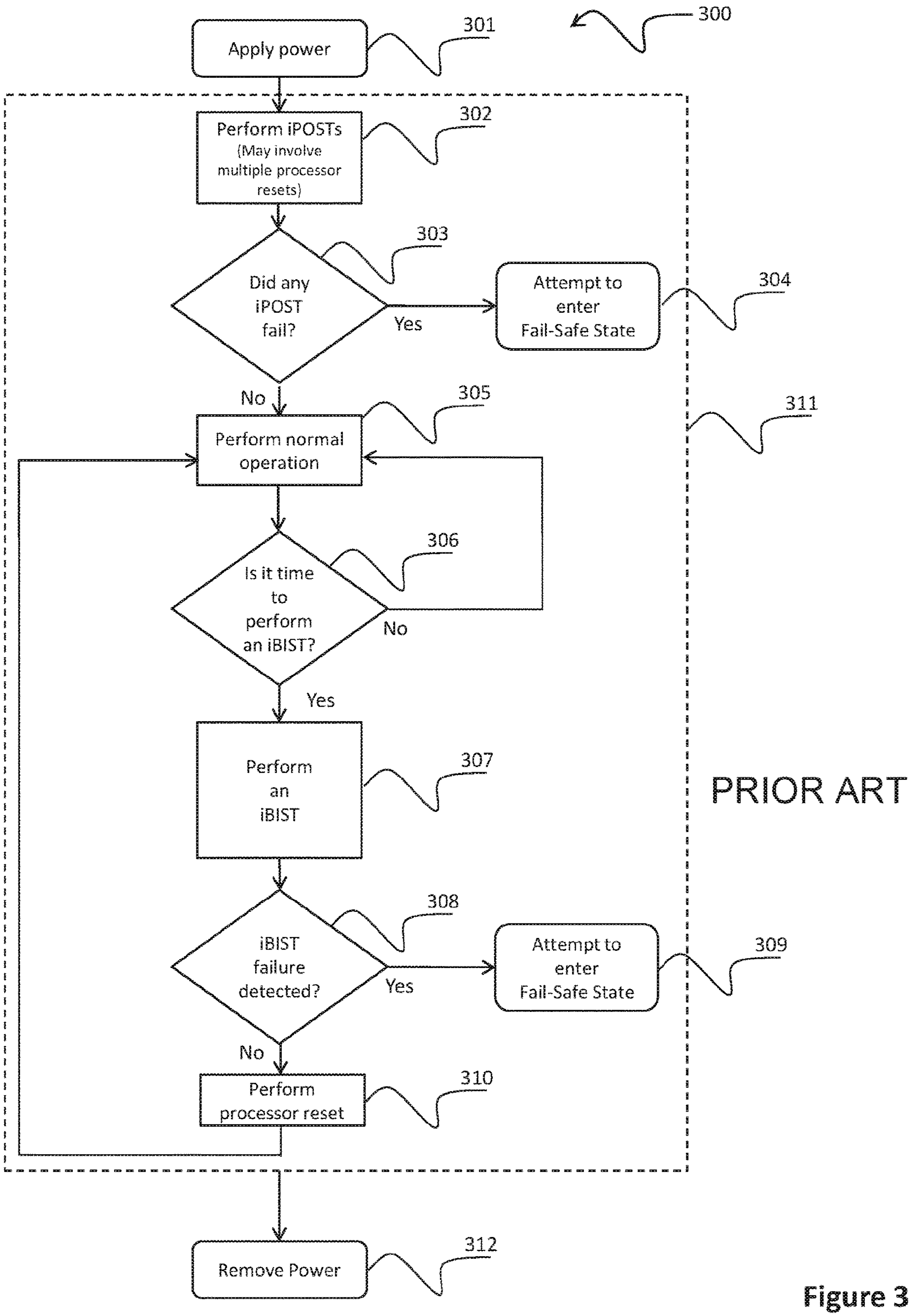
PRIOR ART Figure 3
FIG. 3 illustrates a prior art process for performing POSTs and BISTs.

It will also be appreciated that-when compared with the test process in a conventional computer system (as illustrated in FIG. 3), the test process that is described in FIG. 6 and FIG. 7 is expected to provide a higher level of diagnostic coverage. This higher level of diagnostic coverage is obtained because the processor that is being monitored (for example, Processor-A 501) is not simply generating a pulse chain, or a message sequence, as would be the case in a traditional computer system (such as that illustrated in FIG. 4). Instead, the processor being monitored is calculating and reporting a series of test results (for ePOSTs and then eBISTs) in 'real time' that are checked by a second processor (in this case, Processor-M 502).

In other words, the very basic monitoring system that is common in traditional computer systems (a dynamic switch that might be easily fooled) is being replaced with a more advanced monitoring system (one that contains much more information about the expected states of the processor being monitored and is-therefore-better able to detect if the processor being monitored is operating correctly).

It will also be appreciated that ePOSTs (illustrated by way of example in FIG. 6) may result in the system performing one or more processor resets.

It will also be appreciated that-unlike a conventional computer system-eBISTs (illustrated by way of example in FIG. 6) will not usually result in the system performing a processor reset. Such resets are not generally necessary in a design developed in compliance with certain embodiments of the present invention, because the second processor is able to perform additional checks-such as timing checks that are similar to those carried out by an iWDT—in order to address any gaps in diagnostic coverage that may result from not performing processor resets.

It will be appreciated that by avoiding resets during eBISTs (or, at least, significantly reducing the number of such resets), designs that are implemented in accordance with FIG. 6 and FIG. 7 will overcome two major challenges that are presented when iBISTs are performed on a conventional computer system; [i] the outputs from the computer system will not be disrupted by processor resets, allowing tests to be performed more frequently; [ii] the time taken to perform a processor reset (typically several milliseconds) is avoided during eBISTs, thereby further reducing the required interval between tests. The end result is that—in many designs that are implemented in compliance with certain embodiments of the present invention—it will be possible to complete a full suite of tests within the PST/FTTI, something that is very rarely possible with conventional computer systems.

Figure 8:
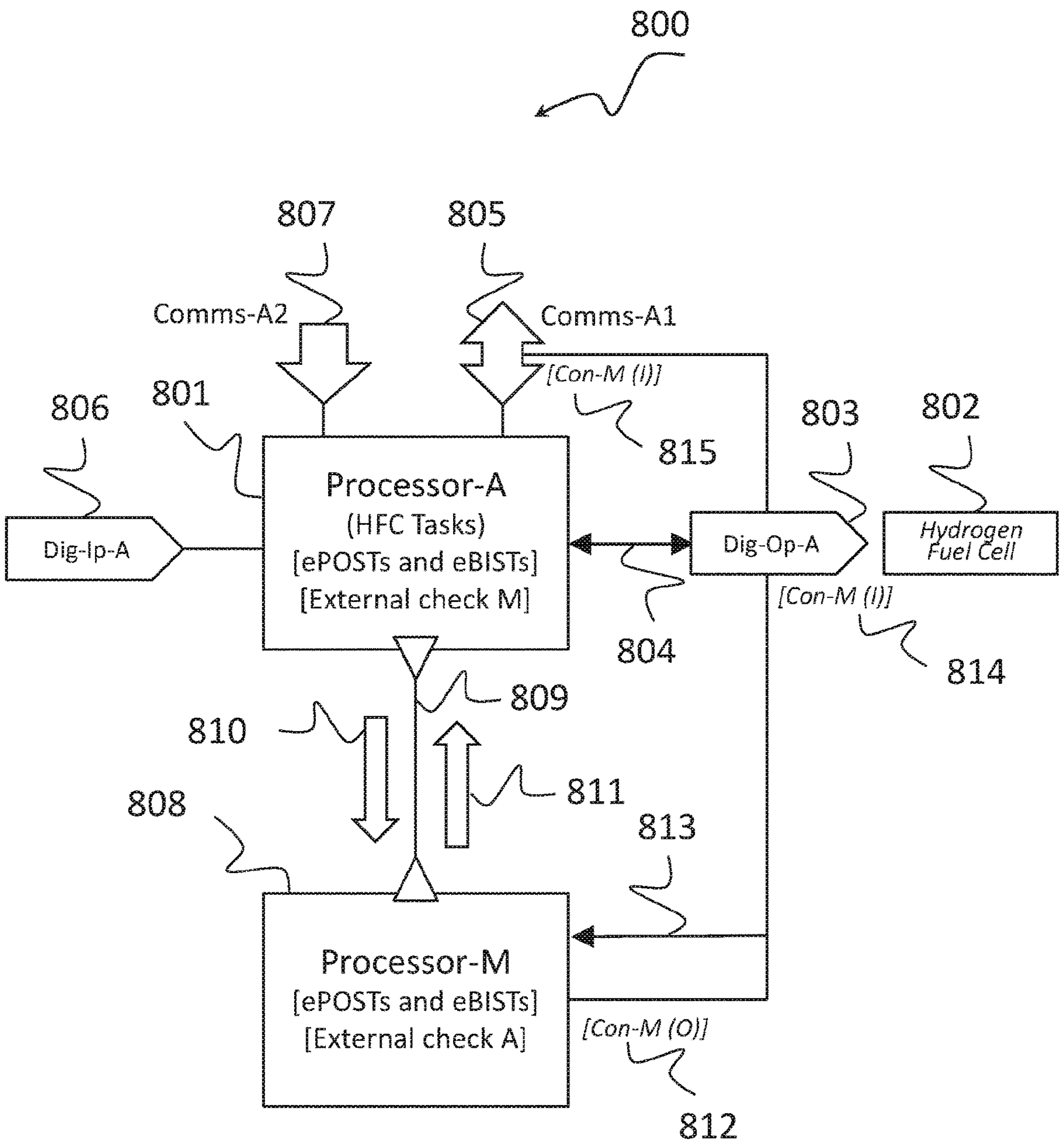
FIG. 8 illustrates a time-triggered computer system for monitoring a hydrogen fuel cell according to an embodiment of the present invention.

Turning now to FIG. 8, there is illustrated a computer system 800 for monitoring a hydrogen fuel cell (like in FIG. 4) in accordance with an embodiment of the present invention.

In this computer system 800, there is a Digital-Input-A 806, a Digital-Output-A 803 and Comms-A1 805. The computer system also has a first monitor element (Monitor-A) made up of feedback 804 from Digital-Output-A 803 and feedback from Comm-A2 807.

The computer system 800 also has a control element (Control-M) that is comprised of a digital output pin 812 on Processor-M 808. This output pin 812 is used to enable or disable Digital-Output-A (by means of Control-M input 814) and to enable or disable Comms-A1 (by means of Control-M input 815).

The computer system also has a second monitor element (Monitor-M) that is comprised of feedback 813 on the state of Control-M 812 by means of one or more digital input pins on Processor-M.

Processor-A 801 is responsible for keeping track of the flow of coolant through a pipe as part of a hydrogen fuel cell in an automotive system. If the rate of coolant falls below a pre-determined threshold, the fuel cell 802 is disabled by means of a Digital-Output-A interface 803. In FIG. 8, the coolant flow rate is determined by means of a sensor connected to the Digital-Input-A interface 806. The flow rate is determined from a pulse chain that is generated by a suitable sensor. A high pulse rate corresponds to a high (coolant) flow rate. However, it will be appreciated that the flow rate may be determined in other ways. The threshold level can be adjusted by means of the Input-A interface 806.

Processor-A 801 is also responsible for reporting the coolant flow rate over a CAN bus (to another system in the vehicle, such as the main Vehicle Control Unit) by means of the Comms-A1 interface 805. Processor-A 801 is also capable of monitoring (that is, reading back) messages that are sent on the CAN bus by Comms-A1 805 by means of the Comms-A2 interface 807.

Processor-A 801 is capable of monitoring its own digital outputs by means of feedback 804 from Digital-Output-A 803.

Processor-A 801 performs ePOSTs and eBISTs as illustrated in FIG. 6.

Processor-M 808 monitors the ePOSTs and eBISTs that are performed on Processor-A as illustrated in FIG. 7.

To monitor the ePOSTs and eBISTs, Processor-M 808 is linked to Processor-A 801 by means of a communication channel 809. Messages are sent from Processor-A to Processor-M 810 by means of this communication channel while ePOSTs and eBISTs are performed on Processor-A.

Messages sent from Processor-A to Processor-M in FIG. 8 include ePOST-Data-A and eBIST-Data-A messages. These messages include fault-injection data plus the results from the related tests.

In FIG. 8, the eBIST-Data-A messages include a message sequence number (so that an absence of eBIST-Data-A messages can be detected by Processor-M).

In FIG. 8, eBISTs on Processor-A are carried out in a pre-determined sequence. This allows Processor-M to determine whether these tests have been carried out in the expected order. However, as described above a predetermined sequence is not required in some embodiments.

In FIG. 8, the eBISTs include fault injection data. Injecting a fault results in generation of a Processor Fault Code (PFC) on Processor-A. This PFC is reported to Processor-M-along with the sequence number and eBIST identifier—in the eBIST-Data-A message. Because the eBIST is known on Processor-M and the expected PFC is also known on Processor-M, it is possible for Processor-M to check that the test was conducted successfully on Processor-A.

In a similar way, Processor-A 801 monitors the ePOSTs and eBISTs that are performed on Processor-M 808 as illustrated in FIG. 7.

To monitor the ePOSTs and eBISTs, messages are sent from Processor-M 808 to Processor-A 801 by means of the communication channel 809 while ePOSTs and eBISTs are performed on Processor-M.

Messages sent from Processor-M to Processor-A in this example include ePOST-Data-A and eBIST-Data-A messages. These messages include fault-injection data plus the results from the related tests.

In FIG. 8, in the event that Processor-A 801 determines by means of its own ePOSTs, its own eBISTs or by monitoring (by means of tasks in this example) its own outputs via feedback from Digital-Output-A 804 and Comms-A2 807 that it is not operating correctly, or if Processor-A determines (by means of an analysis of the contents of ePOST-Data-M or eBIST-Data-M messages) that Processor-M may not be operating correctly, Processor-A attempts to shut down the fuel cell by means of Digital-Output-A 803 and stops sending messages on Comms-A1 805. In this way, Processor-A attempts to ensure that the system enters a Fail-Safe State.

In FIG. 8, in the event that Processor-M 808 determines by means of its own ePOSTs, its own eBISTs or by monitoring its Control-M 812 output (by means of Monitor-M 813) that it is not operating correctly, or if Processor-M determines (by means of an analysis of the contents of ePOST-Data-A or eBIST-Data-A messages) that Processor-A may not be operating correctly, Processor-M attempts to shut down the fuel cell by means of the Control-M 812 output. This Control-M output disables Digital-Output-A 803 (thereby, in this example, disabling the fuel cell) via Control-M input 814. Activation of the Control-M output will also disable Comms-A1 805 via Control-M Input 815. This prevents Processor-A from sending any further messages on the CAN bus. In this way, Processor-M attempts to ensure that the system enters a Fail-Safe State.

Figure 4:
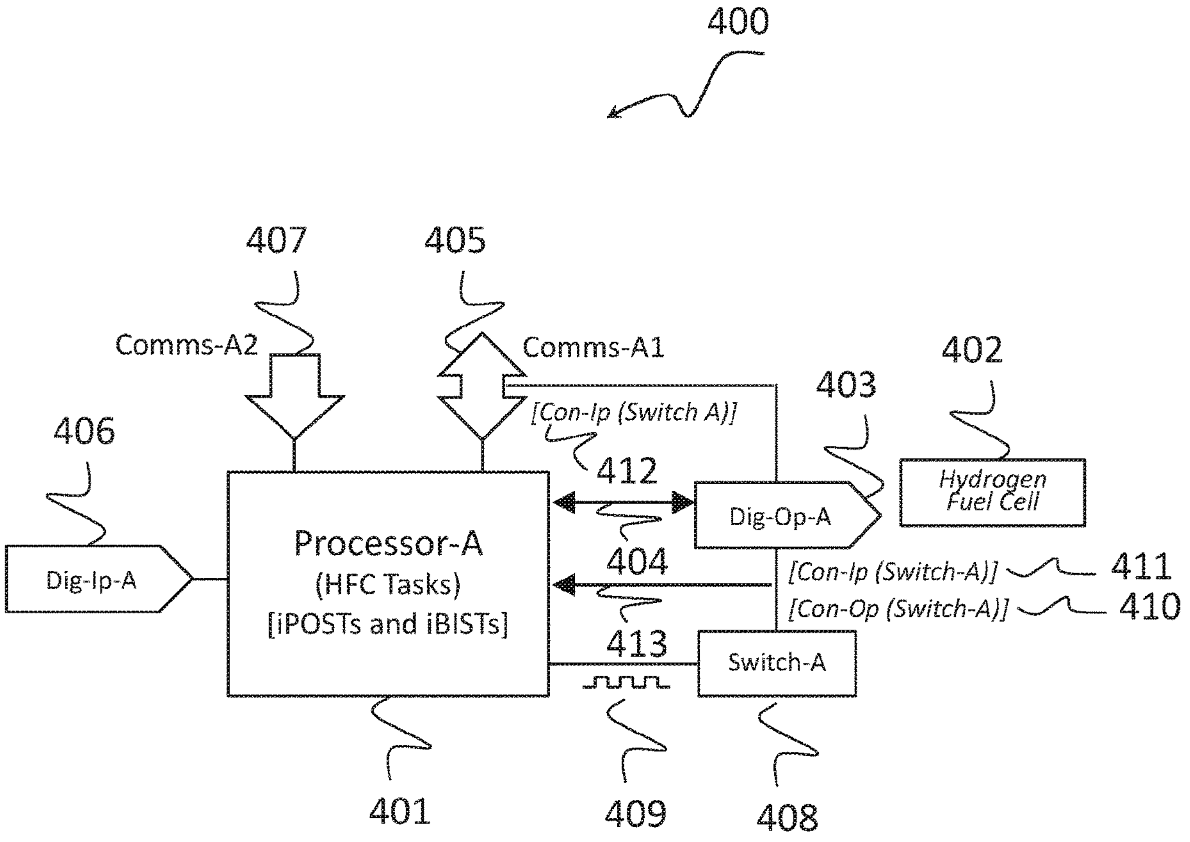
PRIOR ART Figure 4
FIG. 4 illustrates a prior art time-triggered computer system for monitoring a hydrogen fuel cell which employs a dynamic switch.

It will be appreciated that-when compared with the conventional design solution presented in FIG. 4—the combination of monitoring by both Processor-A and Processor-M in the design example presented in FIG. 8 provides increased confidence that [i] the system will be able to detect that it may not be operating properly and [ii] that it will enter a Fail-Safe State in these circumstances.

It will be appreciated that, unlike conventional computer systems, the computer system 800 comprises a means of performing comprehensive periodic self tests on a Processor-A while the system is operating without disrupting the operation of Processor-A, including the outputs from Processor-A.

It will also be appreciated that, unlike a conventional computer system, the periodic eBISTs that are performed on Processor-A can be performed very frequently, because they do not interfere with the normal operation of the system; in particular, performing all such tests within the PST/FTTI (which we assume takes place in this example) can increase confidence that the system is able to operate safely.

It will be appreciated that in the system shown schematically in FIG. 5 and FIG. 8, Processor-A 501, 801 is performing tasks while Processor-M 502, 808 is primarily responsible for monitoring the ePOSTs and eBISTs on Processor-A (and moving the system into a safe state if Processor-A determines that an ePOST or eBIST on Processor-A has failed).

It will also be appreciated many embedded computer systems employ two processors that (both) execute tasks. Such an architecture is particularly common in designs that are 'safety critical' in nature.

Figure 9:
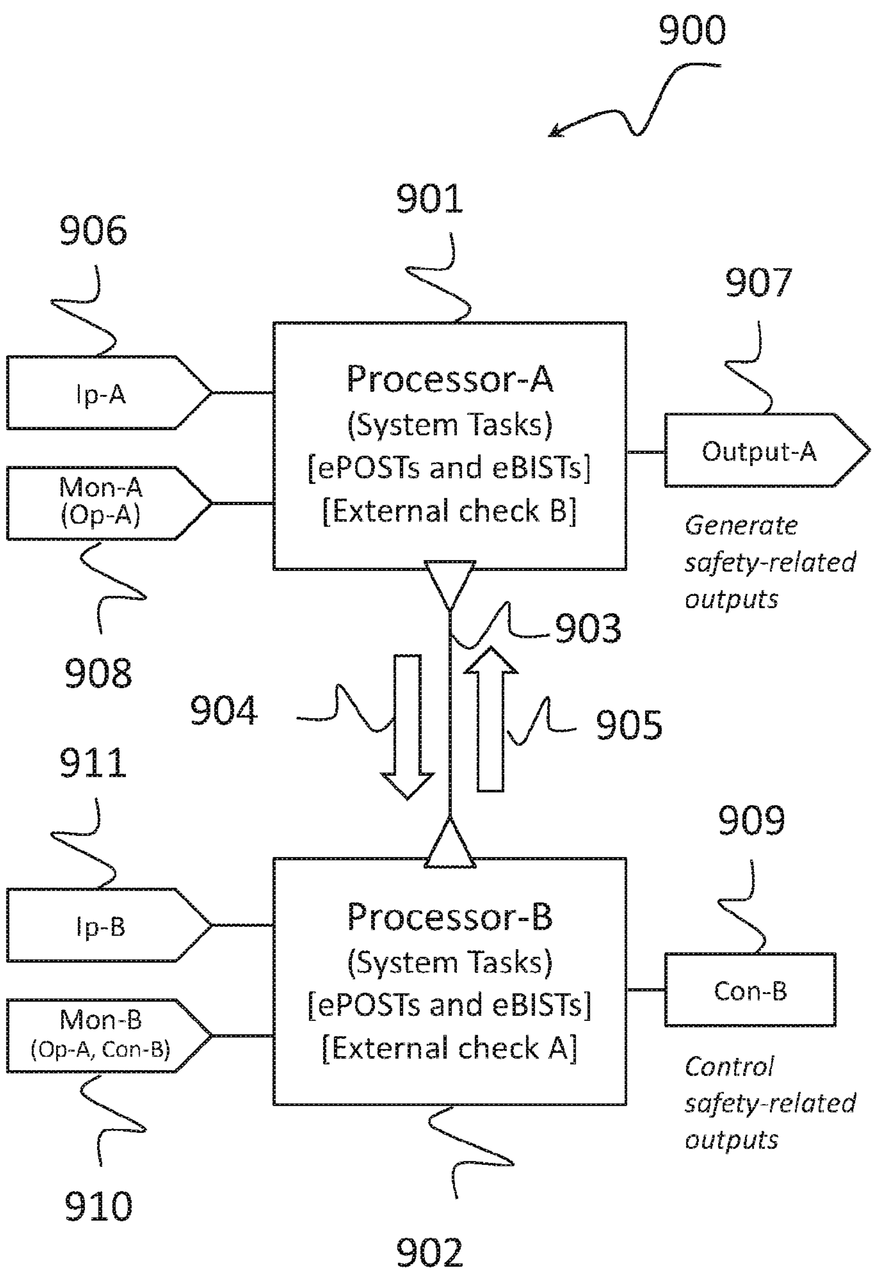
FIG. 9 illustrates a time-triggered computer system according to an embodiment of the present invention.

A computer system 900 which shows how such a two-processor architecture can be implemented in accordance with an embodiment of the present invention is illustrated in FIG. 9.

FIG. 9 illustrates in schematic form an embodiment of a time-triggered computer system 900 which has a Processor-A 901 adapted to perform a series of ePOSTs which involve a processor reset and to report data from each ePOST to Processor-B 902 by means of ePOST-Data-A messages 904 that are transmitted over a Communication Channel 903 as part of one or more messages sent between Processor-A and Processor-B. As discussed above, in certain other embodiments of the present invention ePOSTs are performed without a processor reset.

Processor-A also compares the contents of ePOST-Data-B messages 905 sent by Processor-B over the Communication Channel as part of one or more messages sent between Processor-B and Processor-A with the expected results from each of those ePOSTs. Processor-A then operates in one of one or more pre-determined system modes.

In each of these system modes Processor-A 901 performs one or more eBISTs without performing a processor reset and reports data from each eBIST to Processor-B 902 by means of eBIST-Data-A messages 904 that are transmitted over the Communication Channel 903 as part of one or more messages sent between Processor-A and Processor-B. In each system mode Processor-A also compares the contents of eBIST-Data-B messages 905 sent by Processor-B over a Communication Channel as part of one or more messages sent between Processor-B and Processor-A with the expected results from each of those eBISTs. In each system mode Processor-A also performs one or more eBISTs that include performing a processor reset. However, it will be appreciated that in certain other embodiments of the present invention, Processor-A may not perform any eBISTs involving a processor reset. In FIG. 9, Processor-A also executes one or more tasks according to a predetermined task schedule.

Processor-B 902 is likewise adapted to perform a series of ePOSTs which involve a processor reset. As discussed above, in certain other embodiments of the present invention ePOSTs are performed without a processor reset. Processor-B 902 then reports data from each ePOST to Processor-A 901 by means of ePOST-Data-B messages 905 that are transmitted over the Communication Channel 903 as part of one or more messages sent between Processor-B and Processor-A. Processor-B is also adapted to compare the contents of ePOST-Data-A messages 904 sent by Processor-A over the Communication Channel as part of one or more messages sent between Processor-A and Processor-B with the expected results from each of those ePOSTs. Processor-B is then adapted to operate in one of one or more pre-determined system modes.

In each system mode Processor-B 902 performs one or more eBISTs without performing a processor reset and reports data from each eBIST to Processor-A by means of eBIST-Data-B messages 905 sent over the Communication Channel 903. In each system mode Processor-B also compares the contents of eBIST-Data-A messages 904 sent by Processor-A over the Communication Channel 903 with the expected results from each of those eBISTs. Processor-B also performs one or more eBISTs that include performing a processor reset in each system mode. However, it will be appreciated that in certain other embodiments of the present invention, Processor-B may not perform any eBISTs involving a processor reset. In FIG. 9, Processor-B is also configured to execute one or more tasks according to a predetermined task schedule.

Also included within the computer system 900 is a memory element (not shown) that stores the software to be executed by the first processor and the second processor. This includes the software associated with each of the POSTs and each of the BISTs and the software associated with the predetermined task schedules to be executed on the first processor and second processor. It will be appreciated that according to certain other embodiments of the present invention, multiple memory elements may be provided that each stores the respective software to be executed on a specific processor. It will also be appreciated that these memory elements may be external or internal to the first processor and second processors. For example, the first and second processor may each have their own internal memory element.

The system 900 includes the Communication Channel 903 adapted to support the transmission of messages between Processor-A and Processor-B, and to support the transmission of messages between Processor-B and Processor-A.

The system 900 also has an Input-A 906 adapted to enable Processor-A to acquire data for any tasks that execute on Processor-A, and an Output-A 907 adapted to enable Processor-A to generate any safety-related outputs from the computer system. The outputs are generated when Processor-A determines that (by means of tasks, self tests and Monitor-A) Processor-A itself is operating correctly and Processor-A also determines that (by means of tasks and eBIST-Data-B messages) Processor-B is also operating correctly.

The system 900 also has a Monitor-A 908 adapted to enable Processor-A to determine whether Output-A 907 is in its required state. System 900 also includes a Control-B 909 adapted to ensure that any and all safety-related outputs from the computer system are held in a safe state. The outputs are held in a safe state by Control-B if, by means of eBIST-Data-A messages, Processor-B determines that Processor-A may not be operating correctly, or if, by means of self tests or Monitor-B 910, Processor-B determines that Processor-B itself may not be operating correctly.

The system 900 also has a Monitor-B 910 adapted to enable Processor-B to determine whether Output-A 907 is in its required state and whether Control-B is in its required state.

System 900 also includes an Input-B 911 adapted to enable Processor-B to acquire data for any tasks that execute on Processor-B.

It will be appreciated that the computer system 900 is arranged to execute sets of tasks in accordance with one or more predetermined system modes under control of a Processor-A. The task schedules for each task set on Processor-A determine the order in which tasks are executed and specify whether or not specific tasks are allowed to pre-empt other tasks.

The computer system 900 is also arranged to execute sets of tasks in accordance with one or more predetermined system modes under control of a Processor-B. The task schedules for each task set on Processor-B determine the order in which tasks are executed and specify whether or not specific tasks are allowed to pre-empt other tasks.

FIG. 6 and FIG. 7 (again) show processes for performing ePOSTs and eBISTs invention the system 900.

Again, in this context, the use of ePOST and eBIST refers to the fact that the tests performed are subject to assessment by an external processor. This means that—for example—in FIG. 9, the eBISTs performed on Processor-A will be subject to checking by Processor-B (and vice versa).

Processor-A 901 and Processor-B 902 both include a single hardware core and a single "hard" processor core. However, in certain other embodiments of the present invention it will be appreciated that Processor-A and/or Processor-B may comprise one or more "soft" or "hard" processor cores (that execute some software) and/or one or more hardware cores (that do not execute any software).

Processor-A 901 and Processor-B 902 are commercial-off-the-shelf (COTS) microprocessors. However, in certain other embodiments of the present invention it will be appreciated that Processor-A and/or Processor-B may comprise one or more processor chips, such as a commercial-off-the-shelf (COTS) microcontroller or microprocessor, Digital Signal Processor (DSP), Field-Programmable Gate Array (FPGA), Application Specific Integrated Circuit (ASIC) or similar devices. In certain other embodiments of the present invention it will be appreciated that Processor-A may one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

In FIG. 9, Processor-A and Processor-B comprise a time-triggered hybrid (TTH) scheduler. However, in certain other embodiments of the present invention it will be appreciated that Processor-A and/or Processor-B may comprise a time triggered cooperative (TTC) scheduler or a time triggered hybrid (TTH) scheduler. These schedulers are described in detail in Reference 2.

The computer system 900 is arranged to monitor the operation of Processor-A by means of Processor-B.

The computer system 900 is arranged to monitor the operation of Processor-B by means of Processor-A.

In FIG. 9, Processor-A and Processor-B are the same. However, according to certain other embodiments of the present invention, Processor-A and Processor-B may be different. As a non-limiting example, making Processor-A and Processor-B different may mean basing Processor-A on a microcontroller with a particular processor core, and basing Processor-B on a microcontroller from a different organisation and with a different processor core. It will be appreciated that having such differences between Processor-A and Processor-B may reduce the likelihood of common-cause failures on the two processors, and that the reduction in the likelihood of common-cause failures may be considered particularly important in computer systems that are safety-critical in nature. Use of different processor may be considered appropriate in designs that are classed as 'Safety Integrity Level' (SIL) 3 or 4 in Reference 8.

It will be appreciated that in this system 900, Processor-B checks the results of ePOSTs and eBISTs that are performed on Processor-A while Processor-A checks the results of ePOSTs and eBISTs that are performed on Processor-B.

Processor-A 901 performs ePOSTs that involve a processor reset and reports data from each ePOST to Processor-B by means of ePOST-Data-A messages that are sent over the Communication Channel. Processor-B 902 then compares the contents of each ePOST-Data-A message with the expected results of the corresponding ePOST. By means of this comparison, Processor-B determines whether the ePOST performed on Processor-A has passed or has failed.

Likewise, Processor-B performs ePOSTs that involve a processor reset and reports data from each ePOST to Processor-A by means of ePOST-Data-B messages that are sent over the Communication Channel. Processor-A then compares the contents of each ePOST-Data-B message with the expected results of the corresponding ePOST. By means of this comparison, Processor-A determines whether the ePOST performed on Processor-B has passed or has failed.

In FIG. 9, the sequence of ePOSTs that is performed on Processor-A 901 and Processor-B is not pre-determined. However, in certain other embodiments of the present invention, the sequence of ePOSTs performed on Processor-A and/or Processor-B may be pre-determined. Failure of the ePOSTs to follow this pre-determined sequence can then be identified as a fault by either processor and the ePOST or ePOSTs that are performed out of sequence can be determined to have failed.

In FIG. 9, the time intervals between the ePOSTs that are performed on Processor-A and Processor-B is not pre-determined. However, in certain other embodiments of the present invention, the time interval between ePOSTs performed on Processor-A and/or Processor-B may be pre-determined. Failure of the reported ePOSTs to match the pre-determined intervals-because tests are performed more quickly than expected or more slowly than expected—can then be identified as a fault by either processor and the ePOST or ePOSTs that are performed at incorrect times can be determined to have failed.

In FIG. 9, Processor-A performs eBISTs during its normal operation that do not require processor resets and reports data from each eBIST to Processor-B by means of eBIST-Data-A messages that are sent over the Communication Channel. Processor-B then compares the contents of each eBIST-Data-A message with the expected results of the corresponding eBIST. By means of this comparison, Processor-B determines whether the eBIST performed on Processor-A has passed or has failed.

Likewise, Processor-B performs eBISTs during its normal operation that do not require processor resets and reports data from each eBIST to Processor-A by means of eBIST-Data-B messages that are sent over the Communication Channel. Processor-A then compares the contents of each eBIST-Data-B message with the expected results of the corresponding eBIST. By means of this comparison, Processor-A determines whether the eBIST performed on Processor-B has passed or has failed.

In FIG. 9, the sequence of eBISTs that is performed on Processor-A and Processor-B is not pre-determined. However, in certain other embodiments of the present invention, the sequence of eBISTs performed on Processor-A and/or Processor-B may be pre-determined. Failure of the eBISTs to follow this pre-determined sequence can then be identified as a fault by either processor and the eBIST or eBISTs that are performed out of sequence can then be determined to have failed. In such embodiments, the sequence of eBISTs that is performed on Processor-A and/or Processor-B may remain the same in any and all operating modes of Processor-A and Processor-B.

In FIG. 9, the time intervals between the eBISTs that are performed on Processor-A and Processor-B is not pre-determined. However, in certain other embodiments of the present invention, the time intervals between eBISTs performed on Processor-A and/or Processor-B may be pre-determined. Failure of the reported eBISTs to match the pre-determined intervals-because tests are performed more frequently than expected or less frequently than expected—can then be identified as a fault by either processor and the eBIST or eBISTs that are performed at incorrect times can be determined to have failed. In such embodiments, the time intervals between eBISTs that are performed on Processor-A and/or Processor-B may remain the same in any and all operating modes of Processor-A and Processor-B.

As noted above, in FIG. 9, Processor-A and Processor-B also perform one or more eBISTs that include performing a processor reset.

In FIG. 9, the Communication Channel 903 is adapted to allow the transfer of data between any tasks that execute on Processor-A and any tasks that execute on Processor-B, as described in Reference 2.

In FIG. 9, the Communication Channel is used to synchronise the activities on Processor-A and Processor-B using a form of Shared-Clock Scheduler, as described in in Reference1 and Reference 2. However, it will be appreciated that according to certain other embodiments of the present invention other means of synchronisation may be used.

In FIG. 9, data transfers between Processor-A and Processor-B are supported by means of Tick Messages sent from Processor-A to Processor-B and data transfers between Processor-B and Processor-A are supported by means of Ack Messages sent from Processor-B to Processor-A, as described in in Reference1 and Reference 2. However, it will be appreciated that according to certain other embodiments of the present invention other means of supporting data transfers may be used.

In FIG. 9, the Communication Channel is a standard serial SPI protocol that is suitable for short-distance communication. However, it will be appreciated that according to certain other embodiments of the present invention other protocols may be used such as 'RS-232'.

In FIG. 9, the Input-A 906 includes one or more analogue input pins on Processor-A plus associated external interfacing hardware required to adapt voltages in the system environment to meet the voltage requirements of the analogue input pins and provide necessary filtering of input signals. However, it will be appreciated that in certain other embodiments of the present invention the Input-A 906 may include one or more digital input pins on Processor-A plus any associated external interfacing hardware required to adapt voltages in the system environment to meet the voltage requirements of the digital input pins.

The Input-A 906 includes a software and hardware interface to one or more serial communication buses (such as CAN or Ethernet or RS-232' or SPI).

In FIG. 9, Output-A 907 is set to a Fail-Safe-State if Processor-A determines—by means of ePOST-Data-B messages—that Processor-B has failed an ePOST. Output-A is also set to a Fail-Safe-State if Processor-A determines—by means of eBIST-Data-B messages—that Processor-B has failed an eBIST.

In FIG. 9, the Output-A 907 includes analogue output pins on Processor-A plus associated external interfacing hardware that are required to adapt voltages in the system environment to meet the voltage requirements of the analogue output pins and provide necessary filtering of output signals. A Fail-Safe State on any analogue output pins is a 0V output. However, it will be appreciated that other Fail-Safe States can be used. It will also be appreciated that in certain other embodiments the Output-A may include one or more digital output pins on Processor-A plus any associated external interfacing hardware that may be required to adapt voltages in the system environment to meet the voltage requirements of the digital output pins. In such embodiments, a Fail-Safe State on any digital output pins will be a 0V output. However, it will be appreciated that other Fail-Safe States can be used.

In FIG. 9, the Output-A includes a software and hardware interface to one or more serial communication buses (such as CAN or Ethernet or RS-232' or SPI). IN FIG. 9, a Fail-Safe State on any communication buses will mean that no messages are sent by Processor-A on the bus concerned.

In FIG. 9, the Monitor-A 908 is connected to one or more analogue output pins on Output-A and includes one or more analogue input pins on Processor-A plus associated external interfacing hardware required to adapt voltages in the system environment to meet the voltage requirements of the analogue input pins and provide necessary filtering of input signals.

It will be appreciated that in certain other embodiments, the Monitor-A 908 may be connected to one or more digital output pins on Output-A and comprises one or more digital input pins on Processor-A plus any associated external interfacing hardware that may be required to adapt voltages in the system environment to meet the voltage requirements of the digital input pins.

In FIG. 9, the Monitor-A comprises a software and hardware interface to one or more communication buses (such as CAN or Ethernet or 'RS-232' or SPI) that are connected to Processor-A in a manner that allows Processor-A to monitor any communications on the one or more communication buses.

In FIG. 9, Control-B 909 is set to a Fail-Safe-State if Processor-B determines—by means of ePOST-Data-A messages—that Processor-A has failed an ePOST. Control-B is also set to a Fail-Safe-State if Processor-B determines—by means of eBIST-Data-A messages—that Processor-A has failed an eBIST.

In FIG. 9, Control-B 909 includes one or more analogue switches that provide a means of disabling one or more analogue output pins on Processor-A. A Fail-Safe State on any analogue output pins is a 0V output although other Fail-Safe States may be used in certain other embodiments.

It will also be appreciated that in certain other embodiments of the present invention, Control-B may comprise one or more digital switches that provide a means of disabling one or more digital output pins on Processor-A. In such embodiments, a Fail-Safe State on any digital output pins may be a 0V output or another appropriate output.

It will also be appreciated that in certain other embodiments of the present invention, Control-B may comprise one or more digital switches that provide a means of disabling transceivers that provide a link to one or more serial communication buses (such as CAN or Ethernet or RS-232' or SPI), thereby allowing Processor-B to prevent Processor-A from sending any messages on said communication buses when Control-B is in a Fail-Safe State.

In FIG. 9, Monitor-B 910 includes one or more analogue input pins on Processor-B plus associated external interfacing hardware required to adapt voltages from one or more analogue output pins on Output-A and Control-B to meet the voltage requirements of the analogue input pins on Processor-B and provide necessary filtering of input signals.

It will also be appreciated that in certain other embodiments of the present invention, Monitor-B may comprise one or more digital input pins on Processor-B plus any associated external interfacing hardware that may be required to adapt voltages from one or more digital output pins on Output-A and Control-B to meet the voltage requirements of the digital input pins on Processor-B.

In FIG. 9, Monitor-B 910 comprises a software and hardware interface to one or more communication buses (such as CAN or Ethernet or 'RS-232' or SPI) that are connected to Processor-A or Processor-B in a manner that allows Processor-B to monitor any communications on the one or more communication buses.

In FIG. 9, Input-B 911 includes one or more analogue input pins on Processor-B plus associated external interfacing hardware that is required to adapt voltages in the system environment to meet the voltage requirements of the analogue input pins and provide filtering of input signals.

It will however be appreciated that in certain other embodiments of the present invention, Input-B comprises one or more digital input pins on Processor-B plus any associated external interfacing hardware that may be required to adapt voltages in the system environment to meet the voltage requirements of the digital input pins.

In FIG. 9, Input-B comprises a software and hardware interface to one or more serial communication buses (such as CAN or Ethernet or RS-232' or SPI).

Figure 10:
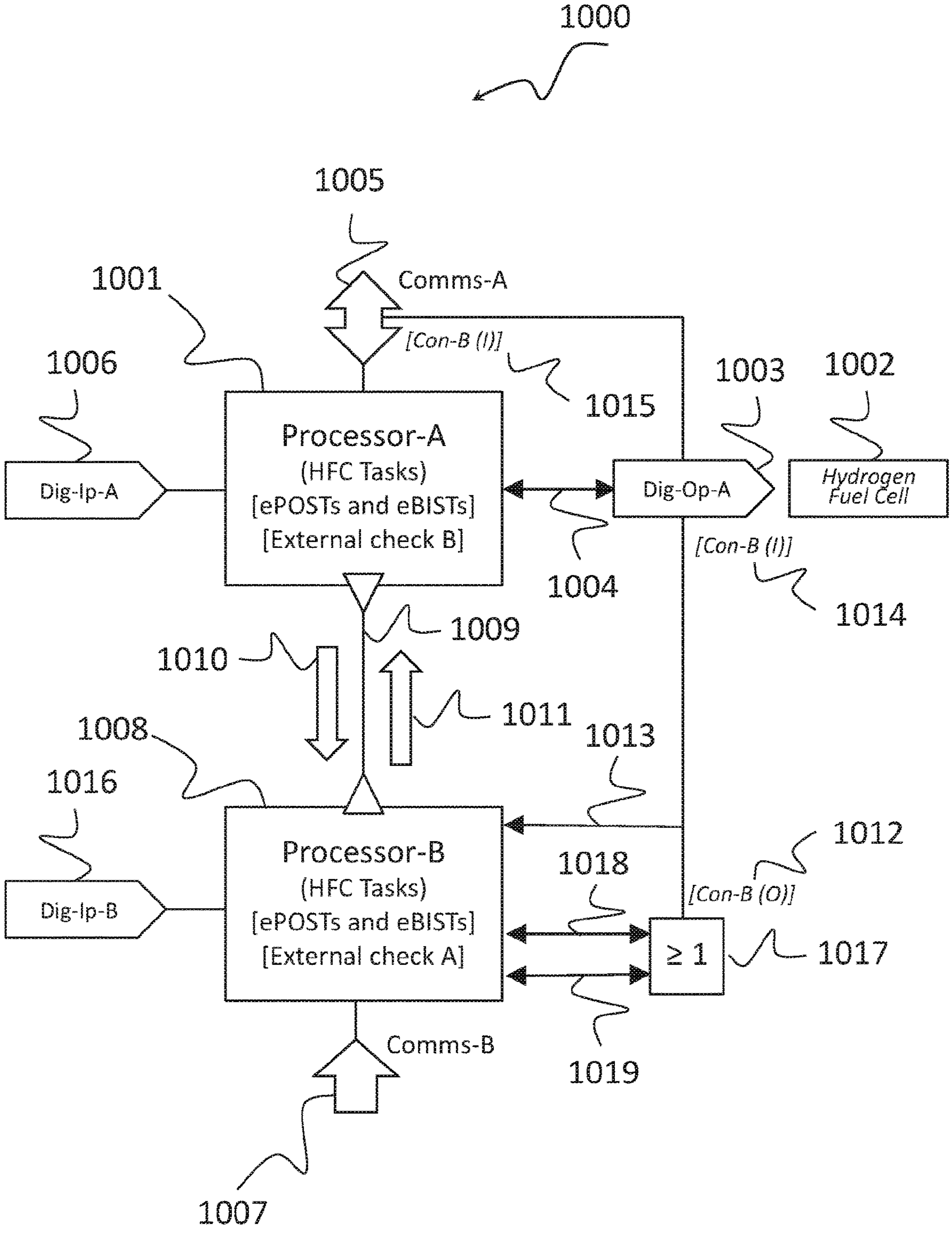
FIG. 10 illustrates a time-trigged computer system for monitoring a hydrogen fuel cell according to an embodiment of the present invention.

Turning now to FIG. 10, there is illustrated a computer system 1000 for monitoring a hydrogen fuel cell. In the system shown in FIG. 10, both Processor-A 1001 and Processor-B 1008 are responsible for keeping track of the flow of coolant through a pipe as part of a hydrogen fuel cell in an automotive system.

The system of FIG. 10 includes a Digital-Input-A 1006, Digital-Input-B 1016, Digital-Output-A 1003 and Comms-A 1005. The system 1000 also has a Monitor-A comprised of feedback 1004 from Digital-Output-A 1003 and feedback from Comm-A 1005.

In FIG. 10, there is a Control-B comprised of an OR gate 1017 that is controlled by two digital output pins 1018, 1019 on Processor-B 1008. The output of the OR gate (when at Logic 1) is used to enable Digital-Output-A 1003 and Comms-A 1005. Through use of the OR gate, the digital output pins 1018, 1019 can be tested at run time by means of BISTs without changing the state of the output of the OR gate itself. In certain embodiments of the present invention, the OR gate itself is tested (by means of a feedback pin 1013 connected to one or more digital inputs on Processor-B) during POSTs. This single test is assumed acceptable because of the non-complex nature of the OR gate.

In FIG. 10, there is a Monitor-B comprised of feedback on the state of Digital-Output-A by means of one or more digital input pins on Processor-B plus feedback on messages sent via Comms-A 1005 by Processor-A by means of Comms-B 1007.

In FIG. 10, the fuel cell 1002 can be disabled (by means of a Digital-Output-A interface 1003 and/or by means of the Control-B output 1012) if the rate of coolant falls below a pre-determined threshold. In FIG. 10, monitoring of the fuel cell is achieved by means of tasks that execute on both Processor-A and Processor-B. When performing the monitoring activity, the tasks may exchange data by means of the communication channel 1009.

The coolant flow rate is determined by means of sensors connected to the Digital-Input-A interface 1006 and the Digital-Input-B interface 1016. The flow rate is determined for example from a pulse chain that is generated by suitable sensors (one connected to the Digital-Input-A and another connected to the Digital-Input-B). For both sensors-a high pulse rate corresponds to a high (coolant) flow rate.

The threshold level can be adjusted by means of the Digital-Input-A interface 1006 and the Digital-Input-B interface 1016.

In FIG. 10, Processor-A 1001 is responsible for reporting the coolant flow rate over a CAN bus (to another system in the vehicle, such as the main Vehicle Control Unit) by means of a Comms-A interface 1005. Processor-B 1008 is also capable of monitoring (that is, reading back) messages that are sent on this CAN bus by Comms-A 1005 by means of the Comms-B interface 1007.

Processor-A 1001 is capable of monitoring its own digital outputs by means of feedback 1004 from Digital-Output-A 1003.

Processor-B 1008 is also capable of monitoring the digital outputs from Processor-A 1001 by means of feedback 1013 from Digital-Output-A 1003.

Processor-A 1001 performs ePOSTs and eBISTs as illustrated in FIG. 6. Processor-B 1008 also performs ePOSTs and eBISTs as illustrated in FIG. 6.

To monitor the ePOSTs and eBISTs, Processor-A and Processor-B are linked by means of the communication channel 1009. Messages are sent from Processor-A to Processor-B by means of this communication channel while ePOSTs and eBISTs are performed on Processor-A. Messages are sent from Processor-B to Processor-A by means of this communication channel while ePOSTs and eBISTs are performed on Processor-B.

Messages sent from Processor-A to Processor-B in this example include ePOST-Data-A and eBIST-Data-A messages. These messages include fault-injection data plus the results from the related tests.

Messages sent from Processor-B to Processor-A in this example include ePOST-Data-B and eBIST-Data-B messages. These messages include fault-injection data plus the results from the related tests.

In FIG. 10, the eBIST-Data-A messages include a message sequence number (so that an absence of eBIST-Data-A messages can be detected by Processor-B). The eBISTs on Processor-A are carried out in a pre-determined sequence. This allows Processor-B to determine whether these tests have been carried out in the expected order.

In FIG. 10, the eBISTs include fault injection. Injecting a fault results in generation of a Processor Fault Code (PFC) on Processor-A. This PFC will be reported to Processor-B-along with the sequence number and eBIST identifier—in the eBIST-Data-A message. Because the eBIST is known on Processor-B and the expected PFC is also known on Processor-B, it is possible for Processor-B to check that the test was conducted successfully on Processor-A.

In a similar way, Processor-A 1001 monitors the ePOSTs and eBISTs that are performed on Processor-B 1008 as illustrated in FIG. 7. Processor-B 1008 also monitors the ePOSTs and eBISTs that are performed on Processor-A 1001 as illustrated in FIG. 7.

To monitor the ePOSTs and eBISTs, messages are sent from Processor-B to Processor-A by means of the communication channel 1009 while ePOSTs and eBISTs are performed on Processor-B.

Messages sent from Processor-B to Processor-A in this example include ePOST-Data-A and eBIST-Data-A messages. These messages include fault-injection data plus the results from the related tests.

In the event that Processor-A determines by means of its own ePOSTs, its own eBISTs or by monitoring (by means of tasks in this example) its own outputs via feedback from Digital-Output-A 1004 that it is not operating correctly, or if Processor-A determines (by means of an analysis of the contents of ePOST-Data-B or eBIST-Data-B messages) that Processor-B may not be operating correctly, Processor-A attempts to shut down the fuel cell by means of Digital-Output-A 1003 and stops sending messages on Comms-A 1005. In this way, Processor-A attempts to ensure that the system enters a Fail-Safe State.

In the event that Processor-B determines by means of its own ePOSTs, its own eBISTs or by monitoring its Control-B 1012 output (by means of Monitor-B 1013 1018 1019) that it is not operating correctly, or if Processor-B determines (by means of an analysis of the contents of ePOST-Data-A or eBIST-Data-A messages) that Processor-A may not be operating correctly, Processor-B attempts to shut down the fuel cell by means of the Control-B 1012 output. This Control-B output disables Digital-Output-A 1003 (thereby disabling the fuel cell) via Control-B input 1014. Activation of the Control-B output also disables Comms-A 1005 via Control-B input 1015. This prevents Processor-A from sending any further messages on the CAN bus. In this way, Processor-B also attempts to ensure that the system enters a Fail-Safe State.

It will be appreciated that-when compared with the conventional design solution presented in FIG. 4—the combination of monitoring by both Processor-A and Processor-B in the design example presented in FIG. 10 provides increased confidence that [i] the system will be able to detect that it may not be operating properly and [ii] that it will enter a Fail-Safe State in these circumstances.

It will be appreciated that dual-processor computer systems of the type illustrated (for example) in FIG. 10 are used in high-reliability and safety-related designs for two main reasons: [i] each processor can monitor the other processor; [ii] the ability to continue to operate (at least for a short period) when failure of one of the processors is detected; such 'fail operational' architectures may—for example— allow a vehicle to move (perhaps at low speed) to a safe location before the system enters a Fail-Safe State.

Figure 11:
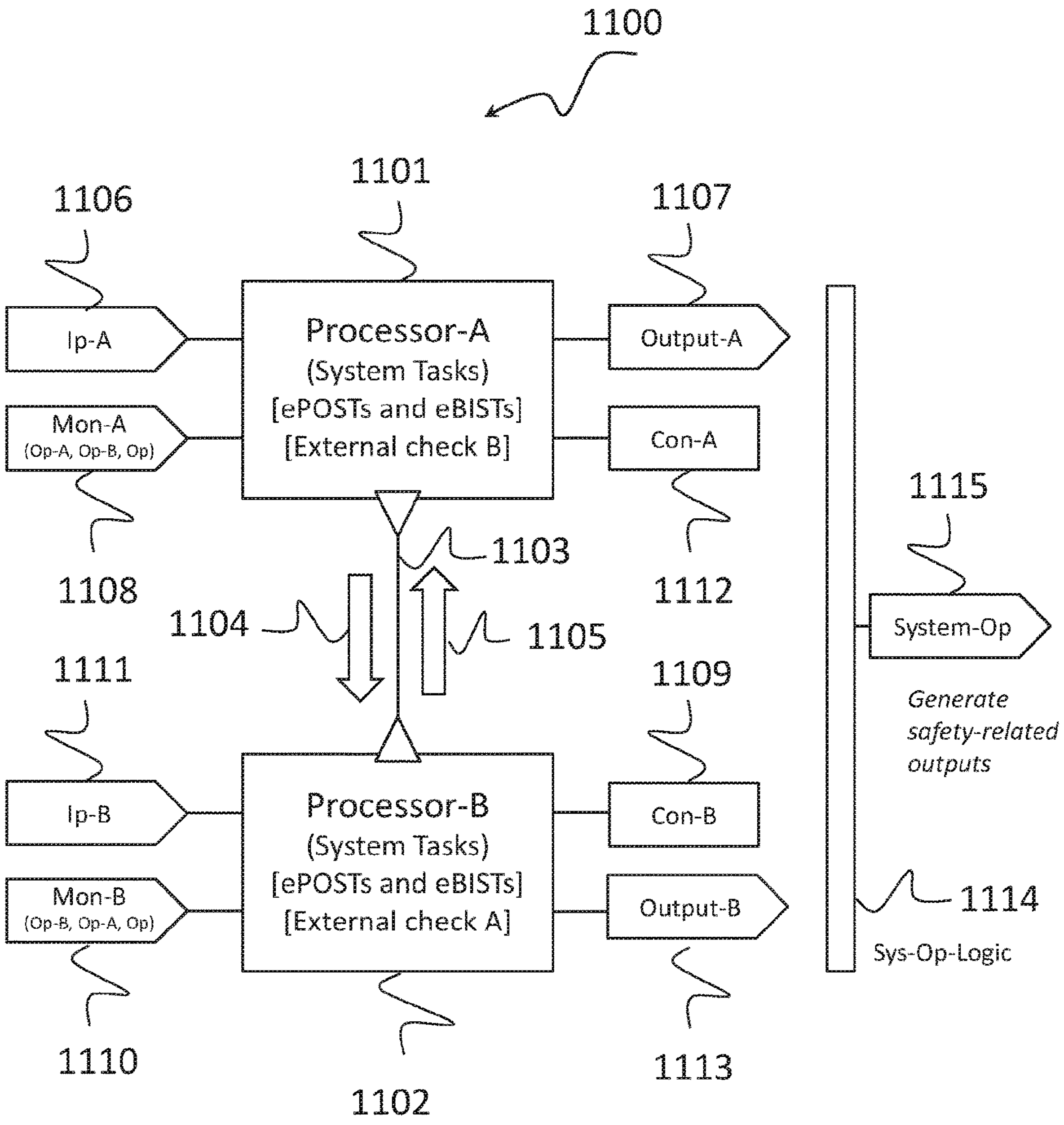
FIG. 11 illustrates a time-triggered computer system according to an embodiment of the present invention.

Turning now to FIG. 11, there is illustrated a computer system 1100 having a "fail-operational" (dual-processor) architecture.

FIG. 11 illustrates in schematic form a time-triggered computer system 1100 which includes a first processor (Processor-A) 1101 adapted to perform a series of ePOSTs which involve a processor reset and to report data from each ePOST to Processor-B 1102 by means of ePOST-Data-A messages 1104 that are transmitted over a Communication Channel 1103 as part of one or more messages sent between Processor-A and Processor-B. Processor-A 1101 also compares the contents of ePOST-Data-B messages 1105 sent by Processor-B over the Communication Channel as part of one or more messages sent between Processor-B and Processor-A with the expected results from each of those ePOSTs. After that, Processor-A 1101 operates in one of one or more pre-determined system modes.

In each system mode Processor-A 1101 performs one or more eBISTs without performing a processor reset and reports data from each eBIST to Processor-B 1102 by means of eBIST-Data-A messages 1104 that are transmitted over the Communication Channel 1103 as part of one or more messages sent between Processor-A and Processor-B. In each system mode Processor-A also compares the contents of eBIST-Data-B messages 1105 sent by Processor-B over the Communication Channel as part of one or more messages sent between Processor-B and Processor-A with the expected results from each of those eBISTs. In each system mode Processor-A also performs one or more eBISTs that include performing a processor reset although as discussed above certain other embodiments of the present invention do not require BISTs to be performed that include a processor reset. In each system mode Processor-A also executes one or more tasks according to a predetermined task schedule.

Also included within system 110 is a second processor (Processor-B) 1102 adapted to perform a series of ePOSTs which involve a processor reset and to report data from each ePOST to Processor-A 1101 by means of ePOST-Data-B messages 1105 that are transmitted over the Communication Channel 1103 as part of one or more messages sent between Processor-B and Processor-A. Processor-B also compares the contents of ePOST-Data-A messages 1104 sent by Processor-A over the Communication Channel as part of one or more messages sent between Processor-A and Processor-B with the expected results from each of those ePOSTs. Thereafter, Processor-B 1102 operates in one of one or more pre-determined system modes.

In each system mode Processor-B performs one or more eBISTs without performing a processor reset and reports data from each eBIST to Processor-A by means of eBIST-Data-B messages 1105 sent over the Communication Channel 1103. In each system mode Processor-B 1102 also compares the contents of eBIST-Data-A messages 1104 sent by Processor-A over the Communication Channel 1103 with the expected results from each of those eBISTs. In each system mode Processor-B also performs one or more eBISTs that include performing a processor reset, although as discussed above processor resets during eBISTs are not performed in certain embodiments of the present invention. In each system mode Processor-B also executes one or more tasks according to a predetermined task schedule.

Also included within the computer system 1100 is a memory element (not shown) that stores the software to be executed by the first processor and the second processor. This includes the software associated with each of the POSTs and each of the BISTs and the software associated with the predetermined task schedules to be executed on the first processor and second processor. It will be appreciated that according to certain other embodiments of the present invention, multiple memory elements may be provided that each stores the respective software to be executed on a specific processor. It will also be appreciated that these memory elements may be external or internal to the first processor and second processors. For example, the first and second processor may each have their own internal memory element.

The system 1100 also has a Communication Channel 1103 adapted to support the transmission of messages between Processor-A and Processor-B and to support the transmission of messages between Processor-B and Processor-A 1105.

The system 1100 also has a first input (Input-A) 1106 adapted to enable Processor-A to acquire data for any tasks that execute on Processor-A and a first output (Output-A) 1107 adapted to enable Processor-A to generate any safety-related outputs from the computer system. These outputs generated by Processor-A if—by means of tasks, self tests and Monitor-A—Processor-A determines that Processor-A itself is operating correctly.

The system 1100 also includes a second output (Output-B) 1113 adapted to enable Processor-B to generate any safety-related outputs from the computer system. The outputs are generated by Processor-B if—by means of tasks, self tests and Monitor-B—Processor-B determines that Processor-B itself is operating correctly and if—by means of tasks and eBIST-Data-A messages—Processor-B determines that Processor-A is not operating correctly.

The system 1100 also includes a first monitor element (Monitor-A) 1108 adapted to enable Processor-A to determine whether Output-A 1107 and Output-B 1110 and System-Output 1115 are in their required states. The system 1100 also includes a second monitor element (Monitor-B) 1110 adapted to enable Processor-B to determine whether Output-A 1107 and Output-B 1110 and System-Output 1115 are in their required states.

The system 1100 also includes a first control element (Control-A) 1112 adapted to ensure that any and all safety-related outputs from Output-A 1107 are held in a safe state if—by means of self tests or Monitor-A 1108—Processor-A determines that Processor-A itself is not operating correctly.

The system 1100 also includes a second control element (Control-B) 1109 adapted to ensure that any and all safety-related outputs from Output-B 1113 are held in a safe state if—by means of self tests or Monitor-B 1110—Processor-B determines that Processor-B itself is not operating correctly.

In certain other embodiments of the present invention, Monitor-A 1108 may also determine whether Control-A and/or Control-B are in their required states. Likewise, in certain other embodiments of the present invention, Monitor-B 1110 may also determine whether Control-A and/or Control-B are in their required states.

Also included in system 1100 is a second input (Input-B) 1111 adapted to enable Processor-B to acquire data for any tasks that execute on Processor-B.

System 1100 also includes a System-Output-Logic element 1114 adapted to determine a single set of outputs from the system 1100 based on a combination of the outputs from Output-A 1107, Output-B 1113, Control-A 1112 and Control-B 1109. In the system 1100, a System-Output 1115 is adapted to generate a fail-operational output from the system 1100 based on the calculations performed by the System-Output-Logic element 1114.

Thus, it will be appreciated that the computer system 1100 executes scheduled tasks with increased reliability and a reduced likelihood of a critical failure.

The computer system 1100 is arranged to execute sets of tasks in accordance with one or more predetermined system modes under control of a Processor-A. The task schedules for each task set on Processor-A determine the order in which tasks are executed and specify whether or not specific tasks are allowed to pre-empt other tasks.

The computer system 1100 is also arranged to execute sets of tasks in accordance with one or more predetermined system modes under control of a Processor-B. The task schedules for each task set on Processor-B determine the order in which tasks are executed and specify whether or not specific tasks are allowed to pre-empt other tasks.

In FIG. 11, Processor-A has a single hardware core and a single "soft" processor core. However, it will be appreciated that according to certain other embodiments of the present invention Processor-A may comprise one or more "soft" or "hard" processor cores (that execute some software) and/or one or more hardware cores (that do not execute any software).

In FIG. 11, Processor-A and Processor-B are both commercial-off-the-shelf (COTS) microcontrollers. However, it will be appreciated that according to certain other embodiments of the present invention, Processor-A and/or Processor-B may comprise one or more processor chips, such as a commercial-off-the-shelf (COTS) microcontroller or microprocessor, Digital Signal Processor (DSP), Field-Programmable Gate Array (FPGA), Application Specific Integrated Circuit (ASIC) or similar devices. According to certain other embodiments of the present invention, Processor-A and/or Processor-B may comprise one or more processor cores on one or more commercial-off-the-shelf (COTS) microcontrollers or microprocessors, Digital Signal Processors (DSP), Field-Programmable Gate Arrays (FPGAs), Application Specific Integrated Circuits (ASICs) or similar devices.

In FIG. 11, Processor-A and Processor-B comprise a time-triggered scheduler in the form of a time triggered cooperative (TTC) scheduler. However, according to certain other embodiments of the present invention Processor-A and/or Processor-B may comprise a time triggered hybrid (TTH) scheduler. These schedulers are described in detail in Reference 2.

The computer system 500 is arranged to monitor the operation of Processor-A by means of Processor-B.

As noted above, Processor-B will operate in accordance with one or more predetermined system modes.

In FIG. 11, Processor-A and Processor-B are processors of a different type. That is to say that Processor-A is based on a microcontroller with a particular processor core, and Processor-B is based on a microcontroller manufactured by a different organisation and with a different processor core. It will be appreciated that having such differences between Processor-A and Processor-B may reduce the likelihood of common-cause failures on the two processors, and that the reduction in the likelihood of common-cause failures may be considered particularly important in computer systems that are safety-critical in nature. However, it will be appreciated that according to certain other embodiments of the present invention, Processor-A and Processor-M may be processors of the same type. According to certain other embodiments of the present invention, the difference between Processor-A and Processor-B may be different to what is shown in FIG. 11. It is noted that use of different processors may be considered appropriate in designs that are classed as 'Safety Integrity Level' (SIL) 3 or 4 in Reference 8.

As with a conventional computer system, both POSTs and BISTs are performed in this system 1100.

Unlike a conventional computer system, in accordance with an aspect of this invention, such testing may be split into two categories: external Power-On Self Tests (ePOSTs) and external Built-In Self Tests (eBISTs). In this context, as noted above 'external' means that the ePOST or eBIST is carried out within the system by the processor concerned (that is, the processor tests itself), but the results of these tests are also reported to—and checked by—a second processor in the system.

It will be appreciated that in this system 1100, Processor-B checks the results of ePOSTs and eBISTs that are performed on Processor-A while Processor-A checks the results of ePOSTs and eBISTs that are performed on Processor-B. However, it will be appreciated that according to certain other embodiments of the present invention, the results of POSTs and BISTs performed by Processor-A may be checked by other processors in addition to or as an alternative to Processor-B. It will also be appreciated that the results of POSTs or BISTs performed by Processor-B may be checked by other processors (e.g., a third processor (not shown)) in addition to or as an alternative to Processor-A.

In FIG. 11, Processor-A performs ePOSTs that involve a processor reset and reports data from each ePOST to Processor-B by means of ePOST-Data-A messages that are sent over the Communication Channel. Processor-B then compares the contents of each ePOST-Data-A message with the expected results of the corresponding ePOST. By means of this comparison, Processor-B determines whether the ePOST performed on Processor-A has passed or has failed.

In FIG. 11, the sequence of ePOSTs that is performed on Processor-A is pre-determined. Failure of the ePOSTs to follow this pre-determined sequence is identified as a fault by Processor-B and the ePOST or ePOSTs that are performed out of sequence are determined to have failed. However, it will be appreciated that according to certain other embodiments of the present invention, the POST sequence is not pre-determined.

In FIG. 11, the time intervals between the ePOSTs that are performed on Processor-A are also pre-determined. Failure of the reported ePOSTs to match the pre-determined intervals-because tests are performed more quickly than expected or more slowly than expected—are then identified as a fault by Processor-B and the ePOST or ePOSTs that are performed at incorrect times are determined to have failed. However, it will be appreciated that according to certain other embodiments of the present invention, the time interval between POSTs is not pre-determined.

In FIG. 11, Processor-A performs eBISTs during its normal operation that do not require processor resets and reports data from each eBIST to Processor-B by means of eBIST-Data-A messages that are sent over the Communication Channel. Processor-B then compares the contents of each eBIST-Data-A message with the expected results of the corresponding eBIST. By means of this comparison, Processor-B determines whether the eBIST performed on Processor-A has passed or has failed.

In FIG. 11, the sequence of eBISTs that is performed on Processor-A is pre-determined. Failure of the eBISTs to follow this pre-determined sequence is identified as a fault by Processor-B and the eBIST or eBISTs that are performed out of sequence are determined to have failed. However, it will be appreciated that according to certain other embodiments of the present invention, the BIST sequence is not pre-determined.

In FIG. 11, the sequence of eBISTs that is performed on Processor-A remains the same in any and all operating modes of Processor-A. However, it will be appreciated that according to certain other embodiments of the present invention, the BIST sequence may be different in different operating modes of Processor-A.

In FIG. 11, the time intervals between the eBISTs that are performed on Processor-A is pre-determined. Failure of the reported eBISTs to match the pre-determined intervals-because tests are performed more frequently than expected or less frequently than expected—are identified as a fault by Processor-B and the eBIST or eBISTs that are performed at incorrect times are determined to have failed. However, it will be appreciated that according to certain other embodiments of the present invention, the time interval between BISTs is not pre-determined.

In FIG. 11, the time intervals between eBISTs that are performed on Processor-A remain the same in any and all operating modes of Processor-A. However, it will be appreciated that according to certain other embodiments of the present invention, the time intervals between BISTs may be different in different operating modes of Processor-A.

In FIG. 11, Processor-A also performs one or more eBISTs that include performing a processor reset.

In FIG. 11, Processor-B perform ePOSTs that involve a processor reset and reports data from each ePOST to Processor-A by means of ePOST-Data-B messages that are sent over the Communication Channel. Processor-A then compares the contents of each ePOST-Data-B message with the expected results of the corresponding ePOST. By means of this comparison, Processor-A determines whether the ePOST performed on Processor-B has passed or has failed.

In FIG. 11, the sequence of ePOSTs that is performed on Processor-B is pre-determined. Failure of the ePOSTs to follow this pre-determined sequence is identified as a fault by Processor-A and the ePOST or ePOSTs that are performed out of sequence are determined to have failed. However, it will be appreciated that according to certain other embodiments of the present invention, the POST sequence is not pre-determined.

In FIG. 11, the time intervals between the ePOSTs that are performed on Processor-B is pre-determined. Failure of the reported ePOSTs to match the pre-determined intervals-because tests are performed more quickly than expected or more slowly than expected—are identified as a fault by Processor-A and the ePOST or ePOSTs that are performed at incorrect times are determined to have failed. However, it will be appreciated that according to certain other embodiments of the present invention, the time intervals between POSTs is not pre-determined.

In FIG. 11, Processor-B performs eBISTs during its normal operation that do not require processor resets and reports data from each eBIST to Processor-A by means of eBIST-Data-B messages that are sent over the Communication Channel. Processor-A then compares the contents of each eBIST-Data-B message with the expected results of the corresponding eBIST. By means of this comparison, Processor-A determines whether the eBIST performed on Processor-B has passed or has failed.

In FIG. 11, the sequence of eBISTs that is performed on Processor-B is pre-determined. Failure of the eBISTs to follow this pre-determined sequence is identified as a fault by Processor-A and the eBIST or eBISTs that are performed out of sequence are determined to have failed. However, it will be appreciated that according to certain other embodiments of the present invention, the BIST sequence is not pre-determined.

In FIG. 11, the sequence of eBISTs that is performed on Processor-B remains the same in any and all operating modes of Processor-B. However, it will be appreciated that according to certain other embodiments of the present invention, the BIST sequence is different in different operating modes of Processor-B.

In FIG. 11, the time intervals between the eBISTs that are performed on Processor-B is pre-determined. Failure of the reported eBISTs to match the pre-determined intervals-because tests are performed more frequently than expected or less frequently than expected—are identified as a fault by Processor-A and the eBIST or eBISTs that are performed at incorrect times are determined to have failed. However, it will be appreciated that according to certain other embodiments of the present invention, the time intervals between BISTs is not pre-determined.

In FIG. 11, the time intervals between eBISTs that are performed on Processor-B remain the same in any and all operating modes of Processor-B. However, it will be appreciated that according to certain other embodiments of the present invention, the time intervals between BISTs on Processor-B is not pre-determined.

In FIG. 11, Processor-B also performs one or more eBISTs that include performing a processor reset.

FIG. 6 and FIG. 7 (again) show example processes for performing ePOSTs and eBISTs on the system 1100 in FIG. 11.

The computer system 1100 is arranged to have a Communication Channel that is adapted to support the transmission of ePOST-Data-A messages and eBIST-Data-A messages between Processor-A and Processor-B, and to support the transmission of ePOST-Data-B messages and eBIST-Data-B messages between Processor-B and Processor-A.

In FIG. 11, the Communication Channel is adapted to allow the transfer of data between any tasks that execute on Processor-A and any tasks that execute on Processor-B, as described in Reference 2.

In FIG. 11, the Communication Channel is used to synchronise the activities on Processor-A and Processor-B using a form of Shared-Clock Scheduler, as described in in Reference1 and Reference 2.

In FIG. 11, data transfers between Processor-A and Processor-B are supported by means of Tick Messages sent from Processor-A to Processor-B, as described in in Reference1 and Reference 2.

In FIG. 11, data transfers between Processor-B and Processor-A are supported by means of Ack Messages sent from Processor-B to Processor-A, as described in in Reference1 and Reference 2.

In FIG. 11, the Communication Channel 1103 is a standard serial protocol that is suitable for short-distance communication, such as 'RS-232' or SPI.

In FIG. 11, Input-A 1106 comprises one or more digital input pins on Processor-A plus any associated external interfacing hardware that are required to adapt voltages in the system environment to meet the voltage requirements of the digital input pins.

According to certain other embodiments of the present invention, Input-A may comprise one or more analogue input pins on Processor-A plus any associated external interfacing hardware that may be required to adapt voltages in the system environment to meet the voltage requirements of the analogue input pins and provide any necessary filtering of input signals.

In FIG. 11, Input-A comprises a software and hardware interface to one or more serial communication buses (such as CAN or Ethernet or RS-232' or SPI).

In FIG. 11, Output-A 1107 comprises one or more digital output pins on Processor-A plus any associated external interfacing hardware that is required to adapt voltages in the system environment to meet the voltage requirements of the digital output pins. A Fail-Safe State on any digital output pins on Output-A will comprise a 0V output. In certain other embodiments, other Fail-Safe States can be used.

According to certain other embodiments of the present invention, Output-A comprises analogue output pins on Processor-A plus any associated external interfacing hardware that may be required to adapt voltages in the system environment to meet the voltage requirements of the analogue output pins and provide any necessary filtering of output signals. In these embodiments, a Fail-Safe State on any analogue output pins on Output-A may have a 0V output or another output.

In FIG. 11, the Output-A 1107 comprises a software and hardware interface to one or more serial communication buses (such as CAN or Ethernet or RS-232' or SPI). A Fail-Safe State provided to any communication bus will mean that no messages are able to be sent by Processor-A (and/or Processor-B) on the bus concerned.

In FIG. 11, Output-B 1113 comprises one or more digital output pins on Processor-A plus any associated external interfacing hardware that is required to adapt voltages in the system environment to meet the voltage requirements of the digital output pins. A Fail-Safe State on any digital output pins on Output-B is a 0V output. Certain other embodiments may use other Fail Safe States.

According to certain other embodiments of the present invention, Output-B comprises analogue output pins on Processor-A plus any associated external interfacing hardware that may be required to adapt voltages in the system environment to meet the voltage requirements of the analogue output pins and provide any necessary filtering of output signals. A Fail-Safe State on any analogue output pins on Output-B may be a 0V output or another output.

In FIG. 11, Output-B comprises a software and hardware interface to one or more serial communication buses (such as CAN or Ethernet or RS-232' or SPI). A Fail-Safe State provided on any communication buses will mean that no messages are capable of being sent by Processor-A (and/or Processor-B) on the bus concerned.

In FIG. 11, Monitor-A 1108 comprises one or more digital input pins on Processor-A plus any associated external interfacing hardware required to adapt voltages from one or more digital output pins on Output-A, Output-B and System-Output to meet the voltage requirements of the digital input pins on Processor-A.

In certain alternative embodiments of the present invention, Monitor-A may comprise one or more analogue input pins on Processor-A plus any associated external interfacing hardware that may be required to adapt voltages from one or more analogue output pins on Output-A, Output-B and System-Output to meet the voltage requirements of the analogue input pins on Processor-A and provide any necessary filtering of input signals.

In FIG. 11, Monitor-A 1108 comprises a software and hardware interface to one or more communication buses (such as CAN or Ethernet or 'RS-232' or SPI) that are connected to Processor-A or Processor-B or System-Output in a manner that allows Processor-A to monitor any communications on the one or more communication buses.

In FIG. 11, Monitor-B 1110 includes one or more digital input pins on Processor-B plus any associated external interfacing hardware required to adapt voltages from one or more digital output pins on Output-A, Output-B and System-Output to meet the voltage requirements of the digital input pins on Processor-B.

In certain alternative embodiments of the present invention, Monitor-B may comprise one or more analogue input pins on Processor-B plus any associated external interfacing hardware that may be required to adapt voltages from one or more analogue output pins on Output-A, Output-B and System-Output to meet the voltage requirements of the analogue input pins on Processor-B and provide any necessary filtering of input signals.

In FIG. 11, Monitor-B comprises a software and hardware interface to one or more communication buses (such as CAN or Ethernet or 'RS-232' or SPI) that are connected to Processor-A or Processor-B or System-Output in a manner that allows Processor-B to monitor any communications on the one or more communication buses.

The computer system 1100 is arranged to have a Control-A adapted to ensure that any and all safety-related outputs from Output-A 1107 are held in a Fail-Safe State if—by means of self tests or Monitor-A—Processor-A determines that Processor-A itself may not be operating correctly.

In FIG. 11, Control-A 1112 comprises one or more digital switches that provide a means of disabling one or more digital output pins on Processor-A. A Fail-Safe State on any digital output pins on Control-A is a 0V output. Other outputs can of course be used.

In certain other embodiments of the present invention, Control-A comprises one or more analogue switches that provide a means of disabling one or more analogue output pins on Processor-A. A Fail-Safe State on any analogue output pins on Control-A will comprise a 0V output. Other outputs could of course be utilised.

In FIG. 11, Control-A 1112 may also include one or more digital switches that provide a means of disabling transceivers that provide a link to one or more serial communication buses (such as CAN or Ethernet or RS-232' or SPI), thereby preventing Processor-A from sending any messages on said communication buses when Control-A is in a Fail-Safe State.

The computer system is arranged to have a Control-B 1109 adapted to ensure that any and all safety-related outputs from Output-A are held in a Fail-Safe State if—by means of self tests or Monitor-B—Processor-B determines that Processor-B itself may not be operating correctly.

In FIG. 11, Control-B comprises one or more digital switches that provide a means of disabling one or more digital output pins on Processor-B. A Fail-Safe State on any digital output pins on Control-B is a 0V output. Other outputs could of course be used.

In certain alternative embodiments of the present invention, Control-B comprises one or more analogue switches that provide a means of disabling one or more analogue output pins on Processor-B. A Fail-Safe State on any analogue output pins on Control-B will comprise a 0V output although other outputs could of course be used.

In FIG. 11, Control-B may also include one or more digital switches that provide a means of disabling transceivers that provide a link to one or more serial communication buses (such as CAN or Ethernet or RS-232' or SPI), thereby preventing Processor-B from sending any messages on said communication buses when Control-B is in a Fail-Safe State.

The computer system 1100 is arranged to have a System-Output-Logic element 1114 adapted to determine a single set of outputs from the system based on a combination of the outputs from Output-A and Output-B. In FIG. 11, the System-Output-Logic element comprises an OR (logic) operation for combining any digital outputs from Output-A and Output-B According to certain other embodiments of the present invention, the System-Output-Logic element includes a XOR (logic) operation in addition to or as an alternative to the OR (logic) operation for combining any digital outputs from Output-A and Output-B According to certain other embodiments of the present invention, the System-Output-Logic element 1114 comprises one or more analogue switches that provide a means of combining any analogue outputs from Output-A and Output-B, thereby ensuring that only Processor-A or Processor-B (and not both) can generate analogue outputs at any given time.

In FIG. 11, System-Output-Logic element comprises one or more digital switches that provide a means of disabling transceivers that provide a link to one or more serial communication buses (such as CAN or Ethernet or RS-232' or SPI), thereby ensuring that only Processor-A or Processor-B (and not both) can send messages on said communication buses at any time.

In FIG. 11, all System-Output-Logic element outputs are set to a Fail-Safe-State if Processor-A determines—by means of ePOST-Data-B messages—that Processor-B has failed an ePOST and that Processor-B has failed to enter a Fail-Safe State after failing the ePOST.

In FIG. 11, all System-Output-Logic element outputs are set to a Fail-Safe-State if Processor-A determines—by means of eBIST-Data-B messages—that Processor-B has failed an eBIST and that Processor-B has failed to enter a Fail-Safe State after failing the eBIST.

In FIG. 11, all System-Output-Logic element outputs are set to a Fail-Safe-State if Processor-B determines—by means of ePOST-Data-A messages—that Processor-A has failed an ePOST and that Processor-A has failed to enter a Fail-Safe State after failing the ePOST.

In FIG. 11, all System-Output-Logic element outputs are set to a Fail-Safe-State if Processor-B determines—by means of eBIST-Data-A messages—that Processor-A has failed an eBIST and that Processor-A has failed to enter a Fail-Safe State after failing the eBIST.

A Fail-Safe State on any digital output pins on System-Output-Logic element is a 0V output. Other outputs could of course be used.

A Fail-Safe State on any analogue output pins on System-Output-Logic element is a 0V output. Other outputs could of course be used.

In FIG. 11, a Fail-Safe State on any serial communication buses (such as CAN or Ethernet or RS-232' or SPI) that form part of the System-Output-Logic element comprises a state in which neither Processor-A nor Processor-B can send any messages on said communication buses.

The computer system is arranged to have a System-Output 1115 adapted to generate a fail-operational output from the system based on the calculations performed by the System-Output-Logic.

In FIG. 11, the System-Output comprises one or more digital output pins plus any associated external interfacing hardware that is required to adapt voltages in the system environment to meet the voltage requirements of the digital output pins. A Fail-Safe State on any digital output pins on System-Output is a 0V output although other outputs could of course be used.

In certain alternative embodiments of the present invention, the System-Output comprises analogue output pins plus any associated external interfacing hardware that may be required to adapt voltages in the system environment to meet the voltage requirements of the analogue output pins and provide any necessary filtering of output signals. A Fail-Safe State on any analogue output pins on System-Output will comprise a 0V output. Other outputs could of course be used.

In FIG. 11, the System-Output comprises a software and hardware interface to one or more serial communication buses (such as CAN or Ethernet or RS-232' or SPI). A Fail-Safe State provided on any communication buses will mean that no messages are sent by the computer system 1100 on the bus concerned.

Figure 12:
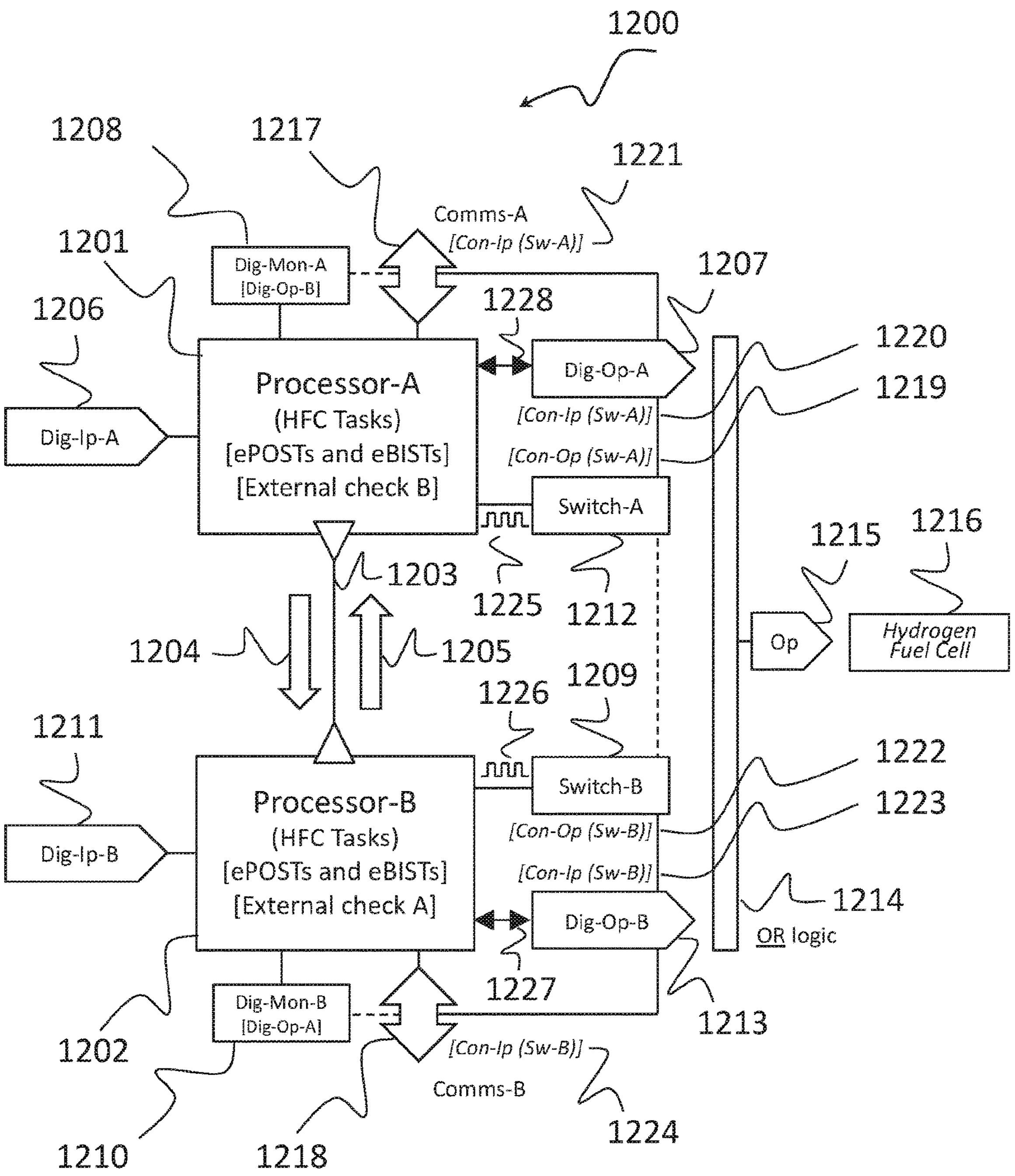
FIG. 12 illustrates a time-trigged computer system for monitoring a hydrogen fuel cell according to an embodiment of the present invention.

Turning now to FIG. 12, there is illustrated a computer system 1200 for monitoring a hydrogen fuel cell. This system is similar to the systems shown in FIG. 4, FIG. 8 and FIG. 10 but in FIG. 12 the system provides fail-operational behaviour. That is, the system 1200 is intended to continue to operate the hydrogen fuel cell even if Processor-A fails to operate correctly or if Processor-B fails to operate correctly.

In the example shown in FIG. 12, when operating normally, both Processor-A 1201 and Processor-B 1202 are responsible for keeping track of the flow of coolant through a pipe as part of a hydrogen fuel cell in an automotive system.

The two processors (Processor-A 1201 and Processor-B 1202) are linked by means of a Communication Channel 1203 that is used to exchange messages.

The computer system 1200 includes a Digital-Input-A 1206, a Digital-Input-B 1211, a Digital-Output-A 1207, Comms-A 1217, Digital-Output-B 1213 and Comms-B 1218.

In the system 1200, there is also a series of 'OR' gates 1214 that are used to combine the outputs from Digital-Output-A 1207 and Digital-Output-B 1213. This means that either Processor-A (by means of Digital-Output-A) or Processor-B (by means of Digital-Output-B) can generate the digital outputs needed to control the hydrogen fuel cell 1216.

In the system 1200, there is also a Digital-Monitor-A 1208 that monitors feedback 1228 from Digital-Output-A 1207, feedback from Comm-A 1217, and state of Digital-Output-B 1213). There is also a Digital-Monitor-B 1210 that monitors feedback 1227 from Digital-Output-B 1213, feedback from Comm-B 1218, and the state of Digital-Output-A 1207.

In FIG. 12, there is also a first control element (Control-A) including Switch-A 1212 that is activated (or 'closed') by means of a pulse chain 1225. When activated, Switch-A enables Digital-Output-A 1207 and Comms-A 1217. When Switch-A is not enabled (that is, it is not driven by an appropriate pulse chain), Processor-A is assumed to be in a safe state. This may include a Fail-Safe State. When in such a safe state, Processor-A is prevented from sending messages on the communication bus connected to Comms-A, and is prevented from generating signals on Digital-Output-A that could be used to activate the hydrogen fuel cell 1216.

In FIG. 12, there is also a second control element (Control-B) including Switch-B 1209 that is also activated by means of a pulse chain 1226. When activated, Switch-B enables Digital-Output-B 1213 and Comms-B 1218. When Switch-B is not enabled, Processor-B is assumed to be in a safe state. When in such a safe state, Processor-B is prevented from sending messages on the communication bus connected to Comms-B, and is prevented from generating signals on Digital-Output-B that could be used to activate the hydrogen fuel cell 1216.

In the system 1200, the fuel cell 1216 can be disabled by means of a Digital-Output-A interface and/or by means of a Digital-Output-B interface (plus associated system-output-logic 1214 and Output circuitry 1215) if the rate of coolant falls below a pre-determined threshold.

In FIG. 12, monitoring is achieved by means of tasks that execute on both Processor-A and Processor-B (when both Processor-A and Processor-B are operating normally). When performing the monitoring activity, the tasks operating on Processor-A and Processor-B can exchange data by means of the communication channel 1203.

Furthermore, Processor-A or Processor-B can (alone), by means of tasks executing on Processor-A or tasks executing on Processor-B, monitor the rate of coolant flow, if required. If one processor is performing this monitoring task then the level of confidence in the safe operation of this task may be lower. As a consequence, the system 1200 is configured so that it operates for a short period of time with a single processor. During this period, the system performs a controlled shutdown of the hydrogen fuel cell. Controlling the rate of fuel-cell shutdown gives the driver of the vehicle time to navigate to a safe location before the power provided by the fuel cell is removed from the system.

In the system 1200, either Processor-A 1201 (via the Comms-A interface 1217) or Processor-B 1202 (via the Comms-B interface 1218) reports the current coolant flow rate over a CAN bus (to another system in the vehicle, such as the main Vehicle Control Unit). Both the Comms-A and Comms-B interfaces are connected to the same CAN bus so that each processor can monitor the communications sent by the other processor on the (shared) CAN bus.

In the system 1200 of FIG. 12, when both Processor-A and Processor-B are operating normally, Processor-A is responsible for reporting the coolant flow rate over the CAN bus. In this situation, the coolant flow rate is determined by means of a sensor or sensors connected to Digital-Input-A interface 1206 and Digital-Input-B interface 1211. The flow rate is determined from a pulse chain that is generated by suitable sensors (one connected to Digital-Input-A and another connected to Digital-Input-B). Both sensors are configured such that a high pulse rate corresponds to a high (coolant) flow rate.

When Processor-A is operating normally and Processor-B has entered a Fail-Safe State, Processor-A is responsible for reporting the coolant flow rate over the CAN bus by means of Comms-A interface 1217. In this situation, the coolant flow rate is determined by means of sensor(s) connected to Digital-Input-A interface 1206.

When Processor-B is operating normally and Processor-A has entered a Fail-Safe State, Processor-B is responsible for reporting the coolant flow rate over the CAN bus by means of Comms-B interface 1218. In this situation, the coolant flow rate is determined by means of sensor(s) connected to Digital-Input-B interface 1211.

The coolant threshold level can be adjusted by means of the Digital-Input-A interface 1206 and/or the Digital-Input-B interface 1211.

Processor-A 1201 is capable of monitoring (via Digital-Monitor-A 1208) its own digital outputs by means of feedback 1228 from Digital-Output-A 1207. Processor-B 1202 is also capable of monitoring (via Digital-Monitor-B 1210) its own digital outputs by means of feedback 1227 from Digital-Output-B 1213.

Processor-A can monitor the digital outputs from Processor-B by means of feedback from Digital-Output-B. Processor-B is also capable of monitoring the digital outputs from Processor-A by means of feedback from Digital-Output-A.

Processor-A 1201 and Processor-B performs ePOSTs and eBISTs according to the methodology illustrated in FIG. 6. To monitor results of ePOSTs and eBISTs, Processor-A and Processor-B are linked by means of communication channel 1203. Messages 1204 are sent from Processor-A to Processor-B by means of this communication channel while ePOSTs and eBISTs are performed on Processor-A. Messages 1205 are sent from Processor-B to Processor-A by means of this communication channel while ePOSTs and eBISTs are performed on Processor-B.

Messages sent from Processor-A to Processor-B include ePOST-Data-A and eBIST-Data-A messages. These messages include fault-injection data and the results from the related tests. Messages sent from Processor-B to Processor-A include ePOST-Data-B and eBIST-Data-B messages. These messages include fault-injection data plus the results from the related tests.

The eBIST-Data-A messages include a message sequence number (so that an absence of eBIST-Data-A messages can be detected by Processor-B). The eBISTs on Processor-A are carried out in a pre-determined sequence. This allows Processor-B to determine whether these tests have been carried out in the expected order.

The eBISTs carried out include fault injection. Injecting a fault should result in generation of a Processor Fault Code (PFC) on Processor-A. This PFC is reported to Processor-B, along with the sequence number and eBIST identifier, in the eBIST-Data-A message. Because the eBIST is known on Processor-B and the expected PFC is also known on Processor-B, it is possible for Processor-B to check that the test was conducted successfully on Processor-A.

Processor-A 1201 monitors the ePOSTs and eBISTs that are performed on Processor-B according to the methodology as illustrated in FIG. 7. Processor-B 1202 monitors the ePOSTs and eBISTs that are performed on Processor-A 1201 according to the methodology as illustrated in FIG. 7 700.

To monitor ePOSTs and eBISTs, messages are sent from Processor-B to Processor-A by means of the communication channel 1203 while ePOSTs and eBISTs are performed on Processor-B.

Messages sent from Processor-B to Processor-A include ePOST-Data-A and eBIST-Data-A messages. These messages include fault-injection data plus the results from the related tests.

In the event that Processor-A determines (by means of its own ePOSTs, its own eBISTs or by monitoring (by means of tasks in this example) its own outputs via feedback from Digital-Output-A 1207) that it is not operating correctly, Processor-A attempts to notify Processor-B that it is shutting down by means of the Communication Channel 1203. Processor-A then stops sending the pulse chain 1225 to Switch-A 1212 and attempts to shut itself down. In this way, Processor-A attempts to ensure that Processor-B (alone) can then continue to operate the hydrogen fuel cell.

In the event that Processor-B determines (by means of its own ePOSTs, its own eBISTs or by monitoring (by means of tasks in this example) its own outputs via feedback from Digital-Output-A 1213) that it is not operating correctly, Processor-B attempts to notify Processor-A that it is shutting down by means of the Communication Channel 1203. Processor-B then stops sending the pulse chain 1226 to Switch-B 1209 and attempts to shut itself down. In this way, if Processor-A is operating normally, Processor-B lets Processor-A control the hydrogen fuel cell alone.

In the event that Processor-B determines (by means of its own ePOSTs, its own eBISTs or by monitoring (by means of tasks in this example) its own outputs via feedback from Digital-Output-A 1213) that it is not operating correctly, and Processor-A is not operating normally, Processor-B attempts to ensure that the system enters a Fail-Safe State and that the hydrogen fuel cell is shut down.

In the event that Processor-A determines (by means of its own ePOSTs, its own eBISTs or by monitoring (by means of tasks in this example) its own outputs via feedback from Digital-Output-A 1207) that it is not operating correctly, and Processor-B is not operating normally, Processor-A attempts to ensure that the system enters a Fail-Safe State and that the hydrogen fuel cell is shut down.

It will be appreciated that, when compared with the conventional system presented in FIG. 4, the combination of monitoring by both Processor-A and Processor-B in the system 1200 shown in FIG. 12 provides increased confidence that [i] the system will be able to detect that it may not be operating properly and [ii] that it will be able to continue to operate even if (for example) either Processor-A or Processor-B fails an ePOST or eBIST.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A time-triggered computer system comprising:

at least one first processor that is adapted to:

perform at least one first monitoring process for monitoring that the at least one first processor is operating correctly; and perform at least one first Power-On Self-Test, POST, and/or at least one first Built-In Self-Test, BIST, on the at least one first monitoring process; and transmit first data, that is indicative of results of said at least one first POST and/or said at least one first BIST, to at least one second processor;

wherein the at least one second processor is adapted to:

compare the first data with second data, that is data indicative of expected results from said at least one first POST and/or said at least one first BIST;

responsive to the comparison, determine if said at least one said first POST and/or said at least one first BIST has passed or failed;

perform at least one second POST and/or at least one second BIST; and transmit third data, that is indicative of results of said at least one second POST and/or said at least one second BIST to the at least one first processor and/or to at least one third processor;

wherein the at least one first processor and/or the at least one third processor is adapted to:

compare the third data with fourth data, that is data indicative of expected results from said at least one second POST and/or said at least one second BIST; and responsive to the comparison of the third data with the fourth data, determine if said at least one second POST and/or said at least one second BIST has passed or failed.

2. The computer system as claimed in claim 1, wherein the at least one first processor is adapted to:

perform said at least one first POST;

transmit a subset of the first data indicative of results of said at least one first POST to the at least one second processor;

receive a subset of the third-data indicative of results of said at least one second POST;

compare the subset of the third data with a subset of the fourth data indicative of expected results from said at least one second POST;

responsive to the comparison of the subset of the third data with the subset of the fourth data, determine if said at least one second POST has passed or failed; and responsive to determining that the at least one second POST has passed, operate in at least one predetermined system mode;

optionally wherein in each predetermined system mode the at least one first processor is adapted to:

perform said at least one first BIST;

transmit a further subset of the first data indicative of results of said at least one first BIST to the at least one second processor;

receive a further subset of the third data-indicative of results of said at least one second BIST;

compare the further subset of the third data with a further subset of the fourth data indicative of expected results from said at least one second BIST; and responsive to the comparison of the further subset of the third data with the further subset of the fourth data, determine if said at least one second BIST has passed or failed.

3. The computer system as claimed in claim 1, wherein the at least one first processor is further adapted to:

perform said at least one first BIST without performing a processor reset.

4. The computer system as claimed in claim 1, wherein a sequence of BISTs of the at least one first BIST performed on the at least one first processor is a pre-determined sequence;

optionally wherein the at least one second processor is adapted to:

determine if the sequence of BISTs follow the pre-determined sequence; and indicate failure of one or more BISTs of the sequence of BISTs that do not follow the pre-determined sequence.

5. The computer system as claimed in claim 1, wherein a time interval between respective BISTs of said at least one first BIST performed on the at least one first processor is a pre-determined time interval;

optionally wherein the at least one second processor is adapted to:

determine if the respective BISTs are performed at a correct time based on the pre-determined time interval; and indicate failure of one or more BISTs of the respective first BISTs that are not performed at the correct time.

6. The computer system as claimed in claim 1, wherein the at least one second processor is further adapted to:

perform said at least one second BIST without performing a processor reset.

7. The computer system as claimed in claim 1, wherein the at least one first processor is further adapted to:

perform a plurality of first BISTs on the at least one first monitoring process;

wherein a sequence of BISTs of the plurality of first BISTs and a time interval between respective BISTs of the plurality of first BISTs performed on the gat least one first monitoring process is pre-determined; and optionally:

perform said plurality of first BISTs on the at least one first monitoring process within a predetermined time period; and perform said at least one first monitoring process within the predetermined time period, wherein the predetermined time period is a Process Safety Time or Fault Tolerant Time Interval.

8. The computer system as claimed in claim 7, wherein the predetermined time period is equal to or less than 100 ms.

9. A computer-implemented method for determining if at least one Power-On Self-Test and/or Built-in Self-Test has passed or failed, the method comprising:

performing, by at least one first processor, at least one first monitoring process for monitoring that the at least one first processor is operating correctly;

performing, by the at least one first processor, at least one first Power-On Self-Test, POST, and/or at least one first Built-In Self-Test, BIST on the at least one first monitoring process;

transmitting, by the at least one first processor, first data that is indicative of results of said at least one first POST and/or said at least one first BIST, to at least one second processor;

comparing, by the at least one second processor, the first data with second data, that is data indicative of expected results from said at least one first POST and/or said at least one first BIST;

responsive to the comparing, determining, by the at least one second processor, if said at least one first POST and/or said at least one first BIST has passed or failed;

performing, by the at least one second processor, at least one second POST and/or at least one second BIST;

transmitting, by the at least one second processor, third data, that is indicative of results of said at least one second POST and/or said at least one second BIST to the at least one first processor and/or to at least one third processor;

comparing, by the at least one first processor and/or the at least one third processor the third data with fourth data, that is data indicative of expected results from said at least one second POST and/or said at least one second BIST; and responsive to the comparing of the third data with the fourth data, determining, by the at least one first processor and/or the at least one third processor, if said at least one second POST and/or said at least one second BIST has passed or failed.

10. The method as claimed in claim 9, further comprising:

performing, by the at least one first processor, a plurality of first BISTs on the at least one first monitoring process;

wherein a sequence of BISTs of the plurality of first BISTs and a time interval between respective BISTs of the plurality of first BISTs performed on the at least one first monitoring process is pre-determined; and optionally:

performing, by the at least one first processor, said plurality of first BISTs on the at least one first monitoring process within a predetermined time period;

performing, by the at least one first processor, said at least one first monitoring process within the predetermined time period, wherein the predetermined time period is a Process Safety Time or Fault Tolerant Time Interval.

11. The method as claimed in claim 10, wherein the predetermined time period is equal to or less than 100 ms.

12. A non-transitory computer readable medium storing instructions which, when executed by a computer, cause the computer to carry out the method according claim 9.

13. A time-triggered computer system comprising:

at least one first processor core that is adapted to:

perform at least one first monitoring process for monitoring that the at least one first processor core is operating correctly;

perform at least one first Power-On Self-Test, POST, and/or at least one first Built-In Self-Test, BIST on the at least one first monitoring process; and transmit first data, that is indicative of results of said at least one first POST and/or said at least one first BIST, to at least one second processor core;

wherein the at least one second processor core is adapted to:

compare the first data with second data, that is data indicative of expected results from said at least one first POST and/or said at least one first BIST;

responsive to the comparison, determine if said at least one first POST and/or said at least one first BIST has passed or failed;

perform at least one second POST and/or at least one second BIST; and transmit third data, that is indicative of results of said at least one second POST and/or said at least one second BIST to the at least one first processor core and/or to at least one third processor core;

wherein the at least one first processor core and/or the at least one third processor core is adapted to:

compare the third data with fourth data, that is data indicative of expected results from said at least one second POST and/or said at least one second BIST; and responsive to the comparison of the third data with the fourth data, determine if said at least one second POST and/or said at least one second BIST has passed or failed.

14. The computer system as claimed in claim 13, wherein the at least one first processor core is further adapted to:

perform a plurality of first BISTs on the at least one first monitoring process;

wherein a sequence of first BISTs of the plurality of first BISTs and a time interval between respective BISTs of the plurality of first BISTs performed on the at least one first monitoring process is pre-determined; and optionally:

perform said plurality of first BISTs on the at least one first monitoring process within a predetermined time period; and perform said at least one first monitoring process within the predetermined time period; and wherein the predetermined time period is a Process Safety Time or Fault Tolerant Time Interval.

15. The computer system as claimed in claim 14, wherein the predetermined time period is equal to or less than 100 ms.

16. A computer-implemented method for determining if at least one Power-On Self-Test and/or Built-in Self-Test has passed or failed, the method comprising:

performing, by at least one first processor core, at least one first monitoring process for monitoring that the at least one first processor core is operating correctly;

performing, by the at least one first processor core, at least one first Power-On Self-Test, POST, and/or at least one first Built-In Self-Test, BIST on the at least one first monitoring process;

transmitting, by the at least one first processor core, first data that is indicative of results of said at least one first POST and/or said at least one first BIST, to at least one second processor core;

comparing, by the at least one second processor core, the first data with second data, that is data indicative of expected results from said at least one first POST and/or said at least one first BIST; and responsive to the comparing, determining, by the at least one second processor core, if said at least one first POST and/or said at least one first BIST has passed or failed;

performing, by the at least one second processor core, at least one second POST and/or at least one second BIST;

transmitting, by the at least one second processor core, third data, that is indicative of results of said at least one second POST and/or said at least one second BIST to the at least one first processor core and/or to at least one third processor core;

comparing, by the at least one first processor core and/or the at least one third processor core, the third data with fourth data, that is data indicative of expected results from said at least one second POST and/or said at least one second BIST; and responsive to the comparing of the third data with the fourth data, determining, by the at least one first processor core and/or the at least one third processor core, if said at least one second POST and/or said at least one second BIST has passed or failed.

17. The method as claimed in claim 16, further comprising:

performing, by the at least one first processor core, a plurality of first BISTs on the at least one first monitoring process;

wherein a sequence of BISTs of the plurality of first BISTs and a time interval between respective BISTs of the plurality of first BISTs performed on the at least one first monitoring process is pre-determined; and optionally:

performing, by the at least one first processor core, said plurality of first BISTs on the at least one first monitoring process within a predetermined time period; and performing, by the at least one first processor core, said at least one first monitoring process within the predetermined time period; and wherein the predetermined time period is a Process Safety Time or Fault Tolerant Time Interval.

18. The method as claimed in claim 17, wherein the predetermined time period is equal to or less than 100 ms.

19. A non-transitory computer readable medium storing instructions which, when executed by a computer, cause the computer to carry out the method according to claim 16.

* * * * *